US012173959B2

(12) United States Patent
Yun et al.

(10) Patent No.: US 12,173,959 B2
(45) Date of Patent: Dec. 24, 2024

(54) REFRIGERATOR

(71) Applicant: LG Electronics Inc., Seoul (KR)

(72) Inventors: Jongho Yun, Seoul (KR); Siyeon An, Seoul (KR); Kyutae Park, Seoul (KR); Kyungsoo Park, Seoul (KR); Seonkyu Kim, Seoul (KR); Hyokku Kwon, Seoul (KR); Hangbok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/226,054

(22) Filed: Jul. 25, 2023

(65) Prior Publication Data

US 2024/0019202 A1 Jan. 18, 2024

Related U.S. Application Data

(60) Continuation of application No. 17/714,901, filed on Apr. 6, 2022, now Pat. No. 11,754,334, which is a (Continued)

(30) Foreign Application Priority Data

Feb. 20, 2013 (KR) ........................ 10-2013-0017774
Apr. 18, 2013 (KR) ........................ 10-2013-0043147

(51) Int. Cl.
*F25C 5/20* (2018.01)
*B67D 1/00* (2006.01)
(Continued)

(52) U.S. Cl.
CPC ......... *F25D 23/126* (2013.01); *B67D 1/0014* (2013.01); *B67D 1/0894* (2013.01);
(Continued)

(58) Field of Classification Search
CPC .. F25C 5/22; F25C 2400/10; F25D 2400/361; F25D 2323/122; F25D 2323/121;
(Continued)

(56) References Cited

U.S. PATENT DOCUMENTS 5,096,095 A 3/1992 Burton
5,135,645 A 8/1992 Sklenak et al.
(Continued)

FOREIGN PATENT DOCUMENTS

CN 1196118 10/1998
CN 1212356 3/1999
(Continued)

OTHER PUBLICATIONS

Office Action in Chinese Appln. No. 201610082464.0, dated Apr. 1, 2019, 13 pages (with English translation).
(Continued)

*Primary Examiner* — Cassey D Bauer
(74) *Attorney, Agent, or Firm* — Fish & Richardson P.C.

(57) ABSTRACT

A refrigerator includes a main body that defines a storage space, a door configured to open or close the storage space, and a dispenser located in the door and configured to dispense cooled water and purified water. The refrigerator also includes a purified water input part that inputs a command for dispensing the purified water, a cooled water input part that inputs a command for dispensing the cooled water, and a dispensing amount input part that sets an amount of purified water to be dispensed based on the purified water being selected through the purified water input part. The refrigerator further includes a filter device located within the storage space to purify water supplied from a water supply source, and a water tank storing water that has passed through the filter device in a cooled state.

20 Claims, 28 Drawing Sheets

Related U.S. Application Data continuation of application No. 16/889,287, filed on Jun. 1, 2020, now Pat. No. 11,326,832, which is a continuation of application No. 16/299,972, filed on Mar. 12, 2019, now Pat. No. 10,690,398, which is a division of application No. 15/096,651, filed on Apr. 12, 2016, now Pat. No. 10,288,344, which is a continuation of application No. 14/183,972, filed on Feb. 19, 2014, now Pat. No. 9,506,682.

(51) Int. Cl.

*B67D 1/08* (2006.01)
*F25D 11/02* (2006.01)
*F25D 23/02* (2006.01)
*F25D 23/12* (2006.01)
*F25D 29/00* (2006.01)

(52) U.S. Cl.

CPC ................ *F25C 5/22* (2018.01); *F25D 11/02* (2013.01); *F25D 23/028* (2013.01); *F25D 29/005* (2013.01); *B67D 2210/00036* (2013.01); *F25C 2400/10* (2013.01); *F25D 2323/121* (2013.01); *F25D 2323/122* (2013.01); *F25D 2400/361* (2013.01)

(58) Field of Classification Search

CPC ...... F25D 29/005; F25D 23/028; F25D 11/02; F25D 23/126

See application file for complete search history.

(56) References Cited

U.S. PATENT DOCUMENTS

| | | | |
|---|---|---|---|
| 7,587,910 | B2 | 9/2009 | Bowen et al. |
| 7,958,742 | B2 | 6/2011 | Park et al. |
| 9,297,575 | B1 | 3/2016 | Gardner |
| 2004/0148958 | A1 | 8/2004 | Park |
| 2006/0081805 | A1 | 4/2006 | Olson et al. |
| 2007/0251261 | A1 | 11/2007 | Son et al. |
| 2007/0289669 | A1 | 12/2007 | An et al. |
| 2008/0156015 | A1 | 7/2008 | Meyerholtz et al. |
| 2009/0095010 | A1 | 4/2009 | Moon |
| 2009/0282857 | A1 | 11/2009 | An et al. |
| 2010/0071401 | A1 | 3/2010 | Jang et al. |
| 2010/0170284 | A1 | 7/2010 | An et al. |
| 2010/0212333 | A1 | 8/2010 | Moon et al. |
| 2010/0229592 | A1 | 9/2010 | Lim et al. |
| 2010/0275633 | A1 | 11/2010 | An et al. |
| 2010/0275637 | A1 | 11/2010 | Park |
| 2010/0287971 | A1 | 11/2010 | Lee et al. |
| 2011/0126577 | A1 | 6/2011 | An |
| 2011/0132021 | A1 | 6/2011 | Fulton et al. |
| 2011/0185762 | A1 | 8/2011 | Kruckenberg et al. |
| 2012/0096888 | A1 | 4/2012 | Park et al. |
| 2012/0181304 | A1 | 7/2012 | Kim |
| 2012/0210740 | A1 | 8/2012 | Kim |
| 2012/0297814 | A1 | 11/2012 | Kim et al. |
| 2014/0041409 | A1 | 2/2014 | An |
| 2014/0131382 | A1 | 5/2014 | Coan et al. |
| 2016/0341462 | A1 | 11/2016 | Kim |

FOREIGN PATENT DOCUMENTS

| | | |
|---|---|---|
| CN | 1548889 | 11/2004 |
| CN | 1896661 | 1/2007 |
| CN | 101071019 | 11/2007 |
| CN | 101441019 | 5/2009 |
| CN | 101592427 | 12/2009 |
| CN | 101769666 | 7/2010 |
| CN | 102331131 | 1/2012 |
| CN | 102455109 | 5/2012 |
| EP | 1626236 | 2/2006 |
| EP | 2407739 | 1/2012 |
| EP | 2444763 | 4/2012 |
| GB | 2426569 | 11/2006 |
| KR | 20-1990-0020308 | 12/1990 |
| KR | 10-2001-0066587 | 7/2001 |
| KR | 10-2006-0006214 | 1/2006 |
| KR | 10-2007-0113870 | 11/2007 |
| KR | 10-2008-0046848 | 5/2008 |
| KR | 10-2008-0072998 | 8/2008 |
| KR | 10-2009-0038052 | 4/2009 |
| KR | 10-0894475 | 4/2009 |
| KR | 10-2009-0096211 | 9/2009 |
| KR | 10-2010-0063692 | 6/2010 |
| KR | 10-2010-0081910 | 7/2010 |
| KR | 10-2010-0102048 | 9/2010 |
| KR | 10-2011-0017309 | 2/2011 |
| KR | 10-2011-0060091 | 6/2011 |
| KR | 10-2011-0109398 | 10/2011 |
| KR | 10-2012-0041450 | 5/2012 |
| KR | 10-2012-0084213 | 7/2012 |
| KR | 10-2013-0017003 | 2/2013 |
| WO | WO 2004/085937 | 10/2004 |
| WO | WO 2008/088183 | 12/2008 |
| WO | WO 2010/027116 | 3/2010 |
| WO | WO 2011/007903 | 1/2011 |
| WO | WO 2011/013953 | 2/2011 |

OTHER PUBLICATIONS

Office Action in Korean Appln. No. 2020-0070875, dated Aug. 18, 2020, 10 pages (with English translation).
Office Action in Korean Appln. No. 10-2021-0033533, dated Jun. 1, 2021, 8 pages (with English abstract).
Office Action in Korean Appln. No. 2023-0061639, mailed on Feb. 13, 2024, 12 pages (with English translation).

REFRIGERATOR

CROSS-REFERENCE TO RELATED APPLICATIONS

This application is a continuation of U.S. application Ser. No. 17/714,901, filed on Apr. 6, 2022, which is a continuation of U.S. application Ser. No. 16/889,287, filed on Jun. 1, 2020, now U.S. Pat. No. 11,326,832, which is a continuation of U.S. application Ser. No. 16/299,972, filed on Mar. 12, 2019, now U.S. Pat. No. 10,690,398, which is a divisional of U.S. application Ser. No. 15/096,651, filed on Apr. 12, 2016, now U.S. Pat. No. 10,288,344, which is a continuation of U.S. application Ser. No. 14/183,972, filed on Feb. 19, 2014, now U.S. Pat. No. 9,506,682, which claims the benefit of foreign priority applications filed in Korea as Serial No. 10-2013-0017774, filed on Feb. 20, 2013 and Serial No. 10-2013-0043147, filed on Apr. 18, 2013. The disclosures of the prior applications are incorporated by reference in their entirety.

FIELD

The present disclosure relates to a refrigerator.

BACKGROUND

Refrigerators are home appliances for storing foods in a low-temperature state. Such a refrigerator may have a refrigerating compartment for storing foods in a refrigerated state and/or a freezing compartment for storing foods in a frozen state. Also, a dispenser may be mounted in a front surface of a door of a refrigerator to dispense drinking water through the dispenser without opening the door of the refrigerator.

Also, an ice maker for making and storing ice may be provided in the door or a storage space of the refrigerator. The refrigerator may be configured to dispense ice through the dispenser.

Korean Patent Publication No. 10-2011-0085099 discloses a refrigerator in which water supplied from the outside is supplied into a water tank provided in the refrigerator via a filter, and the water stored in the water tank is cooled by cool air within the refrigerator and then supplied into a dispenser and an ice maker to dispense the drinking water or supply the water for making ice.

In this type of refrigerator, the cooled water is supplied to the ice maker or the dispenser, regardless of a user's selection. Also, when a large amount of water is dispensed at once through the dispenser, it may be difficult to dispense the cooled water through the dispenser or reduce cooling performance.

SUMMARY

In one aspect, a refrigerator includes a main body that defines a storage space, a door configured to open or close at least a portion of the storage space, and a dispenser located in the door and configured to dispense cooled water and purified water. The refrigerator also includes a purified water input part configured to receive input of a command for dispensing the purified water, a cooled water input part configured to receive input of a command for dispensing the cooled water, and a dispensing amount input part configured to set an amount of purified water to be dispensed based on purified water being selected through the purified water input part. The refrigerator further includes a filter device located within the storage space and configured to purify water supplied from a water supply source that is located outside of the main body and a water tank configured to store water that has passed through the filter device. The water tank is positioned to allow the stored water to be cooled by cool air within the storage space. In addition, the refrigerator includes a purified water passage configured to guide, to the dispenser, purified water that has been filtered by the filter device, a cooled water passage configured to guide, to the dispenser, water cooled in the water tank, a purified water valve configured to control water flow in the purified water passage, and a cooled water valve disposed in a passage connecting the filter device to the water tank and configured to control water flow in the cooled water passage. Based on selection of purified water through the purified water input part, the purified water valve is opened and the cooled water valve is closed. Based on an amount of water set through the dispensing amount input part having been dispensed, the purified water valve is closed and, based on selection of cooled water through the cooled water input part, the cooled water valve is opened and the purified water valve is closed.

Implementations may include one or more of the following features. For example, the cooled water passage may be branched from the purified water passage. Also, the purified water passage and the cooled water passage may extend to an inside of the door through a hinge connecting the door to the main body.

In addition, the refrigerator may include a water dispensing port defined in the dispenser and configured to dispense water and a dispensing passage that extends from a point at which the purified water passage and the cooled water passage meet each other and that extends to the water dispensing port. The purified water valve may be located in the door, and the cooled water valve may be located in the main body.

In another aspect, a refrigerator includes a main body that defines a storage space, a door configured to open or close at least a portion of the storage space, and a dispenser located in the door and configured to dispense cooled water and purified water. The refrigerator also includes a purified water input part configured to receive input of a command for dispensing the purified water, a cooled water input part configured to receive input of a command for dispensing the cooled water, and a dispensing amount input part configured to set an amount of purified water to be dispensed based on the purified water being selected through the purified water input part. The refrigerator further includes a filter device located within the storage space and configured to purify water supplied from a water supply source that is located outside of the main body and a water tank configured to store water that has passed through the filter device. The water tank is positioned to allow the stored water to be cooled by cool air within the storage space. In addition, the refrigerator includes a purified water passage configured to guide, to the dispenser, purified water that has been filtered by the filter device, a cooled water passage configured to guide, to the dispenser, water cooled in the water tank, and a valve that is connected to the purified water passage and the cooled water passage and that is configured to control flow of water passing through the filter device. Based on selection of purified water through the purified water input part, the valve is configured to open the purified water passage and close the cooled water passage. Based on an amount of water set through the dispensing amount input part having been dispensed, the valve is configured to close the purified water passage. Based on selection of cooled water through the cooled water input part, the valve is configured to close the purified water passage and open the cooled water passage.

Implementations may include one or more of the following features. For example, the cooled water passage may be branched from the purified water passage. In addition, the purified water passage and the cooled water passage may extend to an inside of the door through a hinge connecting the door to the main body. Further, the refrigerator may include a water dispensing port defined in the dispenser and configured to dispense water and a dispensing passage that extends from a point, at which the purified water passage and the cooled water passage meet each other, and that extends to the water dispensing port.

In yet another aspect, a refrigerator includes a main body that defines a storage space, a door rotatably coupled to the main body by a hinge and configured to open or close at least a portion of the storage space, and a dispenser located in the door and configured to dispense cooled water and purified water. The refrigerator also includes a purified water input part configured to receive input of a command for dispensing the purified water, a cooled water input part configured to receive input of a command for dispensing the cooled water, and a dispensing amount input part configured to set an amount of purified water to be dispensed based on purified water being selected through the purified water input part. The refrigerator further includes a filter device located within the storage space and configured to purify water supplied from a water supply source that is located outside of the main body and a water tank configured to store water that has passed through the filter device. The water tank is positioned to allow the stored water to be cooled by cool air within the storage space. In addition, the refrigerator includes a purified water passage configured to guide, to the dispenser, purified water that has been filtered by the filter device, a cooled water passage configured to guide, to the dispenser, water cooled in the water tank, a purified water valve configured to control water flow in the purified water passage, and a cooled water valve disposed in a passage connecting the filter device to the water tank and configured to control water flow in the cooled water passage. Based on selection of purified water through the purified water input part, the purified water valve is opened and the cooled water valve is closed. Based on an amount of water set through the dispensing amount input part having been dispensed, the purified water valve is closed and, based on selection of cooled water through the cooled water input part, the cooled water valve is opened and the purified water valve is closed.

Implementations may include one or more of the following features. For example, the refrigerator may include a supplied water passage connecting the water supply source to the filter device and a water supply valve disposed in the supplied water passage and configured to control water flow into the filter device.

In some implementations, the purified water valve may be disposed in the door. In these implementations, the dispenser may include a dispenser housing having a space that is recessed from a front surface of the door, a water dispensing port through which cooled water or purified water is dispensed, and an electrical component mount part in which electrical components are mounted, the electrical component mount part being located on an upper portion of the dispenser housing and at a first side with respect to the water dispensing port. Further, in these implementations, the dispenser may include a valve mount part in which the purified water valve is accommodated and a cover plate having at least one portion that is separable from the dispenser housing. The valve mount part may be located on the upper portion of the dispenser housing and at a second side with respect to the water dispensing port that is opposite of the first side at which the electrical component mount part is located. The cover plate may be configured to selectively open or close the electrical component mount part and the valve mount part and the purified water valve may be exposed to outside of the refrigerator in a state in which the cover plate is separated from the dispenser housing.

In some examples, the refrigerator may include a dispensing passage connected to the water dispensing port of the dispenser and configured to guide purified water or cooled water to the water dispensing port and a connection member that has an outer end connected to the dispensing passage and an inlet end connected to the purified water passage and the cooled water passage. In these examples, the connection member may be disposed on the valve mount part. Also, in these examples, the dispensing passage may be bent, may have a predetermined curvature, and may be made of a metal material.

In some implementations, the purified water passage and the cooled water passage may extend to an inside of the door through the hinge that connects the door to the main body. In these implementations, the refrigerator may include a passage guide that extends from the hinge to the dispenser and that is configured to guide the purified water passage and the cooled water passage through the hinge to the dispenser.

In some examples, the refrigerator may include an ice making device located in the door and configured to make ice and an ice making passage configured to guide, to the ice making device, water within the purified water passage. In these examples, the storage space may include a refrigerating compartment and a freezing compartment, the door may include a refrigerating compartment door and a freezing compartment door, and the ice making device may be located in the freezing compartment door.

The ice making passage may be connected to the purified water valve. Also, the dispenser may include a water dispensing port configured to dispense cooled water or the purified water and an ice dispensing port configured to dispense ice. The purified water valve may be disposed on a first side of the ice dispensing port. In addition, the refrigerator may include an ice input part located in the dispenser and configured to receive a selection to dispense ice.

Further, the dispenser may include a purified water dispensing port through which purified water is dispensed and a cooled water dispensing port through which cooled water is dispensed. The refrigerator may include an ice making device mounted in the main body and configured to make ice and an ice making passage configured to guide, to the ice making device, water within the purified water passage. The ice making passage may extend to the ice making device along the main body. In addition, the storage space may include a refrigerating compartment and a freezing compartment and the water tank and the filter device may be mounted in the refrigerating compartment.

In yet another aspect, a refrigerator includes a main body that defines a storage space, a door configured to open or close at least a portion of the storage space, and a dispenser located in the door and configured to dispense cooled water and purified water. The refrigerator also includes a purified water input part configured to receive input of a command for dispensing the purified water, a cooled water input part configured to receive input of a command for dispensing the cooled water, and a filter device located in the storage space. The filter device includes a plurality of filters configured to purify water supplied from a water supply source that is located outside of the main body. The refrigerator further includes a water purifying passage extending from an inlet end of the filter device to an outlet end of the filter device via the plurality of filters and a water tank configured to store water that has passed through the filter device. The water tank is positioned to allow the stored water to be cooled by cool air within the storage space. In addition, the refrigerator includes a purified water passage configured to guide, to the dispenser, purified water that has been filtered by the filter device and a cooled water passage configured to guide, to the dispenser, water cooled in the water tank. The refrigerator also includes a sterilization passage that includes a passage that extends from an outlet end of a sterilization device configured to clean the purified water passage and the cooled water passage to an inlet end of the filter device and a portion of the water purifying passage that does not pass through the plurality of filters. The refrigerator further includes a purified water valve configured to control water flow in the purified water passage and a cooled water valve configured to control water flow in the cooled water passage. The purified water valve and the cooled water valve are configured to open together with an operation of the sterilization device to enable sterilization of the purified water passage and the cooled water passage.

Implementations may include one or more of the following features. For example, the filter device may include a case that is mounted in the storage space and that has a front opening that receives each of the plurality of filters. In this example, the filter device may include a connector that is disposed within the case and that is configured to allow the plurality of filters to be detachably connected thereto. The water purifying passage may pass through the connector.

In some implementations, the connector may include a plurality of sockets in which the filters are fitted, respectively, and a bracket to which the plurality of sockets are rotatably coupled. In these implementations, the refrigerator may include a filter cap mounted within the plurality of sockets and configured to reduce leakage of water in a state in which the filters are separated from the sockets.

Further, the refrigerator may include an ice making device located in the door or the main body and configured to make ice and an ice making passage configured to guide a portion of the purified water flowing along the purified water passage to the ice making device. Sterilizing water supplied from the sterilization device, during the sterilization process, may be supplied into the ice making device through the ice making passage. In addition, the refrigerator may include an input part configured to select a sterilization mode that enables sterilization of the purified water passage and the cooled water passage.

In another aspect, a refrigerator includes a main body that defines a storage space, a receiving member located in the storage space, a door configured to open or close at least a portion of the storage space, and a dispenser located in a front surface of the door and configured to dispense cooled water and purified water. The refrigerator also includes a filter device that is located in the storage space and that includes a plurality of filters configured to purify water supplied from a water supply source that is located outside of the main body. The refrigerator further includes a water tank configured to store water that has passed through the filter device. The water tank is positioned to allow the stored water to be cooled by cool air within the storage space. In addition, the refrigerator includes a water supply passage through which purified water that has passed through the filter device and water cooled in the water tank independently flow and a valve unit that is located in the water supply passage and that is configured to open, close, and switch the water supply passage. The filter device is disposed between a side surface of the receiving member and a side surface of the storage space, the plurality of filters are disposed in a horizontal state and arranged vertically, and water introduced into the filter device successively passes through the plurality of filters and is discharged towards the valve unit.

Implementations may include one or more of the following features. For example, the filter device may include a case that is mounted in the storage space and that has a front opening configured to receive each of the plurality of filters. In this example, the filter device may include a connector that is disposed within the case and that is configured to allow the plurality of filters to be detachably connected thereto. Further, in this example, the filter device may include a case cover configured to open or close the front opening and a front surface of the case cover and a front surface of the receiving member may be coplanar.

In some implementations, the filter device may include a drain member that is disposed in an inner lower portion of the case and that is configured to collect water leaking while the filters are detached or attached. In these implementations, the drain member may have a surface that is tilted downward in a front direction of the refrigerator. Also, in these implementations, an opening may be defined in the case through which water collected in the drain member is discharged to an outside of the filter device.

In some examples, the filter device may include a mount guide that protrudes from an inner circumferential surface of the case and that is configured to guide entrance of the plurality of filters. In these examples, the mount guide may extend in a direction parallel to that in which the plurality of filters are inserted.

The connector may include a plurality of sockets in which the filters are fitted respectively, the plurality of sockets may be spaced a predetermined distance from each other, and the connector may include a bracket to which the plurality of sockets are rotatably coupled. Also, the filter device may have a same length in a front-to-rear direction as a length of the receiving member in the front-to-rear direction. Further, the refrigerator may include a support member configured to support the receiving member and the filter device at the same time. In addition, the refrigerator may include a shelf that covers upper sides of the receiving member and the filter device at the same time and a top surface of the filter device and a top surface of the receiving member are coplanar.

In another aspect, a refrigerator includes a main body that defines a storage space, a door configured to open or close at least a portion of the storage space, and a dispenser located in the door and configured to dispense cooled water or purified water outside of the door. The refrigerator also includes a purified water input part configured to receive input of a command for dispensing the purified water and a cooled water input part configured to receive input of a command for dispensing the cooled water. The refrigerator further includes a filter device located within the storage space and configured to purify water supplied from a water supply source that is located outside of the main body and a water tank located in the storage space and configured to store water that has passed through the filter. The water tank may be made of a metal material and may be positioned to allow the stored water to be cooled by cool air within the storage space. In addition, the refrigerator includes a purified water passage configured to guide, to the dispenser, purified water filtered by the filter device, a cooled water passage configured to guide, to the dispenser, water cooled in the water tank, a purified water valve configured to control water flow in the purified water passage, and a cooled water valve configured to control water flow in the cooled water passage. Based on selection of purified water through the purified water input part, the purified water valve is opened and the cooled water valve is closed. Based on selection of cooled water through the cooled water input part, the cooled water valve is opened and the purified water valve is closed.

Implementations may include one or more of the following features. For example, the water tank may be made of a stainless material. In addition, the water tank may include a tank body having a cylindrical shape with both ends opened and a pair of tank caps bonded to the opened ends of the tank body. Each of the pair of tank caps may have a hemisphere shape.

In some implementations, the water tank may include a water inlet tube that passes through a first tank cap of the pair of tank caps and that is inserted into the first tank cap and a water outlet tube that passes through a top surface of the tank body and that is inserted into the tank body. In these implementations, the water outlet tube may be closer to a second tank cap of the pair of tank caps that is disposed on a side opposite to the first tank cap in which the water inlet tube is disposed. Also, in these implementations, the cooled water valve may be connected to the water outlet tube and covered by a valve cover and the valve cover may be coupled to a wall of the storage space. Further, in these implementations, the water tank may be horizontally oriented in the storage space.

In some examples, the filter device may include a plurality of filters. In these examples, each of the plurality of filters may be horizontally oriented in forward and backward directions of the storage space and the water tank may be horizontally oriented in left and right directions of the storage space such that the water tank is oriented perpendicular to the plurality of filters. Further, in these examples, the plurality of filters may be vertically arranged.

The refrigerator may include a receiving member located in the storage space. The water tank may be disposed at a rear side of the receiving member.

In another aspect, a refrigerator includes a main body that defines a storage space, a door configured to open or close at least a portion of the storage space, and a dispenser located in the door and configured to dispense cooled water and purified water. The dispenser includes a dispenser housing that is recessed backward by a predetermined depth to define a cavity. The refrigerator also includes a purified water input part configured to receive input of a command for dispensing the purified water, a cooled water input part configured to receive input of a command for dispensing the cooled water, and a dispensing amount input part configured to set an amount of purified water to be dispensed based on purified water being selected through the purified water input part. The refrigerator further includes a tray configured to selectively withdraw to an outside of the cavity of the dispenser, a flow sensor configured to detect an amount of purified water being dispensed, a filter device located within the storage space and configured to purify water supplied from a water supply source that is located outside of the main body, and a water tank located in the storage space and configured to store water that has passed through the filter. The water tank may be made of a metal material and may be positioned to allow the stored water to be cooled by cool air within the storage space. In addition, the refrigerator includes a purified water passage configured to guide, to the dispenser, purified water that has been filtered in the filter device, a cooled water passage configured to guide, to the dispenser, water cooled in the water tank, a purified water valve configured to control water flow in the purified water passage, and a cooled water valve configured to control water flow in the cooled water passage. Based on selection of purified water through the purified water input part, the purified water valve is opened and the cooled water valve is closed. Based on an amount of water set through the dispensing amount input part having been dispensed, the purified water valve is closed and, based on selection of cooled water through the cooled water input part, the cooled water valve is opened and the purified water valve is closed.

Implementations may include one or more of the following features. For example, the flow sensor may be located in a passage connecting the water supply source to the filter device. In addition, the dispenser may include a push pad configured to control dispensing of purified water or cooled water based on receiving a pushing input and a detection part configured to detect the pushing of the pushing pad.

In some implementations, the refrigerator may include a display having a touchscreen. The display may be configured to display, on the touchscreen, representations of the purified water input part, the cooled water input part, and the dispensing amount input part and the touchscreen may be configured to detect touch input at the representations of the purified water input part, the cooled water input part, and the dispensing amount input part. In these implementations, the touchscreen of the display may be partitioned into a plurality of sections to display the purified water input part and the cooled water input part and, based on the purified water input part being touched, the touchscreen may be configured to switch to display the dispensing amount input part.

After an amount of water to be dispensed is selected through the dispensing amount input part, a water dispensing command may be input based on a water dispensing command input part being manipulated, or the push pad being pushed. The water dispensing command input part may be separate from the push pad. Based on the push pad being pushed to dispense water and then being released before a predetermined amount of purified water has been dispensed, the purified water valve may be closed. After the push pad is pushed to dispense water and then a predetermined amount of purified water has been dispensed, the purified water valve may be closed regardless of whether the push pad is released.

In some examples, the refrigerator may include an ice making device configured to receive purified water within the purified water passage and configured to make ice. In these examples, an ice input part configured to select ice dispensing may be displayed on the touchscreen of the display. Also, in these examples, cubed ice or crushed ice may be selected through the ice input part.

In some implementations, the push pad and the tray may be located on a rear surface of the cavity. In these implementations, the tray may be rotatable and may be configured to be rotated from the rear surface of the cavity to a horizontal state in which the tray is able to support a container being filled by the dispenser. Further, in these implementations, the refrigerator may include a tray seat part that is further recessed from the rear surface of the cavity to accommodate the tray.

In some examples, the tray may include a front portion exposed to an outside of the refrigerator in a state in which the tray is seated on the tray seat part and a rear portion defining a surface opposite to the front portion. In these examples, in the state in which the tray is seated on the tray seat part, the front portion and the rear surface of the cavity may be coplanar. Also, in these examples, the push pad may be located on an upper portion of the front portion and integrated with the tray.

The push pad may be located on one side of the rear surface of the cavity which is spaced apart from an upper end of the tray. The refrigerator may include a first recess portion that accommodates the tray and a second recess portion that is further recessed inward from the first recess portion and configured to accommodate a portion of a container at a position further inward of the cavity.

In some implementations, the refrigerator may include a latch part located on the tray seat part and the rear portion of the tray and configured to allow the tray to be separated from the tray seat part by pushing and then releasing the tray. In these implementations, the refrigerator may include a driving unit and a deceleration unit which are provided on a rotation shaft of the tray and configured to rotate at a set speed based on the tray being separated from the tray seat part.

In addition, the detection part may be located on a rear surface of the dispenser housing. The detection part may include at least one of a magnet and a hall sensor module or an on/off switch module. When the detection part includes the magnet and the hall sensor module, one of the magnet and the hall sensor may be mounted on the push pad and the other of the magnet and the hall sensor may be mounted on the tray. When the detection part includes the magnet and the hall sensor module, one of the magnet and the hall sensor may be mounted on the tray and the other of the magnet and the hall sensor is mounted on the dispenser housing.

When the detection part includes the on/off switch module, the on/off switch may be mounted on the push pad and the tray. When the detection part includes the on/off switch module, the on/off switch may be mounted on the tray and the dispenser housing. A gripping groove may be defined in a top surface of the tray.

In yet another aspect, a refrigerator includes: a refrigerating compartment; and a water tank disposed in the refrigerating compartment, the water tank being formed of a stainless material, wherein the water tank includes: a tank body manufactured by welding a contact end of a plate formed of a stainless material, which is wound in a cylindrical shape, the tank body having body flanges on both sides thereof; a plurality of tank cap including a cap flange coupled to contact the body flange, thereby covering both opened sides of the tank body, and each of which has a hemispherical shape and is formed of a stainless material; a water inlet tube welded and coupled after passing through one tank cap of the plurality of tank caps; and a water outlet tube welded and coupled to the tank body after passing through the tank body, wherein the tank body is horizontally disposed with respect to a bottom surface of the refrigerating compartment so that the water outlet tube is disposed in an upper portion of the tank body.

In some implementations, the body flange and the cap flange may be welded and coupled to each other in a state in which the body flange and the cap flange partially overlap each other.

In the state in which the body flange and the cap flange are welded and coupled to each other, a space may be defined between an outer surface of the tank cap and the cap flange.

The tank cap may include a first tank cap and a second tank cap, and the water inlet tube may pass through the first tank cap, and the water outlet tube may be disposed closer to the second tank cap than the first tank cap.

The refrigerator may further include a filter device disposed in the refrigerating compartment, the filter device including at least one filter for purifying water to be supplied to the water tank, wherein the tank body may be disposed to cross the at least one filter.

The refrigerator may further include a receiving member provided in the refrigerating compartment, wherein the water tank may be disposed at a rear side of the receiving member.

The water outlet tube may be welded and coupled to the tank body at a position that is one-sided from a center of the tank body.

The water passing through the water inlet tube may horizontally flow and be introduced into the tank body, and the water of the tank body may vertically flow and be discharged through the water outlet tube.

In further another aspect, a refrigerator includes: a cabinet in which a freezing compartment and a refrigerating compartment are defined; a freezing compartment door opening and closing the refreezing compartment; a refrigerating compartment door opening and closing the refrigerating compartment; a drawer for storing foods, which is disposed in the refrigerating compartment; a water supply passage connected to a water supply source outside the cabinet; a water supply valve opening and closing the water supply passage; a plurality of filters vertically arranged in a space between a sidewall of the refrigerating compartment and the drawer; a case including a plurality of insertion holes and a mounting guide to receive the plurality of filters; a connector in which the plurality of filters are inserted and mounted, the connector connecting the plurality of filters to the water supply passage; a water tank mounted in space between a rear wall of the refrigerating compartment and the drawer; a cooled water passage branched at a rear end of the connector to pass through a hinge of the freezing compartment door after passing through the water tank and a cooled water valve; a purified water passage branched at the rear end of the connector, the purified water being additionally branched from a purified water valve mounted on the outside of the freezing compartment door after passing through the hinge of the freezing compartment door; an ice making device disposed in the freezing compartment door or the freezing compartment to receive the purified water from the ice making passage; and a dispensing passage in which the cooled water passage and the purified water passage are combined with each other by a connection member.

In some implementations, each of the plurality of filters may extend in a front and rear direction within the refrigerating compartment.

The refrigerator may further include a case cover coupled to a front surface of the case to cover the plurality of filters at the same time.

Each of the plurality of filters may include a handle that is inclined at a predetermined angle with respect to a vertical line in a state in which each of the filters is mounted on the connector so that a user grasps each of the filters.

In further another aspect, a refrigerator includes: a dispenser for dispensing ice and water from a refrigerator door, wherein the dispenser includes: a cavity defined to be recessed in the refrigerator door; a display part disposed above the cavity on a front surface of the refrigerator door to display an operation state of the refrigerator; a water dispensing port and ice dispensing port which are defined in an upper portion of the cavity; a push pad protruding from a rear surface of the cavity to control the dispensing of the water and ice; a chute cover disposed at a center of the display part to cover the water dispensing port and the ice dispensing port; and a separate display disposed on a front surface of the chute cover to receive a command through screen touch, the display having a changeable screen, wherein the display provides an initial screen that is partitioned to be selected into an ice kind selection input part, a purified water input part, and a cooled water input part, and when the purified water input part is selected, the screen of the display is changed into a dispensing amount input part through which a dispensing amount of purified water is selected.

In some implementations, the initial screen may be partitioned into the ice kind selection input part, the purified water input part, and the cooled water input part and displayed to be partitioned into a plurality of rows and columns.

The dispensing amount input part may be displayed to be partitioned into a plurality of rows and columns on the display.

The chute cover may protrude from the display part toward a front side of the refrigerator door.

When a dispensing amount may be inputted through the dispensing amount input part, an operation input part for inputting a command for the dispensing of the selected dispensing amount may be activated on the display.

The details of one or more implementations are set forth in the accompanying drawings and the description below. Other features will be apparent from the description and drawings, and from the claims.

DETAILED DESCRIPTION

Hereinafter, a refrigerator will be described in detail with reference to the accompanying drawings. The disclosure, however, covers many different forms and should not be construed as being limited to the examples set forth herein. Rather, alternate examples and other arrangements are possible.

In addition, the present disclosure may be applicable to all types of refrigerators in which water is supplied from an external water supply source to a dispenser, and a filter and water tank are provided therein. Hereinafter, for convenience of description, a side by side type refrigerator in which a refrigerating compartment and a freezing compartment are disposed on both left and right sides and a bottom freezer type refrigerator in which a freezing compartment is disposed at a lower side are described.

Figure 1:
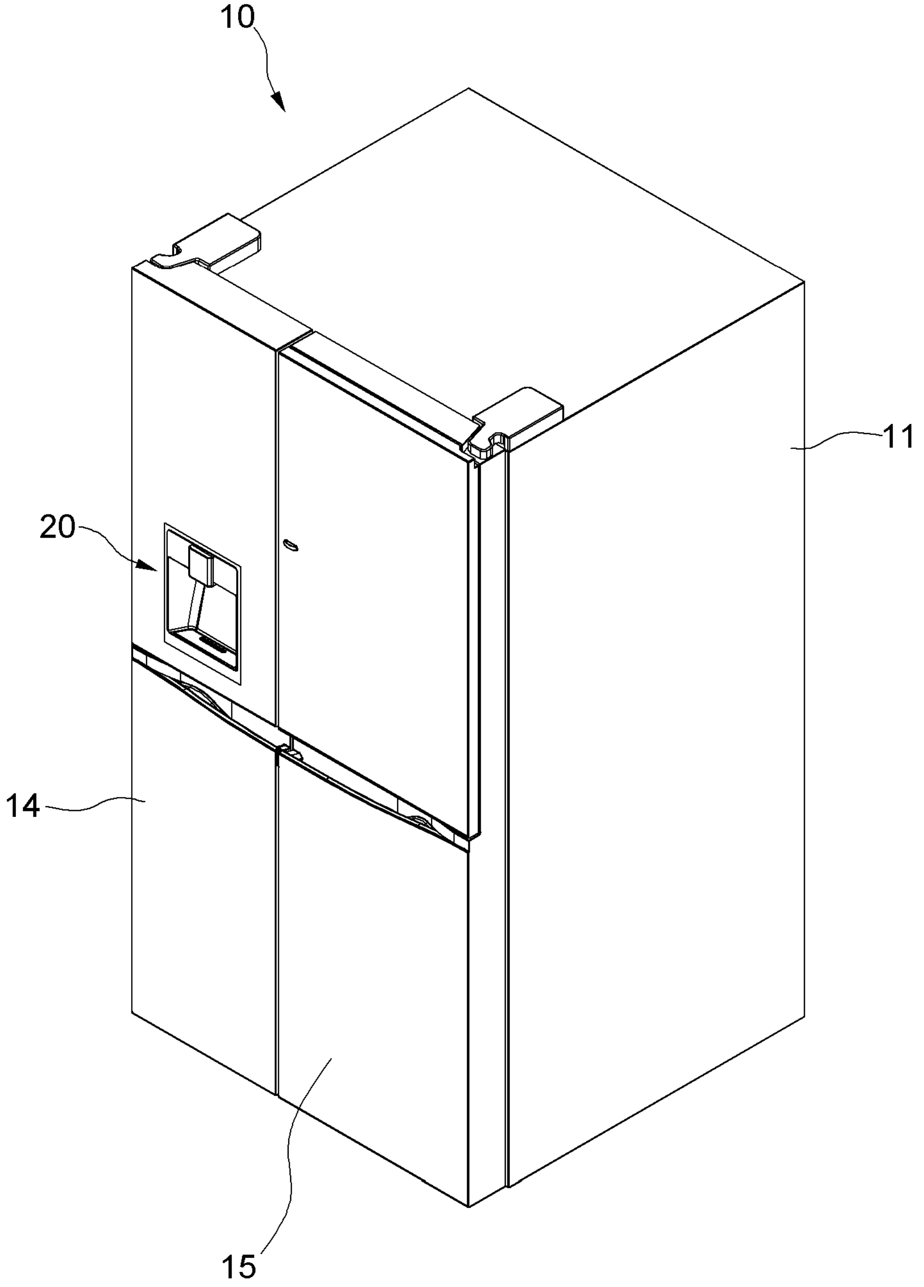
FIG. 1 is a perspective view of an example refrigerator.
Figure 2:
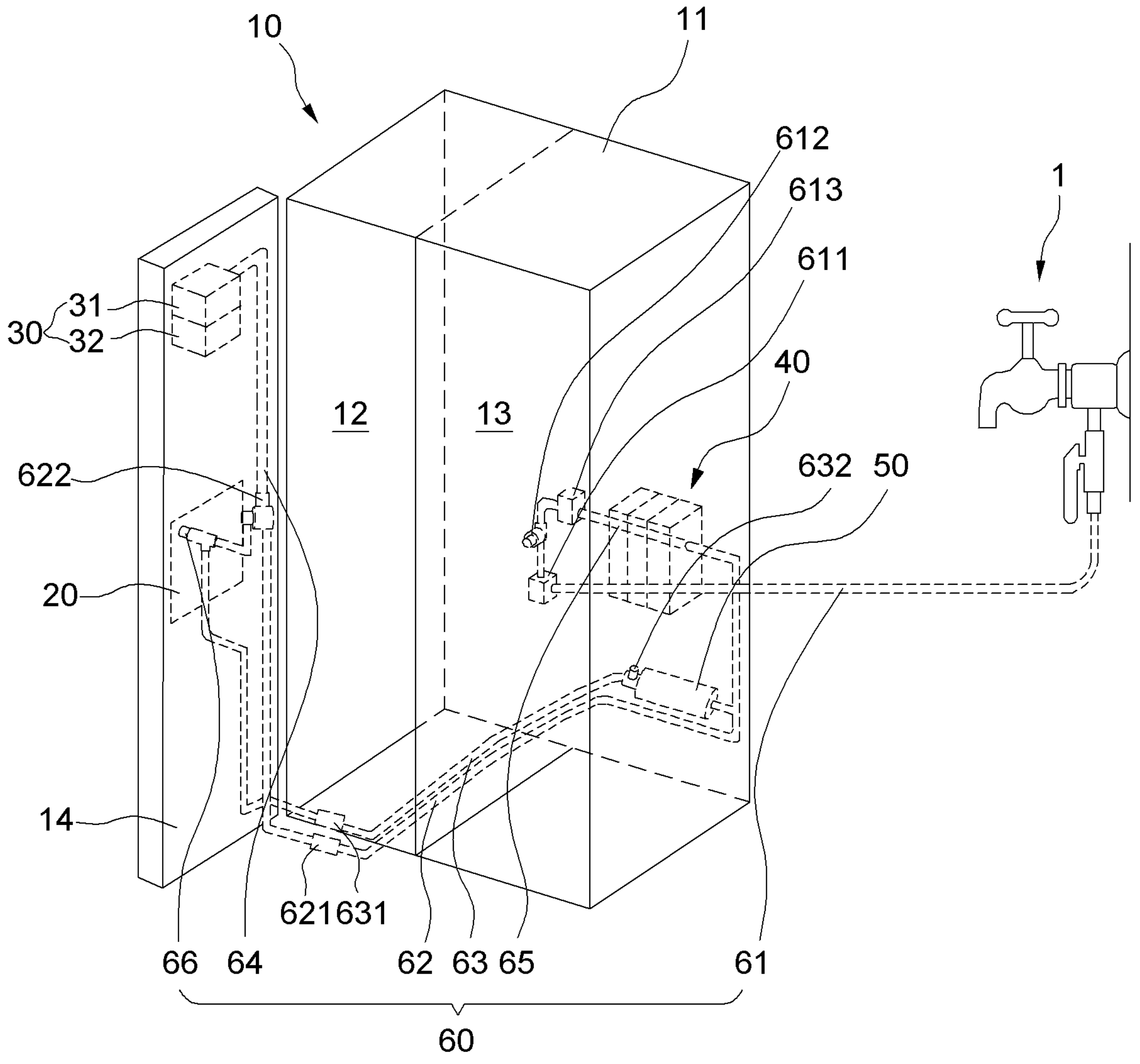
FIG. 2 is a schematic view illustrating an example arrangement of a passage through which water flows in the refrigerator.

FIG. 1 illustrates an example refrigerator, and FIG. 2 illustrates an example arrangement of a passage through which water flows in the refrigerator.

Referring to FIGS. 1 and 2, a refrigerator 10 includes a main body 11 defining a storage space having an opened front surface and one or more doors for opening or closing the storage space.

The storage space may vary in shape according to a kind and shape of the refrigerator. For example, although a freezing compartment 12 and a refrigerating compartment 13 are respectively defined at left and right sides with respect to a barrier as shown in FIG. 2, the present disclosure is not limited to a kind of refrigerator and an arrangement and number of freezing and refrigerating compartments.

The one or more doors may include a refrigerating compartment door 15 and a freezing compartment door 14. Upper and lower ends of the one or more doors are rotatably connected to the main body 11 by hinges (see reference numeral 16 of FIG. 8) to selectively open or close the refrigerating compartment 13 and the freezing compartment 12.

A dispenser 20 may be provided in a front surface of the freezing compartment door 14 or the refrigerating compartment door 15. For example, FIG. 1 illustrates a structure in which the dispenser 20 is provided in the freezing compartment door 14.

The dispenser 20 may dispense water or ice to the outside without opening the freezing compartment door 14. The dispenser 20 may have a shape that is recessed from the front surface of the freezing compartment door 14. The dispenser 20 will be described below in more detail.

An ice making device 30 may be provided on a back surface of the freezing compartment door 14. The ice making device 30 may freeze water supplied from the outside or a water supply tank provided within the main body 11 to make and store ice. For instance, the ice making device 30 may include an automatic ice maker 31 for making ice by using automatically supplied water to separate the made ice and an ice bank 32 disposed under the automatic ice maker 31 to store the ice separated from the automatic ice maker 31. The ice making device 30 may include an ice making device including an ice tray having grooves for making a plurality of ice pieces and an ejector for pumping and ejecting the ice formed in the plurality of grooves or an ice making device including an ice tray for separating ice while being rotated and twisted with respect to a horizontal rotation axis and a driving motor for rotating the ice tray.

Also, the ice bank 32 may be configured to communicate with an ice chute and the dispenser 20 and allow ice within the ice bank 32 to be dispensed through the dispenser 20 by manipulating a control panel provided on the dispenser 20. Also, a rotational blade and a fixed blade unit may be further provided in the ice bank 32 so that the stored ice may be dispensed in a cubed or crushed ice state by user's selection.

The refrigerator may include a filter device 40 for purifying water supplied from an external water supply source and a water tank 50 for storing the water purified by passing through the filter device 40. The water tank 50 may cool the water based on cool air within the storage space. The filter device 40 and the water tank 50 will be described below in more detail.

The refrigerator 10 may be connected to an external water supply source 1 to supply water into the dispenser 20 and the ice making device 30. Also, a water supply passage 60 connected to the water supply source 1, the filter device 40, the water tank 50, the dispenser 20, and the ice making device 30 to guide water flow is disposed in the main body 11 and the freezing compartment door 14.

The water supply passage 60 may include a supplied water passage 61 connecting the water supply source 1 including a water pipe provided outside the main body 11 to the filter device 40 provided in the main body 11, a purified water passage 62 for guiding the water purified in the filter device 40 to the dispenser 20, a cooled water passage 63 for guiding the water purified in the filter device 40 to the dispenser 20 via the water tank 50, and an ice making passage 64 branched or extending from the purified water passage 62 to guide the water purified in the filter device 40 to the ice making device 30.

The supplied water passage 61 may extend from the water supply source 1 to the inside of the main body 11 and be connected to the filter device 40. Here, the supplied water passage 61 includes at least two tubes with respect to the main body 11. The at least two tubes may be connected to a fitting member 611. The fitting member 611 may be disposed on a rear surface of the main body 11 to allow a user to selectively separate the tube of the supplied water passage 61 that is connected to the water supply source 1. Also, the fitting member may be connected to a sterilization device (see reference numeral 70 of FIG. 15) to sterilize and clean the water tank 50 and the water supply passage 60.

A water supply valve 612 may be provided in the supplied water passage 61. The water supply valve 612 may open the supplied water passage 61 to determine water supply into the filter device 40. The water supply valve 612 may be provided in one side of the main body 11. Also, the water supply valve 612 may be integrated with the fitting member 611.

The filter device 40 may be disposed in the refrigerating compartment 13. In this case, the supplied water passage 61 may extend up to the inside of the refrigerating compartment 13. A water purifying passage 65 may be defined within the filter device 40. The water purifying passage 65 may be connected to the supplied water passage 61 to purify the water supplied from the water supply source while passing the filter device 40.

The purified water passage 62 may connect the filter device 40 to the dispenser 20. The purified water passage 62 may extend from an outlet of the filter device 40 to a side of the dispenser 20 to supply the water purified in the filter device 40 to the dispenser 20.

The purified water passage 62 may extend from the refrigerating compartment 13 in which the filter device 40 is disposed to the freezing compartment door 14 in which the dispenser 20 is disposed. Also, the purified water passage 62 may pass through a hinge (see reference numeral 16 of FIG. 8) connecting the main body 11 to the freezing compartment door 14. Here, a fitting member 621 may be provided at the supplied water passage 61 corresponding to a position of the hinge 16 to connect the supplied water passage 61 that is divided into two door-side and main body-side parts to each other. Thus, when the refrigerating compartment door 15 is mounted or separated, the supplied water passage 61 may also be connected or separated.

Also, a purified water valve 622 may be provided in the purified water passage 62. The purified water value 622 may open the purified water passage 62 to selectively discharge the purified water to be dispensed into the dispenser 20. The purified water valve 622 may, for example, be a three way valve so that water supplied from the purified water passage 62 is divided and thus supplied into the dispenser 20 and the ice making device 30.

That is, the purified water valve 622 may be provided in the purified water passage 62. Also, the purified water passage 62 may be divided from the dispenser 20 or the freezing compartment door 14 and connected to the ice making passage 64 defined toward the ice making device 30. Thus, according to an operation of the purified water valve 622, the purified water passing through the filter device 40 may be directly dispensed into the dispenser 20 or supplied into the ice making device 30.

According to the embodiment, since the purified water and the cooled water are separately dispensed from the dispenser, when the dispensing of the purified water is selected, the dispensing of the cooled water may be prevented to reduce power consumption that is required for cooling the purified water.

The more the number of passages passing through the hinge increases, the more the possibility of the damage of the passage due to the twisting of the passage while the door rotates increases. Also, since the hole of the hinge, through which the passage passes, increases in size, the hinge may increase in size.

According to the embodiment, the two purified water passages may not be respectively connected to the dispenser 20 and the ice making device 30 by individually passing through the hinge. That is, the one purified passage 62 may pass through the hinge and then be branched by the purified water valve 622 within the freezing compartment door 14 and be connected to the dispenser 20 and the ice making device 30 to prevent the hinge from increasing in size and minimize the damage of the purified water passage while the door rotates.

Also, the purified water supplied through the ice making passage 64 may have a relative high temperature to reduce (e.g., prevent) freezing of water within the ice making passage 64 disposed in the freezing compartment door 14, thereby stably supplying water into the ice making device 30.

The cooled water passage 63 may extend from the refrigerating compartment 13 to the refrigerating compartment door 15. The cooled water passage 63 may be configured so that the water purified in the filter device 40 is supplied into the dispenser 20 after being cooled by passing through the water tank 50.

Here, the cooled water passage 63 may also be guided into the refrigerating compartment door 15 through the hinge (see reference numeral 16 of FIG. 8) and be connected by the fitting member 631.

The cooled water passage 63 may be branched from the outlet-side purified water passage 62 of the filter device 40 and then be connected to the water tank 50. Also, a cooled water valve 632 may be provided in the cooled water passage 63 to selectively open or close the cooled water passage 63 so that the cooled water to be dispensed into the dispenser 20 is selectively discharged.

The cooled water valve 632 may be provided in the cooled water passage 63 between the water tank 50 and the dispenser 20. The water supply into the dispenser 20 may be determined by the opening/closing of the cooled water valve 632.

Here, the cooled water passage 63 and the purified water passage 62 may be classified according to whether the passages 63 and 62 pass through the water tank 50. That is, since a water passage connected to the water tank 50 may be a cooled water passage, passages except for the cooled water passage may be purified water passages. For instance, the water passing through the water tank 50 may be cooled by the cool air within the refrigerating compartment to become cooled water. Also, the water that does not pass through the water tank 50 may be supplied into the dispenser 20 or the ice maker while being maintained at an original temperature of the water.

Figure 3:
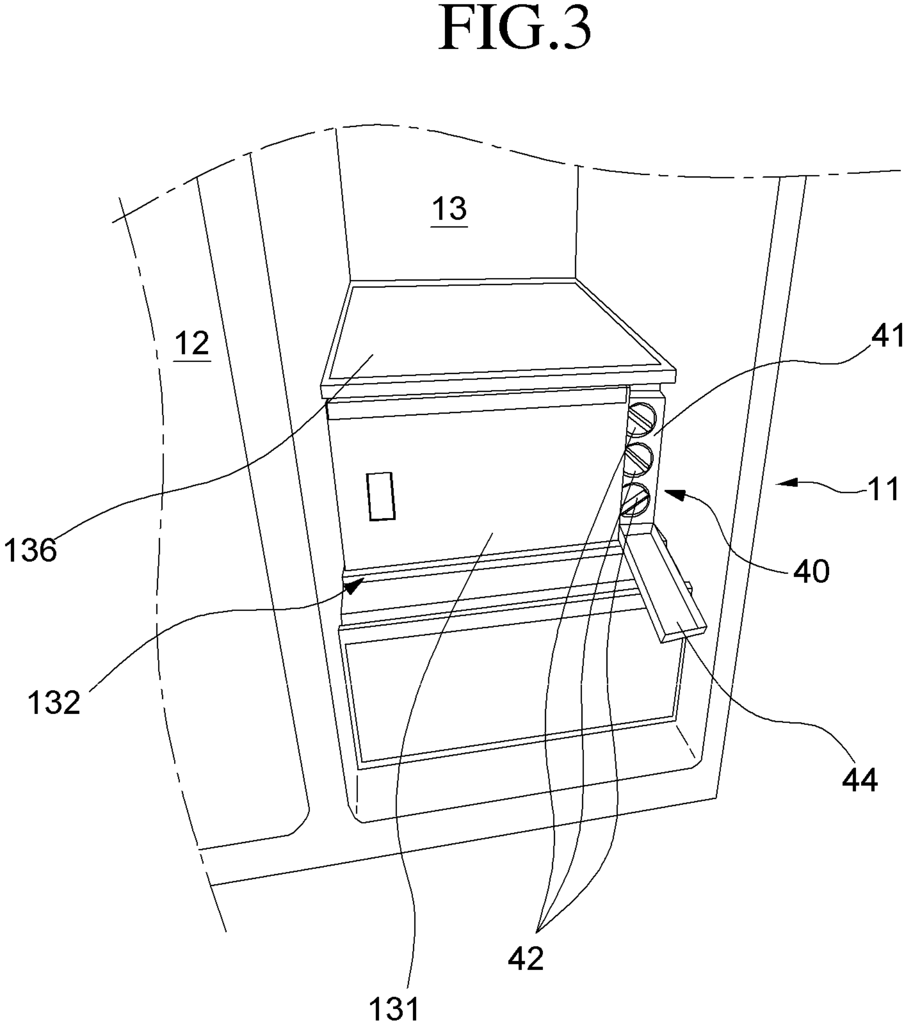
FIG. 3 is a partial perspective view illustrating a portion of an inner space of the refrigerator.
Figure 4:
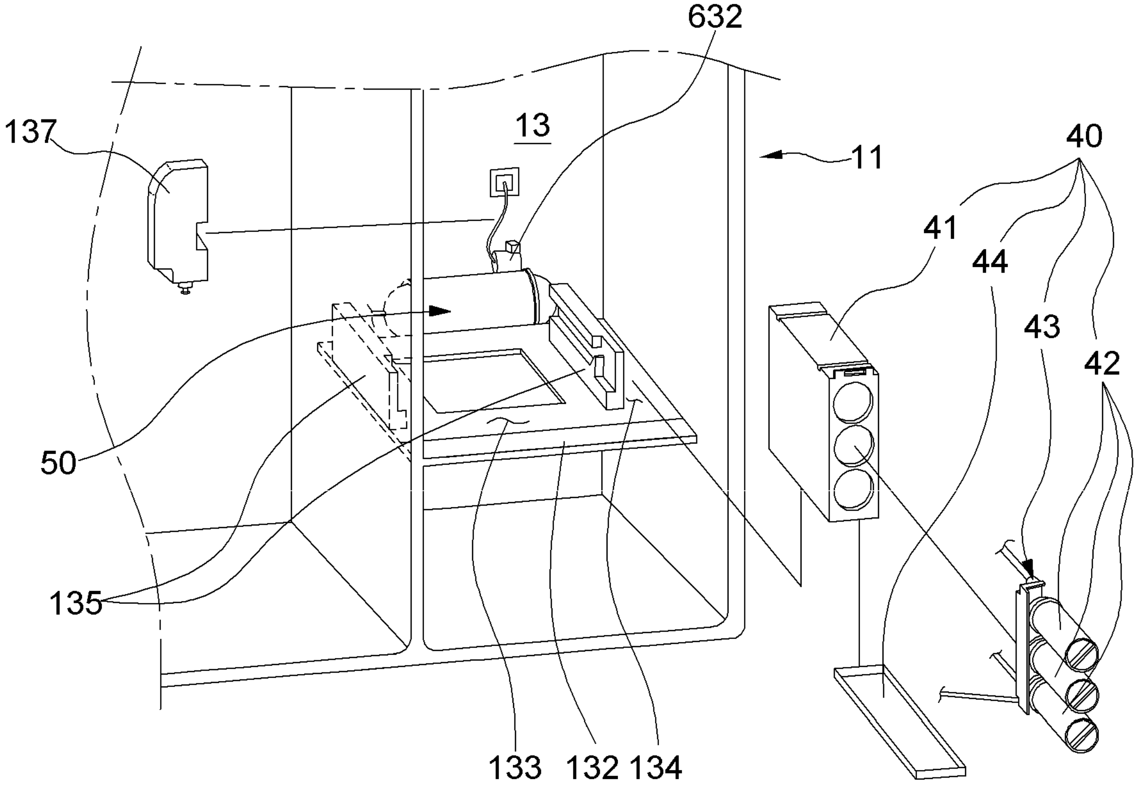
FIG. 4 is a view illustrating example mounted states of an example water tank and an example filter.

FIG. 3 illustrates a portion of an example inner space of the refrigerator, and FIG. 4 illustrates example mounted states of an example water tank and an example filter.

Referring to FIGS. 3 and 4, a plurality of receiving members 131, such as a drawer and a shelf, may be provided in the refrigerating compartment 13. A receiving space having various shapes and partitioning the inside of the refrigerating compartment 13 may be defined by the receiving member 131. Also, the receiving member 131 and the filter device 40 may be disposed adjacent to each other.

A support member 132 may be disposed on a side of the refrigerating compartment 13. The support member 132 may support the receiving member 131 and the filter device 40 upward. The support member 132 may be disposed on a bottom surface of the refrigerating compartment 13 or a top surface of another receiving member. Also, the support member 132 may have a plate shape that horizontally partitions the inside of the refrigerating compartment 13.

The top surface of the support member 132 may be divided into two areas, such as a receiving member mounting area 133 on which the receiving member 131 is mounted and a filter device mounting area 134 on which the filter device 40 is mounted. Also, a pair of entrance guides 135 for guiding forward and backward sliding of the receiving member 131 may be disposed on each of both sides of the receiving member mounting area 133.

Also, the filter device 40 may be disposed on the filter device mounting area 134 between the receiving member 131 and an inner wall of the refrigerating compartment 13. Further, the filter device 40 may have a front and top surface that is flush with those of the receiving member 131. Thus, the filter device 40 may be in unity with the receiving member 131 inside the refrigerating compartment 13. In addition, a shelf 136 may be mounted above the filter device 40 and the receiving member 131 to cover the receiving member 131 and the filter device 40 at the same time.

Rear surfaces of the receiving member 131 and the filter device 40 may be spaced apart from a rear wall of the refrigerating compartment 13 and the water tank 50 may be disposed at the rear sides of the receiving member 131 and the filter device 40. In this example, the water tank may be accommodated in the space. That is, the water tank 50 may have a size, which is enough to be accommodated between the receiving member 131 and filter device 40 and the wall of the refrigerating compartment 13, to store water therein. Water purified by the filter device 40 may be stored n the water tank 50. Then, the water may be cooled by cool air within the refrigerating compartment, and thus, the cooled water may be supplied into the dispenser 20.

Also, the water supply passage 60 is connected to the water tank 50. Thus, the water tank 50 may be fluidly connected to the filter device 40 by the water supply passage 60. Further, the cooled water passage 63 connected to the dispenser 20 may be disposed in a space in which the water tank 50 is disposed. The cooled water valve may be fixedly mounted on the rear wall of the refrigerating compartment 13 that corresponds to an upper side of the water tank 50. For safety, the cooled water valve 632 may be covered by a valve cover 137. As described above, portions of the water tank 50, the cooled water valve 632, and the water supply passage 60 may be disposed in the space, in which the water tank 50 is disposed, e.g., a space defined between the rear wall of the refrigerating compartment and the rear surfaces of the receiving member 131 and the filter device 40.

As described above, the receiving member 131 may have the same length as the filter device 40 in forward and backward directions. Also, the front surface of the receiving member 131 may be flush with that of the filter device 40.

According to the embodiment, the plurality of filters may be vertically disposed and also be disposed in the space between the drawer and the sidewall of the refrigerating compartment in the front and rear direction to maximally secure the food storage space such as the drawer.

If each of the plurality of filters is disposed to extend in a left and right direction within the refrigerating compartment, when the water leakage occurs at the connection portion between the plurality of filters, the leaking water may be spread to the whole refrigerating compartment. However, according to the current embodiment, since the plurality of filters are vertically disposed and also disposed to extend in the front and rear direction, even through the water leakage occurs, the contact between the leaking water and the refrigerating compartment may be minimized.

Also, according to the current embodiment, the water tank may be disposed outside the case between the receiving member such as the drawer and the rear sidewall of the refrigerating compartment. Thus, since the water tank has a diameter that is greater than that of the filter, the storage capacity of the cold water may increase to prevent the case from unnecessarily increasing in size. If the water tank has a diameter that is equal or similar to that of the filter, the reduction of the storage capacity of the cold water may be easily detected.

Figure 5:
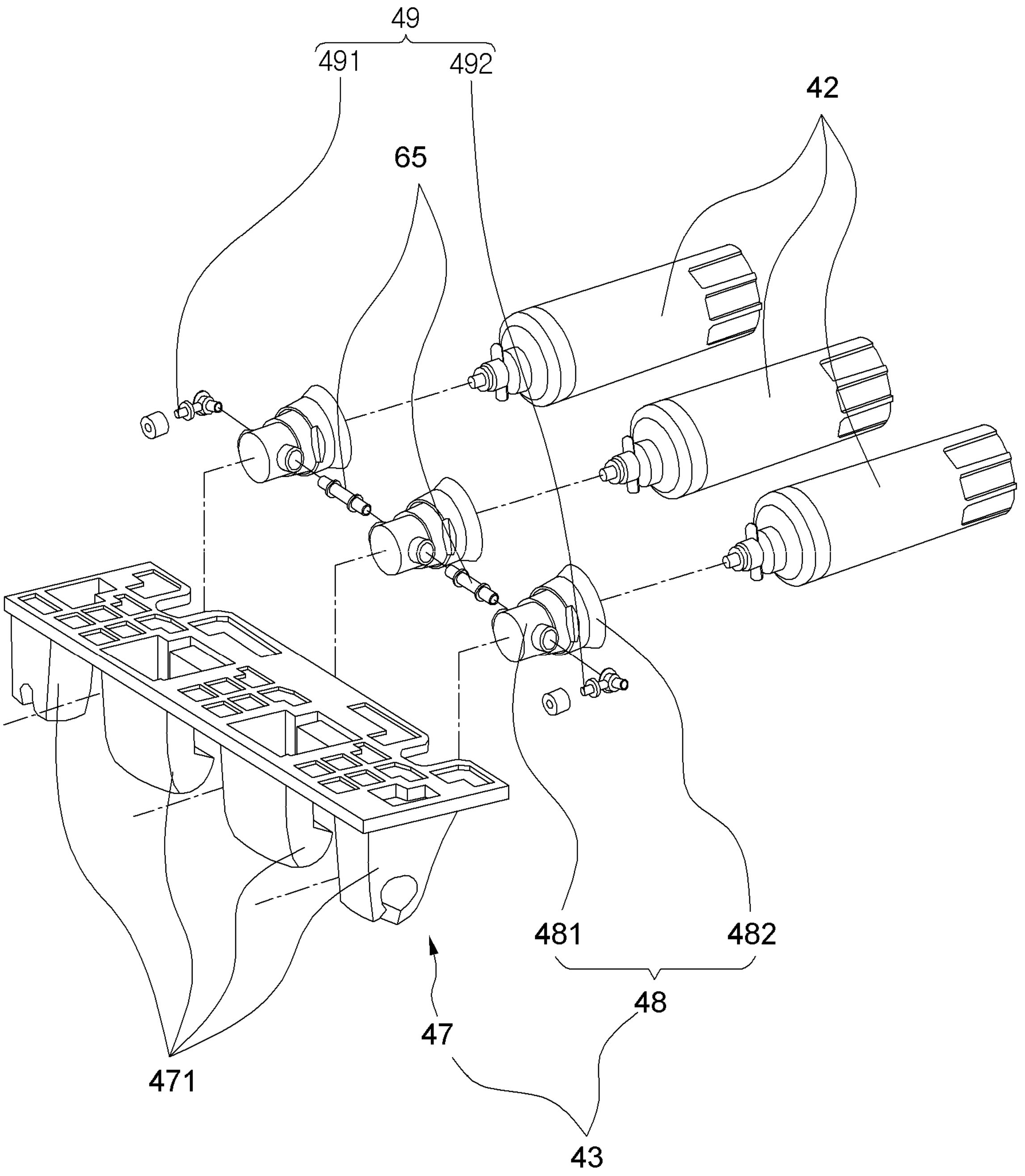
FIG. 5 is an exploded perspective view of the filter.
Figure 6:
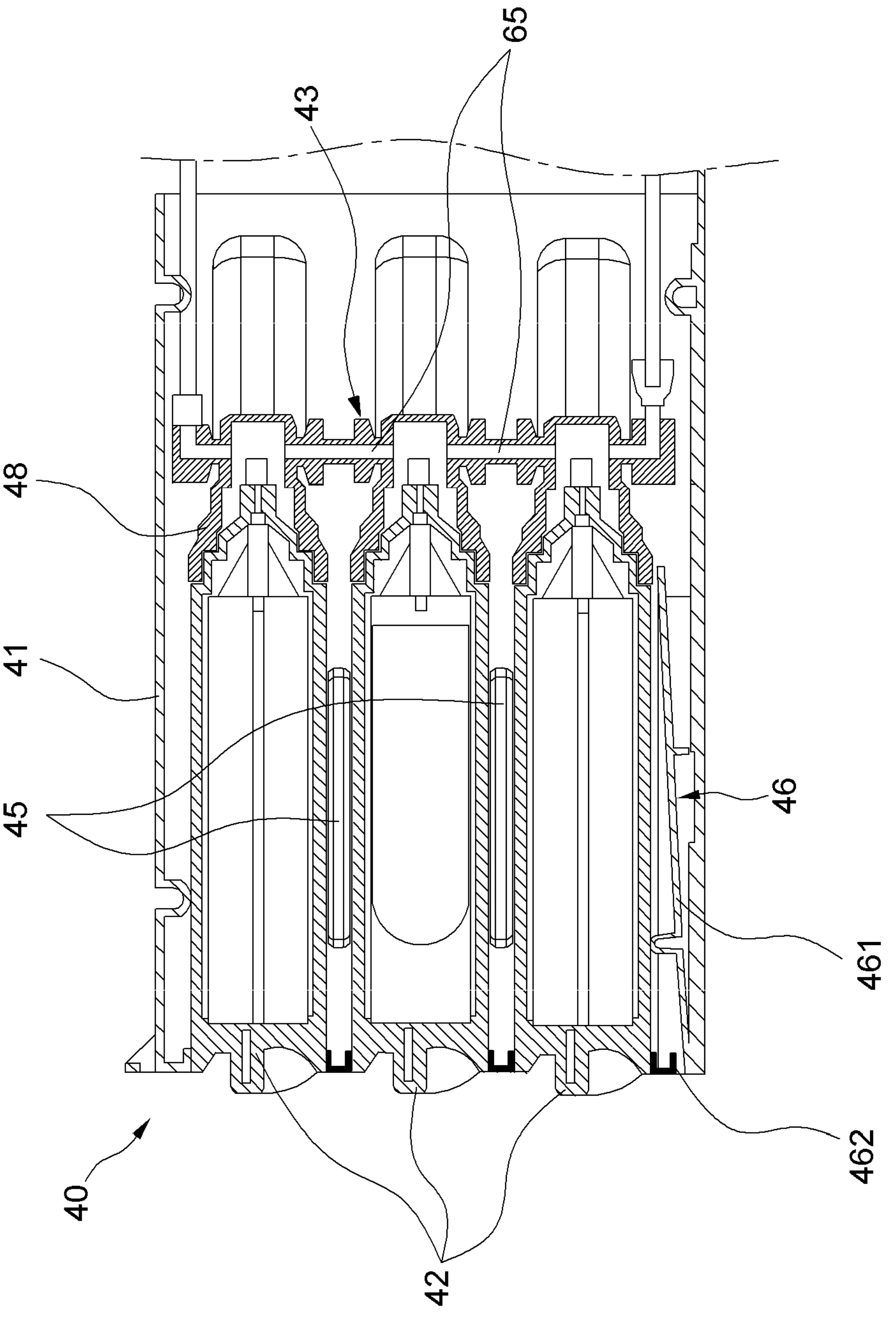
FIG. 6 is a cross-sectional view of the filter.

FIG. 5 illustrates an example of the filter, and FIG. 6 is a cross-sectional view of the filter.

Referring to FIGS. 5 and 6, the filter device 40 may include a plurality of filters 42, a case 41 that accommodates the plurality of filters 42 and defines an outer appearance of the filter device 40, and a connector 43 connecting each of the plurality of filters 42 to the water supply passage 60.

In some implementations, the case 41 may have a rectangular shape with an opened front surface. A plurality of filters 42 may be vertically arranged within the case 41 in a state where each of the plurality of filters 42 is horizontally disposed. Also, a case cover 44 may be disposed on a front surface of the case 41. The case cover 44 may rotate about the opened cover of the case 41 to cover the case 41. When the case cover 44 is closed, the front surface of the case cover 44 may be flush with that of the receiving member 131.

A plurality of insertion holes into which the plurality of filters 42 are respectively inserted may be defined in the case 41.

Also, a mount guide 45 may be disposed within the case 41. The mount guide 45 may extend in a direction parallel to an insertion direction of the filters 42. Each of the filters 42 may extend by a predetermined length from a point that is spaced from a connector 43 to which the filter 42 is fixed. The mount guide 45 may protrude from each of left and right surfaces of the case 41 in a direction opposite to each other, e.g., in a central direction of the case 41. Also, the mount guide 45 may have a curvature corresponding to an outer diameter of the filter 42. Thus, when the filter 42 is mounted, the filter 42 may be easily mounted to the connector 43.

A drain member 46 may be provided in the case 41. For example, the drain member 46 may be provided in an inner lower portion of the case 41, e.g., a bottom surface of the case 41. The drain member 46 may collect remaining water that is generated when the filter is detached. The drain member 46 may be provided in the bottom surface of the case 41 and have the same structure as a tray.

The drain member 46 may have an inclined surface 461 that is inclined downward from a rear portion thereof to guide water dropping from an upper side thereof to a front side. Also, an opening 462 for discharging the water collected by the drain member 46 may be defined in the drain member 46 or the case 41. For example, the opening 462 may be defined in the front surface of the case 41, more particularly, in a lower portion of the front surface of the case 41.

The filter 42 may be inserted into the case 41 and the plurality of filters 42 may have functions different from each other. For example, a reverse osmosis pressure filter may be used as the filter 42. In addition, three or more filters 42 may be combined with each other.

Also, the connector 43 may be disposed within the case 41. The connector 43 may include a bracket 47 fixed to the rear surface of the case 41, at least one socket 48 mounted on the bracket 47, and two stem connectors 49 provided on left and right sides of the bracket 47. The bracket 47 may be fixed to the inner surface of the case 41 to fix the filter 42 when the filter 42 is mounted. Also, the supplied water passage 61 may be connected to a first stem connector 491 that is disposed at the left side of the bracket 47, and the purified water passage 62 may be connected to a second stem connector 492 that is disposed at the right side of the bracket 47. Also, the two stem connectors 49 may be connected to each other through the water purifying passage 65. The water purifying passage 65 may communicate with the plurality of filters 42. Thus, the water purifying passage 65 may be defined as a passage that passes through the filter 42 from the first stem connector 491 to extend to the second stem connector 492.

A plurality of socket mount parts 471 may protrude from points of the bracket 47, which are spaced apart from each other, respectively. Also, the socket 48 may be mounted between the socket mount parts adjacent to each other. Here, the socket 48 may be rotatably mounted with respect to the water purifying passage 65.

Thus, when an end of the filter 42 is inserted into the socket 48 while the filter 42 is mounted, the socket 48 and the end of the filter 42 may be aligned with each other while being rotated. Thus, the socket 48 and the filter 42 may be coupled to each other in position.

The socket 48 may include a head part 481 mounted on the socket mount part 471 and a receiving part 482 in which the end of the filter 42 is accommodated. The head part 481 may be disposed between two adjacent socket mount parts 471 and may be rotatably mounted on the socket mount part 471. Also, the receiving part 482 may have a shape corresponding to that of the end of the filter 42. Further, a fitting member may be provided on the receiving part 482 that supplies water into the receiving part 482 when the filter is mounted, and prevents water from leaking when the filter 42 is separated. In some examples, a separate cap may be mounted to prevent water from leaking after the filter 42 is separated.

The plurality of socket mount parts 471 may be connected by the water purifying passage 65. The water purifying passage 65 may be provided as one tube to pass through the socket mount parts 471 or may include a plurality of tube structures connecting the socket mount parts 471 to each other. The water purifying passage 65 may be connected to the supplied water passage 61 and the purified water passage 62. Thus, the water supplied into the filter device 40 may successively pass through the filter device 40 and then be supplied into the purified water passage 62.

When the filter is separated, and the cap is mounted on the socket 48, the purified water for purifying the passage may pass through the filter device 40 by the water purifying passage without passing through the filter 42.

Also, the user may grasp each of the filters 42. For this, the each of the filters 42 may include a handle that is inclined at a predetermined angle with respect to a vertical line in the state in which each of the filters 42 is mounted on the connector 43.

Figure 7:
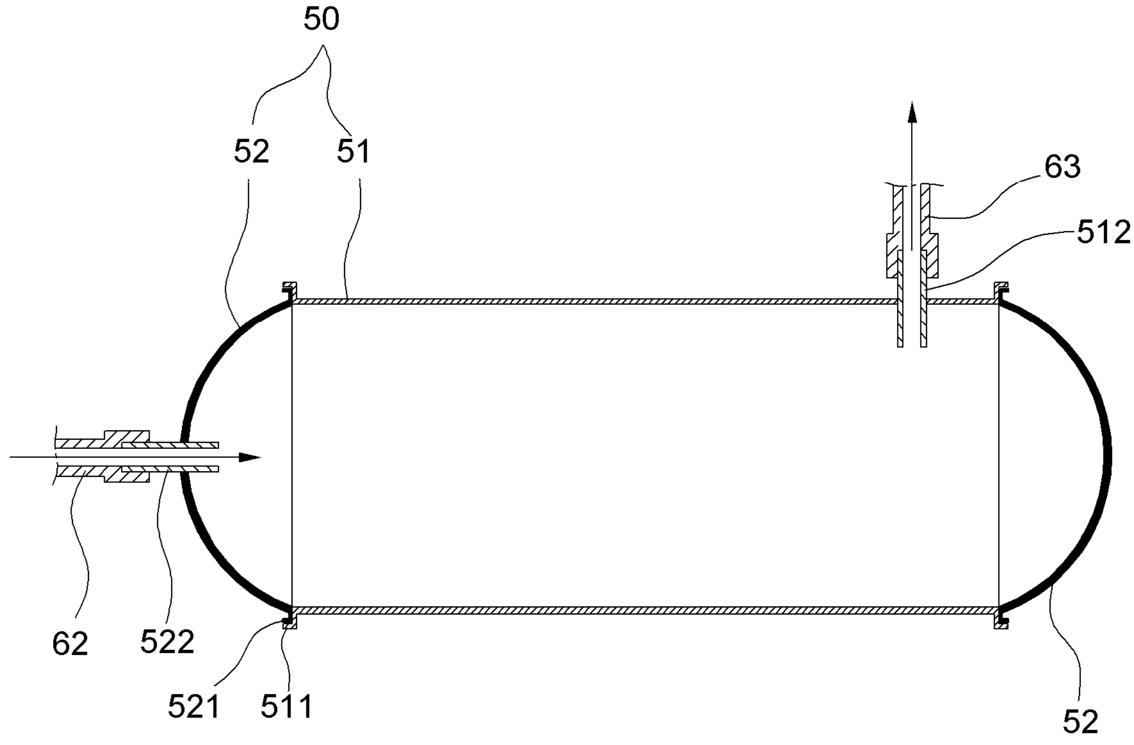
FIG. 7 is a cross-sectional view of the water tank.

FIG. 7 is a cross-sectional view of an example water tank.

Referring to FIG. 7, the water tank 50 may be formed of a metal material. The water tank 50 may have a cylindrical shape having a predetermined space for receiving water therein. The water tank 50 may be formed of a stainless material. Thus, the water tank 50 may have superior heat conductivity to effectively cool the received water by the cooled air supplied into the refrigerator and may prevent foreign substances, such as dust, from occurring therein. The water tank 50 may be disposed to cross the at least one filter 42.

Also, the water tank 50 may have a cylindrical shape that lengthily extends in a transverse direction. The water tank 50 may have left and right ends that each have a hemispherical shape. For instance, the water tank 50 may include a tank body 51 having a cylindrical shape and a tank cap 52 having a hemispherical shape to cover both opened left and right ends of the tank body 51.

The tank body 51 may be molded in the cylindrical shape with both opened left and right sides by winding the ends of the plate-shaped stainless material to weld and bond ends of the stainless material to each other. Also, both opened left and right ends of the tank body 51 may be bent to form a body flange 511.

The tank cap 52 may be formed of the same stainless material as the tank body 51. The tank cap 52 may have a size and hemispherical shape that are enough to cover both opened left and right sides of the tank body 51. Thus, the water tank 50 may have a pressure container shape so that the water tank 50 is not damaged or broken even though high pressure occurs in the water tank 50. Also, the tank cap 52 may be molded by press processing. A cap flange 521 contacting the body flange 511 may be bent and disposed on a circumference of the tank cap 52.

In the current embodiment, since the tank cap 52 has a hemispherical shape, an angular edge may not exist at the water tank 50 to prevent foreign substances from being caught in the angular edge. Also, since the angular edge does not exist at the water tank 50, cleanability during the cleaning may be improved.

Thus, the body flange 511 and the cap flange 521 may be welded or bonded to each other in a state where the body flange 511 and the cap flange 521 are in contact with each other to couple the tank cap 52 to both sides of the tank body 51.

In the state in which the cap flange 521 and the body flange 511 are coupled to each other, a space may be defined between a portion of the cap flange 511 and an outer surface of the tank cap 52.

Also, the water tank 50 may be disposed in the refrigerating compartment so that a virtual line passing through the pair of tank caps 52 is in parallel with the bottom surface of the refrigerating compartment.

A water inlet tube 522 through which water purified in the filter device 40 is supplied and a water outlet tube 512 through which water stored in the water tank 50 is discharged are provided in the water tank 50.

The water inlet tube 522 may be inserted to pass through a central portion of one tank cap 52 of both side tank caps 52 and may be connected to an outlet of the filter device 40 by the purified water passage 62. Thus, the water purified in the filter device 40 may be introduced into the water tank 50 through the water inlet tube 522.

The water outlet tube 512 may be inserted to pass through the tank body 51 that is adjacent to the tank cap 52 in a direction opposite to that of the water inlet tube 522. The water outlet tube 512 may extend in a vertical direction. The water outlet tube 512 may be disposed away from the water inlet tube 522 to discharge the water through the water outlet tube 512 after the water introduced through the water inlet tube 522 is sufficiently cooled. Also, the water outlet tube 512 is disposed to pass through the top surface of the tank body 51, thereby discharging the water in a state where the water within the water tank 50 is maintained to a full water level state. Then, the water may be sufficiently cooled while the water is supplied into the water tank 50 to reach the full water level state. Also, the water outlet tube 512 may be connected to the cooled water passage 63 to supply the cooled water to the dispenser 20. The water flowing along the purified water passage 62 without passing through the water tank 50 may be supplied into the ice maker 31 or the dispenser 20 in a non-cooled state.

Since the water outlet tube 512 is disposed on a top surface of the tank body 51, bubbles existing within the tank body 51 may be discharged together with water of the tank body 51 through the water outlet tube 512 to prevent an amount of water stored in the tank body 51 from being reduced. That is, since water does not exist in a region in which the bubbles exist in the tank body 51, if bubbles exist, an amount of water stored in the tank body 51 may be reduced. However, according to the current embodiment, since the water outlet tube 512 is disposed on the top surface of the tank body 51, the bubbles 51 may be discharged to the water outlet tube 512 to prevent the storage space of the water from being reduced by the bubbles. Thus, an amount of water to be cooled may be increase.

Also, when the cleaning water is injected through the water inlet tube 522 during the cleaning, a flow direction of the cleaning water within the tank may be changed to allow the cleaning water to be discharged through the water outlet tube 512. Thus, the cleaning water may uniformly clean the inside of the water. As described above, since the angular edge does not exist at the water tank 50, the cleanability of the water tank 50 may be improved.

If the water tank 50 is formed of a plastic material, thermal transfer within the water tank 50 itself may not be smooth, and thus, colder water may be disposed in a lower portion of the water tank 50. However, according to the current embodiment, since the water tank 50 is formed of a stainless material, the thermal transfer between the upper and lower sides of the water tank 50 may be smooth. Thus, even though the water outlet tube 512 is disposed at the upper portion of the water tank 50, water may be sufficiently cooled and then discharged.

The water inlet tube 522 and the water outlet tube 512 may be formed of the same stainless material as the water tank 50. Also, the water inlet tube 522 and the water outlet tube 512 may be respectively coupled to the tank cap 52 and the tank body 51 through welding. Further, the water inlet tube 522 may be connected to an outlet end of a branch tube that is branched from one point of the purified water passage 62 extending to the filter device 40. In addition, the water outlet tube 512 may be connected to an inlet end of the cooled water passage 63 connecting the water tank to the dispenser 20.

A cooled water valve 632 may be provided at a predetermined position of the cooled water passage 63 that is adjacent to the water outlet tube 512. The cooled water valve 632 may be opened or closed by manipulation of the dispenser 20 to determine whether the cooled water is supplied. In a state where the cooled water valve 632 is closed, the inside of the water tank 50 may be maintained in the full water level state.

Figure 8:
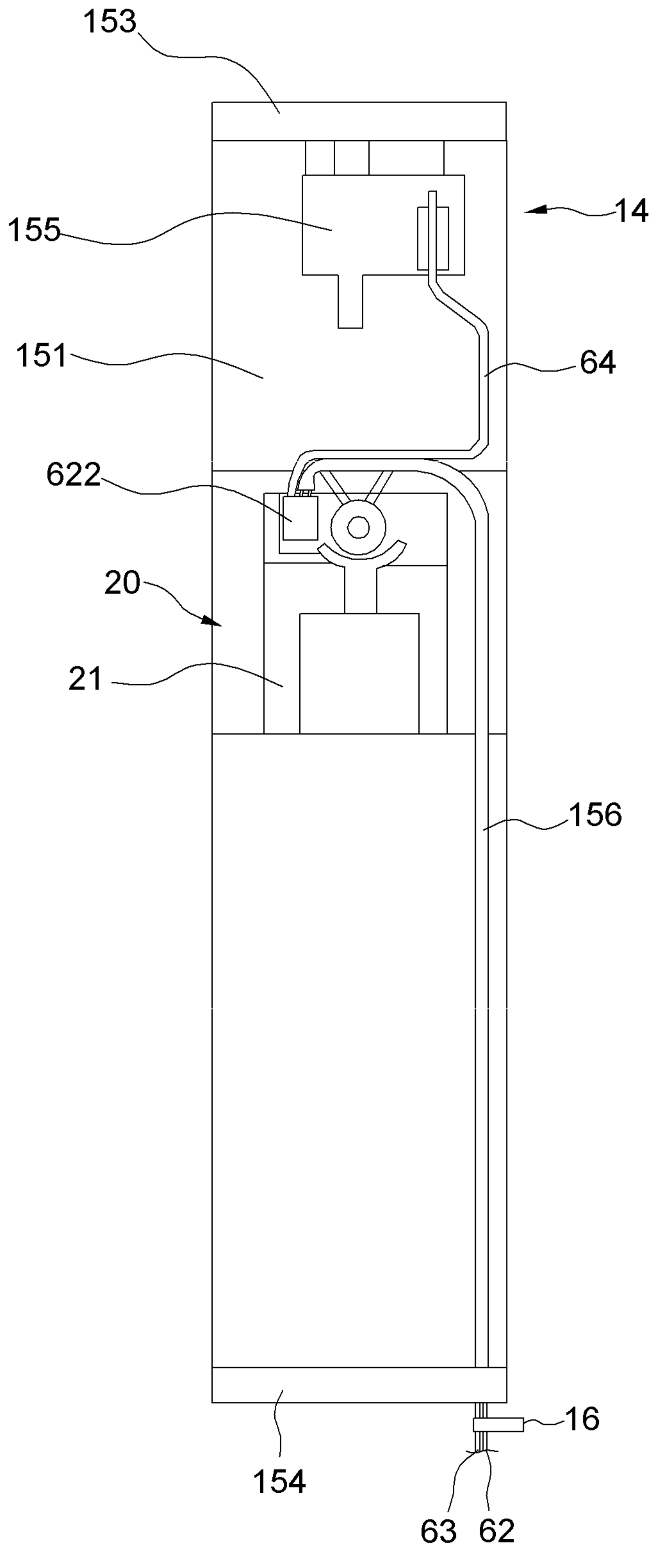
FIG. 8 is a view illustrating an example of an inside of a refrigerator door.

FIG. 8 illustrates an example of the inside of the refrigerator door. That is, FIG. 8 illustrates a back surface of an outer door in which a door liner is removed.

Referring to FIG. 8, the freezing compartment door 14 may include an outer door 151 defining an outer appearance of a front surface of the freezing compartment door 14, a door liner coupled to a back surface of the outer door 151 to define a back surface of the freezing compartment door 14, and upper and lower cap decos 153 and 154 respectively defining top and bottom surfaces of the freezing compartment door 14. Also, an insulation material may be filled into the freezing compartment door 14.

A guide bracket 155 may be provided on an upper portion of the freezing compartment door 14. The guide bracket 155 may be fixedly mounted on a back surface of the outer door 151 at a position corresponding to that of the ice making device 30. Also, an end of the ice making passage 64 extending to the ice making device may be fixed to the guide bracket 155. Further, a receptacle may be provided so that the guide bracket 155 is electrically connected to the ice making device 30. Thus, when the freezing compartment door 14 is molded, the insulation material may be foamed and filled between the outer door 151 and the door liner in a state where the ice making passage 64 and the receptacle are fixed to the guide bracket 155. Then, while the insulation material is foamed, a phenomenon in which the end of the ice making passage 64 and the receptacle are changed in position may not occur. For example, if the outlet end of the ice making passage 64 is changed in position while the insulation material is foamed, it may be difficult to supply water at an accurate position. Also, if the receptacle is changed in position, a connection terminal provided on the ice making device 31 may not be connected to the receptacle.

In some implementations, the dispenser 20 may be provided in the freezing compartment door 14. In these implementations, a dispenser housing 21 constituting the dispenser may be mounted on the outer door 151, and the purified water passage 62 and the cooled water passage 63 are guided to a side of the dispenser housing 21.

As shown, a passage guide 156 may be provided inside the freezing compartment door 14. The passage guide 156 may guide the purified water passage 62 and the cooled water passage 63 which are guided to the side of the dispenser 20. The passage guide 156 may have a tube shape to accommodate the purified water passage 62 and the cooled water passage 63.

The passage guide 156 may extend to a side of the dispenser housing 21 from a side of the lower deco 154 to which a hinge 16 rotatably supporting a lower portion of the freezing compartment door 14 is connected. Here, an opened end of the passage guide 156 may pass through the lower deco 154 to communicate with the outside of the lower deco 154, and the other end of the passage guide 156 may communicate with the dispenser housing 21. Thus, after the freezing compartment door 14 is molded and assembled, the purified water passage 62 connected to a spout of the dispenser 20 may be separated from the cooled water passage 63. Then, the purified water passage 62 and the cooled water passage 63 may be withdrawn to the outside through the lower end of the passage guide 156 and then be treated for necessary service. Also, when the service is finished, the purified water passage 62 and the cooled water passage 63 may be inserted into the passage guide 156 through the lower end of the passage guide 156 and connected to the spout of the dispenser 20. As described above, since the passage guide 156 surrounds the purified water passage 62 and the cooled water passage 63, even though the door-side passage is impacted in the use of the refrigerator, a servicer may easily repair the purified water passage 62 and the cooled water passage 63.

The purified water passage 62 and the cooled water passage 63 which are guided to the dispenser 20 through the end of the passage guide 156 may be connected to the purified water valve 622 and the connection member 662 at a side of the dispenser 20. This will be described below in more detail.

Figure 9:
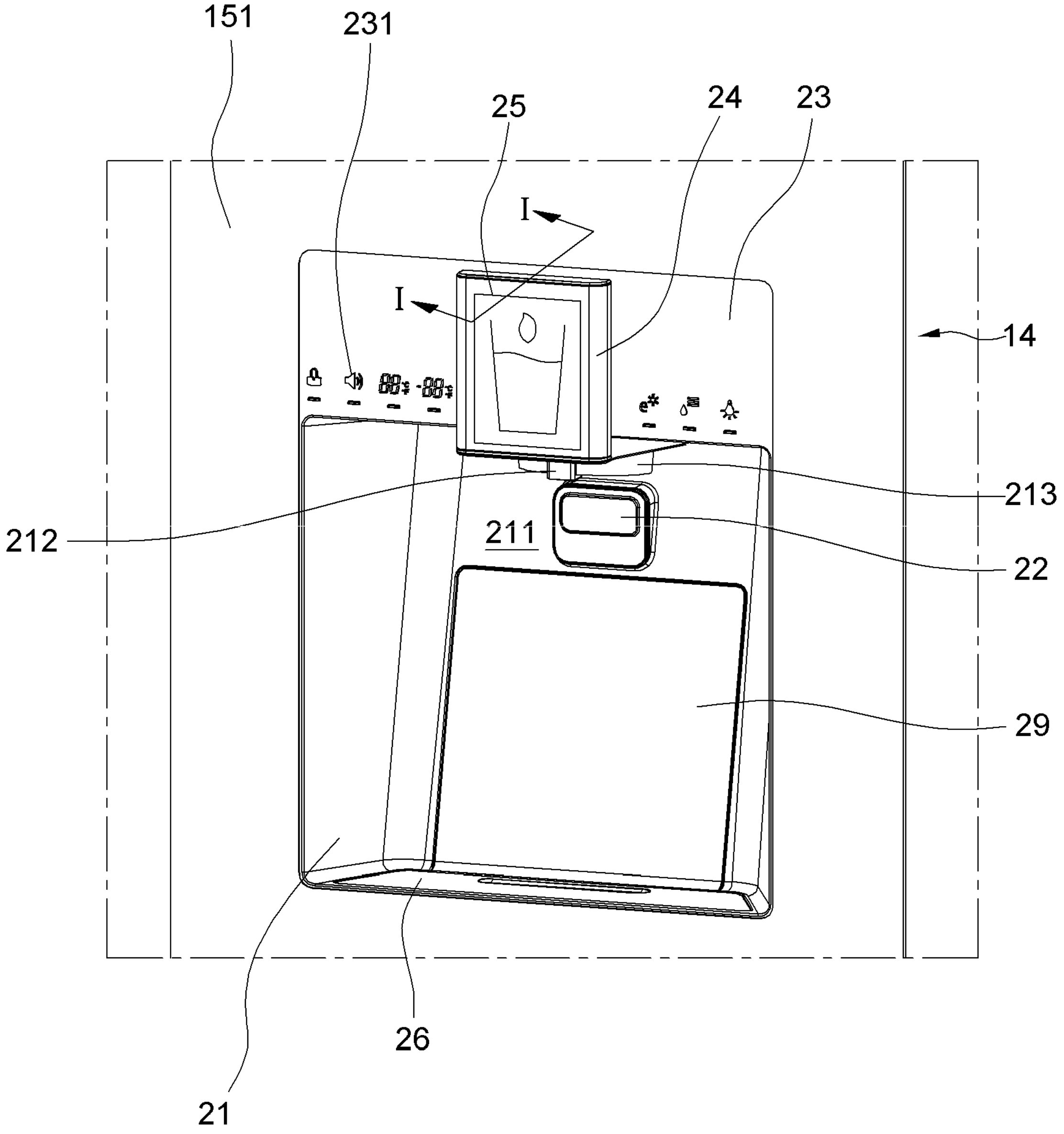
FIG. 9 is a perspective view of an example dispenser.
Figure 10:
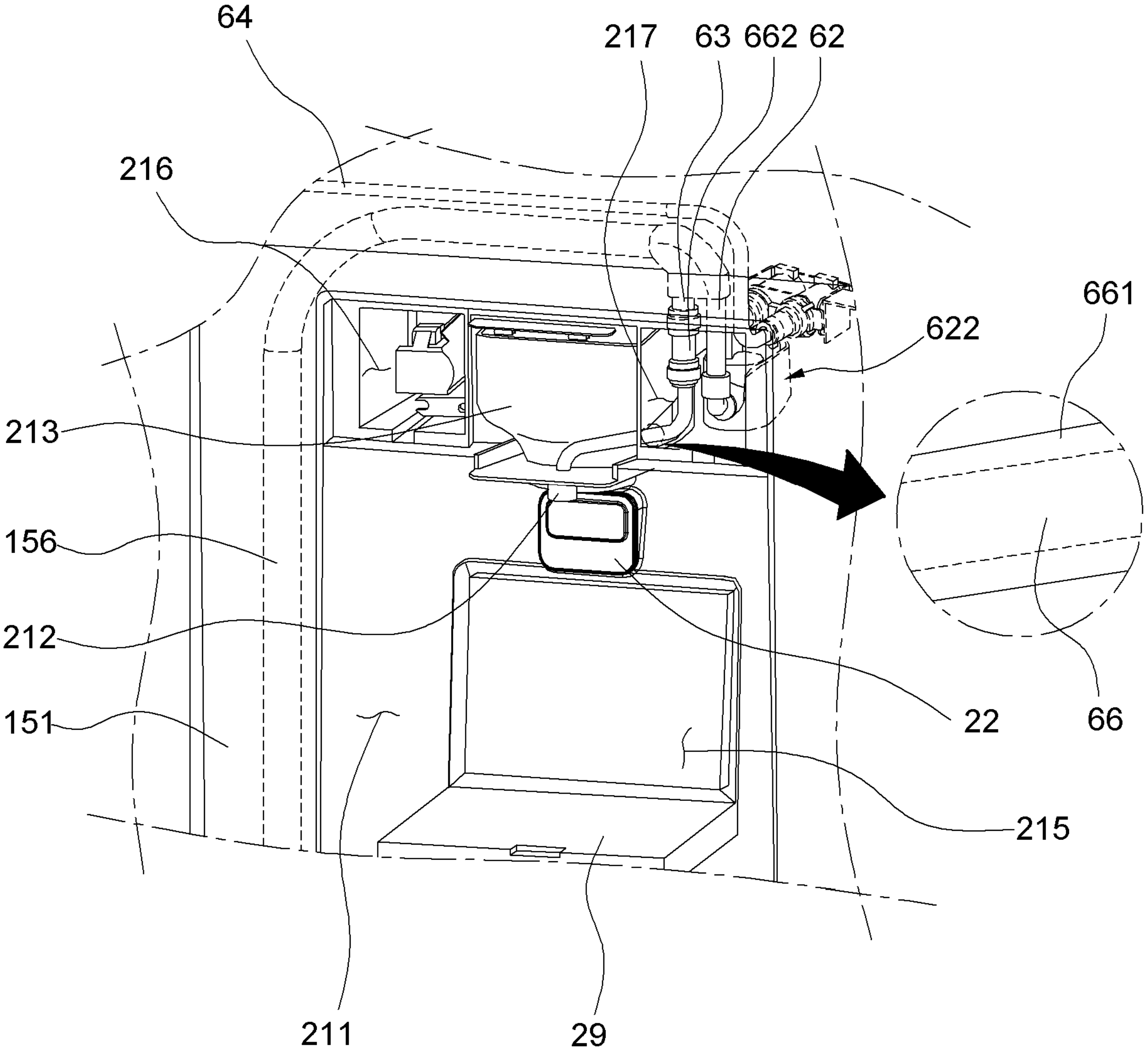
FIG. 10 is a perspective view of an example state in which a cover plate of the dispenser is removed.

FIG. 9 illustrates an example dispenser, and FIG. 10 illustrates an example state in which a cover plate of the dispenser is removed.

Referring to FIGS. 9 and 10, a hole having a size corresponding to that of the dispenser 20 is defined in the outer door 151 defining the outer appearance of the freezing compartment door 14. The dispenser 20 is mounted on the hole.

The entire configuration of the dispenser 20 may be determined by the dispenser housing 21. The dispenser housing 21 may form a recessed cavity 211 of the dispenser 20. A water chute 212, an ice chute 213, an input part and push pad 22 for manipulating the dispenser 20, a display part 231 for displaying a state of the dispenser 20, and a display 25 for displaying an operation state of the selection mode as a moving picture or an image. The dispenser 20 or the freezing compartment door may further include an input part that is capable of selecting a sterilization mode for sterilizing the purified water passage and the cooled water passage. Alternatively, the input part for selecting the sterilization mode may be provided on the display 25.

In some examples, the dispenser housing 21 may be manufactured by bonding one or more plastic injection-molded materials. The dispenser housing 21 may be mounted on the outer door 151. Also, the dispenser housing 21 may form the cavity 211 for locating a container, such as a cup, when water is dispensed.

A container tray 29 for supporting the container may be rotatably mounted on a rear surface of the cavity 211. Also, a portion of the dispenser housing 21 defining the rear surface of the cavity 211 may be recessed backward to form a tray seat part 215. The container tray 29 may be seated on the tray seat part 215. A surface of the container tray 29 that is exposed to the outside in a state where the container tray 29 is accommodated in the tray seat part 215 may form a portion of the rear surface of the cavity 211. Here, the container tray 29 may be defined by a front surface that is exposed to the outside in the state where the container tray 29 is seated on the tray seat part 215 and a rear surface on which the container is placed in a state where the rear surface is horizontally rotated. Further, the front surface of the container tray 29 may be flush with the dispenser housing 21 in the state where the container tray 29 is seated on the tray seat part 215. Thus, when viewed from the outside, the container tray 29 may not be easily identified, and may be recognized as a portion of the dispenser housing 21.

Also, the push pad 22 that inputs a command for dispensing water or ice may be provided on the rear surface of the cavity that corresponds to an upper side of the container tray 29. The push pad 22 may manipulate start or stop of the water or ice dispensing. The push pad 22 may be disposed at a center of an upper portion of the cavity 211 so that the push pad 22 is easily pushed by a user in a state where the user grips the cup or container, and at a location where the cup or container easily receives water or ice in the state where the push pad 22 is pushed. That is, centers of the water chute 212, the ice chute 213, and the push pad 22 may be defined on one vertical surface. Also, the one vertical surface may be a vertical surface that equally divides the dispenser 20 in a left/right direction.

The water chute 212 may be disposed at the center of the upper portion of the cavity 211 and coupled to an outlet of a dispensing passage 66 through which purified or cooled water is dispensed. The connection member 662 that will be described below in more detail is connected to the dispensing passage 66. The connection member 662 is disposed from a right side of the dispenser 20 toward a center of the dispenser 20. Here, the dispensing passage 66 may be disposed at a front side of the ice chute 213.

Thus, the dispensing passage 66 may be bent. Also, the dispensing passage 66 may be accommodated into a guide pipe 661 formed of a metal material, such as aluminum, so that the dispensing passage 66 is maintained in its fixed shape. That is, the guide pipe 661 may be bent to extend from the connection member 662 up to the water chute 212. Further, the dispensing passage 66 may pass through the guide pipe 661 and be guided. Accordingly, the dispensing passage 66 may be maintained in position and shape by the guide pipe 661. Thus, increase in resistance within the tube due to the deformation by a water pressure may be prevented and water may be smoothly supplied.

The ice chute 213 and the water chute 212 are disposed in an upper portion of the dispensing housing 21, e.g., at the center of the upper portion of the cavity 211. An electrical component mount part 216 and a valve mount part 217 are disposed on both left and right sides with respect to the water chute 212 and the ice chute 213, respectively.

A detection part, such as a switch, for detecting an operation according to the manipulation of the push pad 22 and/or an operation of a damper for opening or closing the ice chute 213 may be disposed on the electrical component seat part 216 that is disposed at the left side (when viewed in FIG. 10). The purified water valve 622 may be disposed on the right valve mount part 217. Also, the connection member 662 connecting the purified water passage 62 to the cooled water passage 63 may be disposed on the right valve mount part 217. An opened end of the passage guide 156 may be disposed on the right valve mount part 217 to allow the purified water passage 62 and the cooled water passage 63 that are guided through the passage guide 156 to be inserted therein.

The electrical component mount part 216 and the valve mount part 217 may be opened forward and covered by the cover plate 23. The cover plate 23 may define a portion of the front appearance of the dispenser 20. The display part 231 for displaying the operation state of the refrigerator may be further disposed on the cover plate 23. In addition, one or more buttons for inputting an operation together with the display part 231 may be further disposed on the cover plate 23.

Thus, when the dispenser 20 is used, the cover plate 23 may be mounted to cover the electrical component mount part 216 and the valve mount part 217. Also, when the refrigerator or the electrical components are assembled, or service for the purified water valve 622, the connection member 662, the purified water passage 62, or the cooled water passage 63 is required, the cover plate 23 may be separated to expose the electrical component mount part 216 and the valve mount part 217.

According to the current embodiment, since the water purified valve 622 is mounted at a position that is adjacent to the dispensing passage 66, when the water purified valve 622 is closed, an amount of water remaining in the dispensing passage 66 may be less, and thus, possibility of water leakage may be reduced, and propagation of bacteria may be suppressed.

Also, even though the water leakage occurs due to the defect of the water purified valve 622, since water is dispensed through the dispensing passage, the contamination within the refrigerator due to the water leakage may be prevented.

A chute cover 24 may be disposed between the electrical component mount part 216 and the valve mount part 217. The chute cover may cover front sides of the water chute 212 and the ice chute 213 to prevent the water chute 212 and the ice chute 213 from being exposed. The chute cover 24 may be disposed at a center of an upper portion of the dispenser 20 to protrude somewhat upward from the cover plate 23. However, the chute cover may be flush with the cover plate 23. Also, the chute cover 24 may be separately provided. Thus, the chute cover 24 may be integrated with the cover plate 23. When the chute cover 24 is integrated with the cover plate 23, the chute cover 24 may be detachably disposed together with the cover plate 23.

The touch screen-type display 25 may be provided on a front surface of the chute cover 24. The display 25 may serve as a plurality of input parts for manipulating an input operation of the dispenser 20. Also, an operation state of the refrigerator 10 or the dispenser 20 may be outputted as an image or moving picture by using the display 25.

Figure 11:
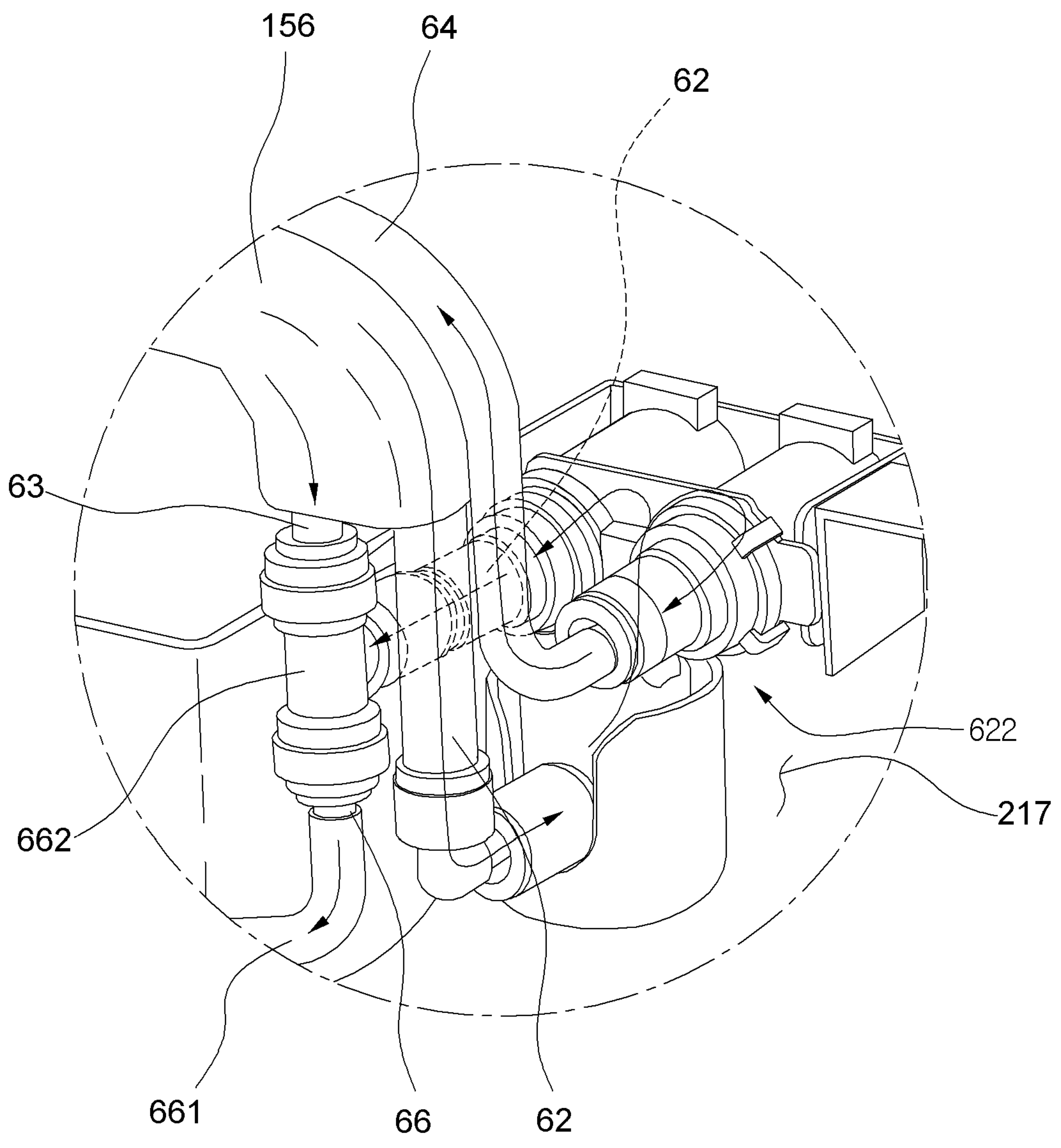
FIG. 11 is an enlarged view illustrating an example structure of a passage in the dispenser.

FIG. 11 illustrates an example structure of a passage in the dispenser.

Referring to FIG. 11, an arrangement of the passage within the valve mount part 217 described with reference to FIG. 10 will be described in more detail. The purified water valve 622, the connection member 662, the purified water passage 62, the cooled water passage 63, and the dispensing passage 66 are disposed within the valve mount part 217.

The purified water passage 62 guided through the passage guide 156 may be connected to an inlet of the purified water valve 622 inside the valve mount part 217. An outlet of the purified water valve 622 may be branched into two parts, and then respectively connected to the purified water passage 62 and the ice making passage 64. Here, the purified water passage 62 connected to an outlet end of the purified water valve 622 may be connected to the connection member 662, and the ice making passage 64 connected to an outlet end of the purified water valve 622 may extend to the ice making device 30. Thus, the purified water supplied through the purified water passage 62 may be switched in passage according to an operation of the purified water valve 622 to flow to the connection member 662 through the purified water passage 62 or flow to the ice making device 30 through the ice making passage 64. When a command for dispensing water through the dispenser 20 and a water supply operation for making ice are performed at the same time, the purified water valve 622 may be fully opened so that the purified water is divided into the connection member 662 and the ice making passage 64 to flow.

The cooled water passage 63 guided through the passage guide 156 is connected to the connection member 662. Also, the purified water passage 62 and the cooled water passage 63 communicate with an inlet of the connection member 662, and the dispensing passage 66 is connected to an outlet of the connection member 662. Thus, the purified water or cooled water supplied through the purified water passage 62 or the cooled water passage 63 may be discharged into one dispensing passage 66 through the connection member 662.

The purified water passage 62, the cooled water passage 63, the dispensing passage 66, the purified water valve 622, and the connection member 662 may be exposed through the valve mount part 217. If service is needed, the components may be connected to each other through a couplable and separable fitting structure so that the components are easily coupled to and separated from each other.

FIGS. 12A to 12D illustrate an example input part of the dispenser.

Referring to FIGS. 12A to 12D, the touch-type display 25 is disposed on the chute cover 24 of the dispenser 20. The display 25 may be switched in screen according to a user's manipulation state to realize various input parts.

For instance, the operation state of the dispenser 20 or the refrigerator 10 may be displayed in a standby state of the display 25. Also, if the display 25 is not used for a long time, the display 25 may be switched in a power saving mode and thus be turned off.

Figure 12A:
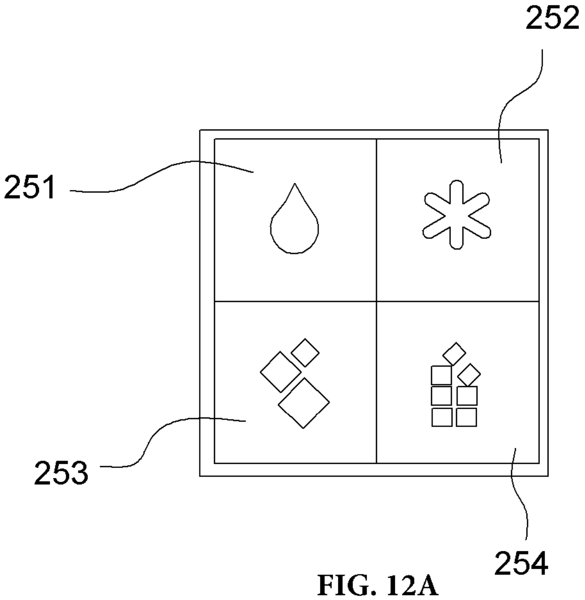
FIGS. 12A to 12D are a view illustrating an example input part of the dispenser.

In this state, when the user touches the display 25 to activate the display 25, a first screen as illustrated in FIG. 12A may be displayed. The first screen of the display 25 is divided into a plurality of sections to select a kind of water or ice to be dispensed through the dispenser 20. As shown, pictures corresponding to the inputs may be displayed on the sections of the display 25, respectively.

For example, a purified water input part 251 may be displayed on a left upper end of the display 250 to output a screen for selecting the dispensing of purified water. A cooled water input part 252 may be displayed on a right upper end of the display 250 to output a screen for dispensing cooled water, and a cubed ice input part 253 may be disposed on a left lower end of the display 250 to output a screen for dispensing cubed ice. In addition, a crushed ice input part 254 may be displayed on a right lower end to output a screen for dispensing crushed ice.

Here, the input parts 253 and 254 for selecting a kind of ice, the purified water input part 251, and the cooled water input part 252 may be displayed to be partitioned into a plurality of rows and columns on the display 250.

Thus, the user may touch one of the four input parts, on which desired menus to be dispensed through the dispenser 20 are displayed, to select a kind of water or ice to be dispensed.

Figure 12B:
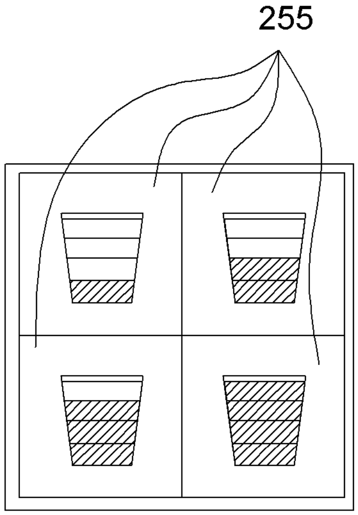

For example, when the purified water input part 251 is selected on the first screen, a second screen as illustrated in FIG. 12B may be displayed. A dispensing amount input part 255 may be disposed on the second screen. That is, an amount of purified water to be dispensed through the dispenser 20 may be selected through the dispensing amount input part 255 to dispense a desired amount of purified water. The dispensing amount input part 255 may be realized in two types.

As shown in FIG. 12B, the dispensing amount input part 255 is configured to output images, which denote a different amount of water on each section of the display 25. As shown, the entire screen of the display 25 is partitioned into a plurality of sections so that a corresponding amount of water is dispensed when the user touches a section. For instance, a set amount may be determined as an amount corresponding to a size of the selected section after an image of a reference container is partitioned into a plurality of sections. Also, the set amount may be outputted in the form of a water level.

Here, a dispensing amount input part 225 may be displayed to be partitioned into a plurality of rows and columns on the display 250. Thus, since the dispensing amount input part is displayed on one screen without changing a screen, the user may easily select the dispensing amount.

Figure 12C:
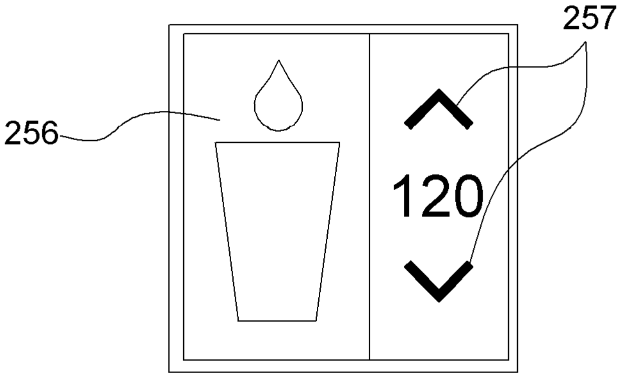

In addition, as shown in FIG. 12C, the dispensing amount input part 256 may be outputted as one screen so that the user manipulates the button 257 to set an amount of water to be dispensed. Also, when the user manipulates the button 257 to accurately dispense a preset amount of water, the amount of dispensed water may be outputted. When the amount of dispensed water increases or decreases by the manipulation of the button 257, an image or moving picture for showing increase or decrease of the water level may be displayed on the container image that is displayed on the dispensing amount input part 256. When the dispensing amount is determined, the dispensing amount input 256 may be touched to input a dispensing amount determination completion command.

Figure 12D:
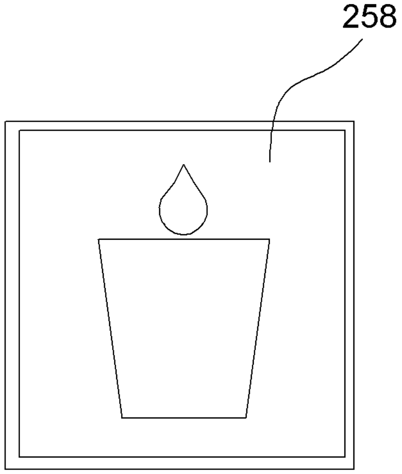

When the cooled water input part 252, the cubed ice input part 253, or the crushed ice input part 254 are selected on the first screen, or an amount of water to be dispensed through the manipulation of the dispensing amount input parts 255 and 256 is completely set on the second screen, a third screen as illustrated in FIG. 12D may be displayed. An operation input part 258 for starting the dispensing may be displayed on the third screen. Here, the operation input part 258 may be displayed, and simultaneously, the set water or ice may be dispensed. When the operation input part 258 is manipulated, the selected water or ice may be dispensed from the dispenser 20. Also, if the operation input part 258 is touched during dispensing, the dispensing of the water and/or ice may be stopped. In addition, an image or moving picture for showing a filled state of the water or ice may be further displayed on the container image displayed on the operation input part 258 during the dispensing of the water and/or ice.

That is, when the purified water input part 251 is manipulated to select the purified water on the first screen, and the dispensing amount input parts 255 and 256 are manipulated to select the set amount on the second screen, water supply may automatically start when the second screen is switched into the third screen or may start according to an initial touch of the operation input part 258. When the inputted amount of water is completely dispensed, the water supply may be automatically stopped without performing separate manipulation.

Also, if the user manipulates the operation input part 258 again while the dispensing amount input parts 255 and 256 are manipulated to select the set amount on the second screen, and the water supply is performed according to the initial manipulation of the operation input part 258, the water supply may be stopped even though the water supply amount does not reach the set amount.

In addition, the push pad 22 for dispensing water or ice through the dispenser 20 may be manipulated.

That is, a desired kind of water or ice may be set on the first screen of the display 25 to manipulate the push pad 22, thereby dispensing the water or ice. When the manipulation of the push pad 22 is stopped, the dispensing of the water or ice may be stopped. Here, it may be unnecessary to perform manipulation for separately setting the dispensing amount. Also, when the manipulation of the push pad 22 is detected by a control part, the third screen of FIG. 12D may be automatically displayed on the display 25.

For instance, when the purified water is dispensed, the dispensing amount input parts 255 and 256 are manipulated on the second screen to set an amount of water to be dispensed, the water supply or water supply stopping may be manipulated through the push pad 22. Also, even though the operation input part 258 is manipulated on the third screen to start the dispensing of the water or ice, the water supply may be stopped through the manipulation of the push pad 22.

According to the current embodiment, the cooled water input part, the purified water input part, and the ice kind selection part may be displayed on a first screen, and the dispensing amount input part may not be displayed on the first screen. When the purified water input part is selected, the purified water input part may be displayed on the displayed screen. Thus, when compared to a case in which many input parts are displayed on one screen, the user may easily and instinctively confirm a kind of button. Thus, a time taken to confirm the kind of input part by the user may be reduced, and wrong selection of the input parts may be prevented. In addition, since the screen of the display is displayed in stages, the display may be reduced in size.

Figure 13:
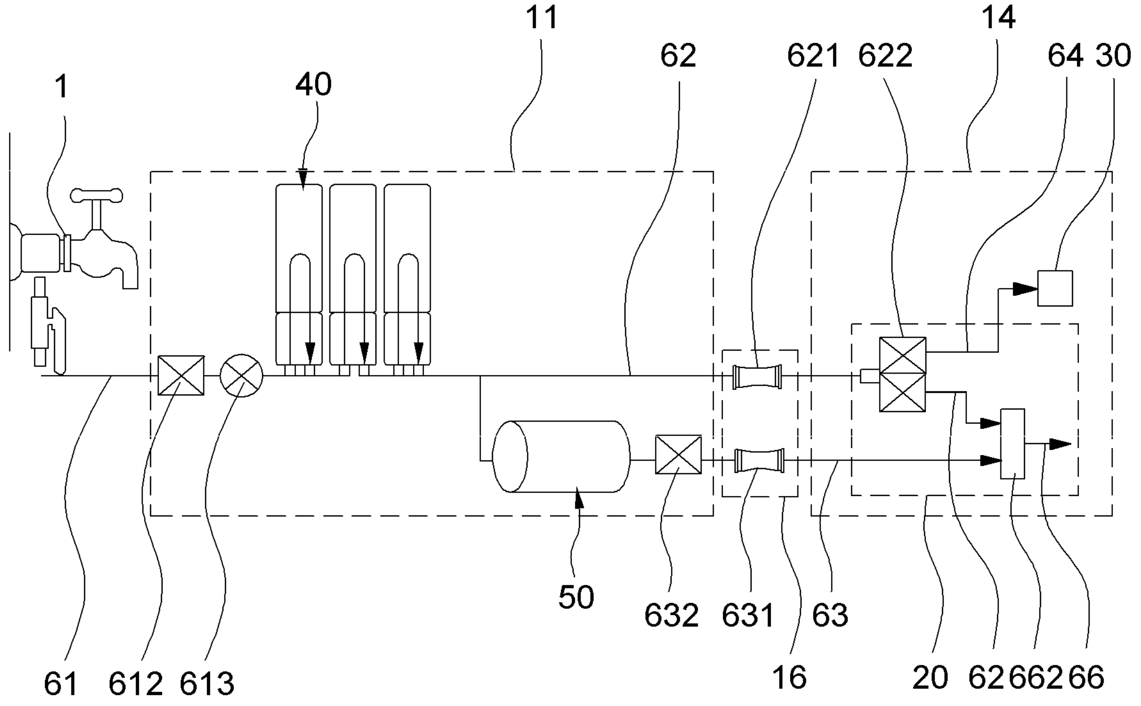
FIG. 13 is a schematic view illustrating an example passage structure and water flow in the refrigerator.

FIG. 13 illustrates an example passage structure and water flow in the refrigerator.

A water dispensing process due to the manipulation of the dispenser will be described with reference to FIG. 13.

Water supplied from the water supply source 1 may be supplied into the filter device through the water supply passage 61. Here, the water supply into the filter device 40 may be determined by the water supply valve 612 provided in the water supply passage 61. Also, a flow sensor 613 may be provided on the water supply passage 61 to detect a flow rate. Thus, when the dispenser 20 is manipulated, a set amount of water may be dispensed by using the flow rate detected by the flow sensor 613. The flow sensor 613 may measure a flow rate of water passing through the water supply passage 61. The flow sensor 613 may include a magnetic type flow sensor and a hall type flow sensor.

Water introduced into the filter device 40 may be purified by the filter 42. The water purified by the filter device 40 may flow along the purified water passage 62 to pass through the hinge 16, thereby being supplied into the dispenser 20. Also, the purified water valve 622 may be provided in the dispenser 20. The purified water passage 62 and the ice making passage 64 may be branched from the purified water valve 622. The branched purified water passage 62 may extend to the connection member 662 of the dispenser 20, and the ice making passage 64 may extend to the ice making device 30. That is, the purified water valve 622 may operate according to a user's manipulation to adjust the supply of purified water into the dispenser 20 or the ice making device 30.

The cooled water passage 63 may be branched from one point of the purified water passage 62 extending from the outlet end of the filter device 40. The cooled water passage 63 may pass through the hinge 16 to extend to the dispenser 20. The water tank 50 and the cooled water valve 632 are provided on the cooled water passage 63. Thus, the purified water passing through the filter device 40 may be introduced into the water tank 50 through the cooled water passage 63 and then cooled and stored. When the cooled water valve 632 is opened, the cooled water may be supplied into the dispenser 20.

The purified water passage 62 and the cooled water passage 63 which are disposed on a side of the dispenser 20 may be connected to the connection member 662, and thus, water may be dispensed into the dispenser 20 through the dispensing passage 66 provided in the connection member 662.

In the refrigerator having the above-described passage structure, when the user manipulates the cooled water input part 252 of the display 25 so as to dispense cooled water, the dispensing of the cooled water occurs. When the operation input part 258 of the display 25 is manipulated, or the push pad 22 is pushed, the cooled water valve 632 may be opened to dispense the cooled water from the water chute 212 of the dispensing passage 66. When the user manipulates the operation input part 258 again, or a hand or container pushing the push pad 22 is detached from the push pad 22 after the desired amount of water is dispensed, the water supply may be stopped.

Also, when the user manipulates the purified water input part 251 of the display 25 so as to dispense the purified water, the purified water valve 622 may be switched so that the water dispensing through the purified water passage 62 occurs. In this state, the water supplied from the water supply source 1 may be purified by passing through the filter device 40. Then, the purified water may be directly dispensed into the dispenser 20 through the purified water passage 62.

For instance, the user may set an amount of water to be dispensed through dispensing amount input parts 255 and 256 of the display 25. That is, when the user manipulates the dispensing amount input parts 255 and 256 to input an amount of water to be dispensed, and then, operates the operation input part 258 or the push pad 22, the purified water may be dispensed through the dispensing passage 66 communicating with the cooled water passage 63.

Also, when the purified water is dispensed, the flow sensor 613 may detect a flow rate of water supplied from the water supply source 1. Thus, the water supply stopping may be determined according to the flow rate detected by the flow sensor 613. That is, when the dispensing of the preset amount of water is detected by the flow sensor 613, the purified water valve 622 may be closed without a separate manipulation to complete the dispensing of the purified water.

For example, when the purified water is selected by using the purified water input part, the purified water valve may be opened, and the cooled water valve may be closed. In this state, when the preset amount of water is dispensed by using the dispensing amount input part, the purified water valve is closed. On the other hand, when the cooled water is selected through the cooled water input part, the cooled water valve may be opened, and the purified water valve may be closed. Here, whether the preset amount of water is dispensed by using the dispensing amount input part may be determined on the basis of the flow rate detected by the flow sensor 613.

When a predetermined amount of purified water is dispensed in a state where the pushing of the push pad 22 is detected, if the pushing operation of the push pad 22 is not released until the predetermined amount of purified water is dispensed, the purified water valve 612 may be closed so as to stop the dispensing of the purified water. That is, when a predetermined amount of purified water is dispensed in a state where the pushing of the push pad 22 is detected, the purified water valve may be closed to stop the dispensing of the purified water, regardless of whether the release of the pushing of the push pad 22 is detected. Also, after a predetermined amount of purified water is dispensed, the purified water valve may be closed even though the pushing of the push pad 22 is continuously detected.

If the release of the pushing of the push pad 22 is detected before the predetermined amount of purified water is dispensed, the purified water valve 612 may be immediately closed.

When the cubed ice input part 253 or the crushed ice input part 254 of the display 25 is manipulated, corresponding ice may be dispensed through the ice chute 213 of the dispenser 20.

Figure 14:
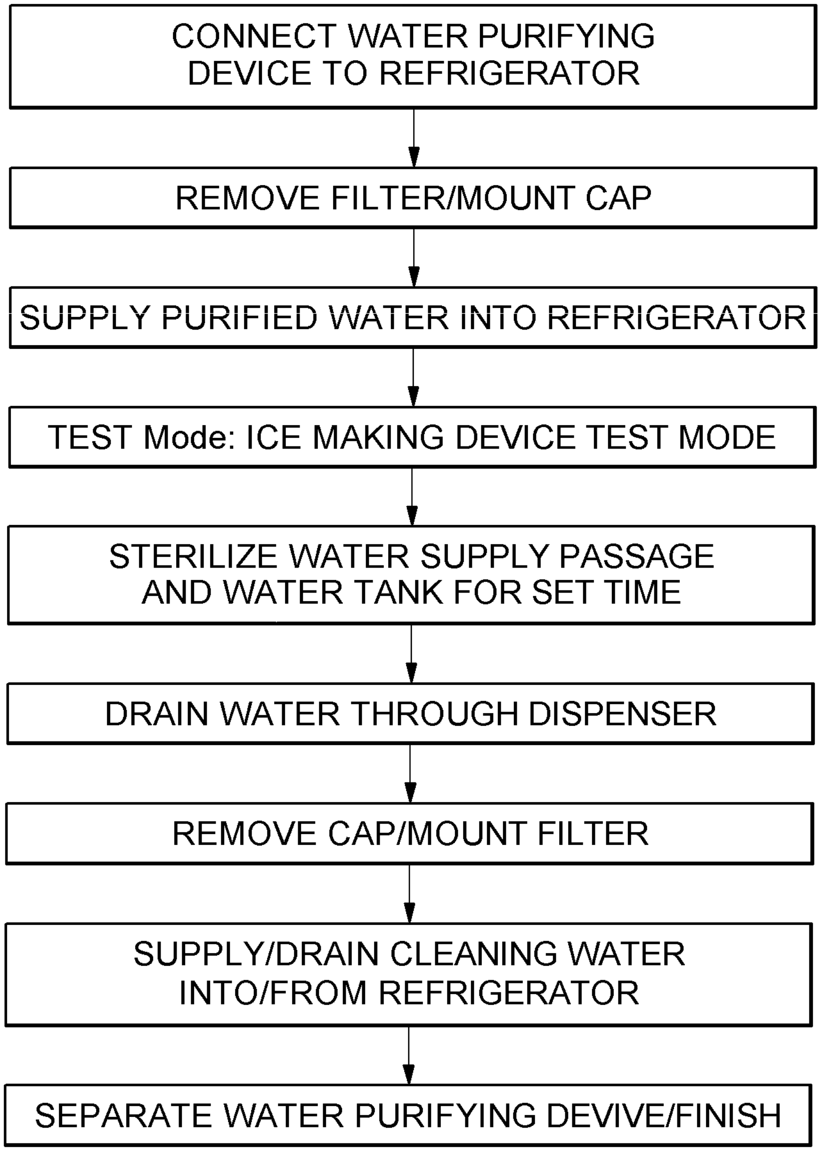
FIG. 14 is a block diagram illustrating an example process of sterilizing and purifying a water supply passage.
Figure 15:
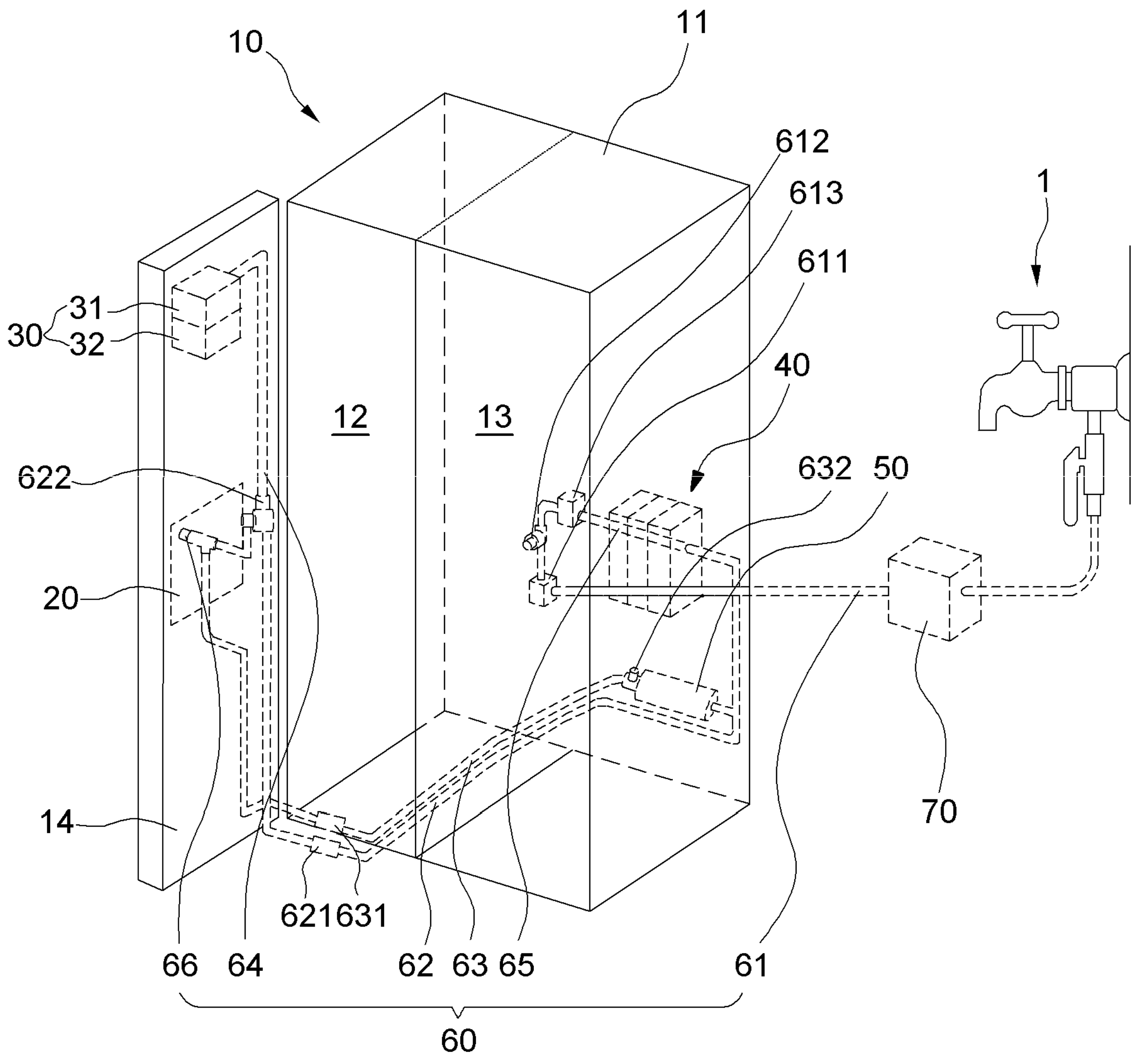
FIG. 15 is a schematic view illustrating an example arrangement of the passage in a state where a sterilization device is mounted in the refrigerator.

FIG. 15 illustrates an example arrangement of the passage in a state where a sterilization device is mounted in the refrigerator, and FIG. 14 illustrates an example process of sterilizing and cleaning the water supply passage.

Referring to FIGS. 14 and 15, if it is required to sterilize and clean the water supply passage 60 or the water tank 50 during the use of the refrigerator 10, the sterilization device 70 may be connected to the water supply passage 60, and sterilizing water may be filled into the water supply passage 60 and the water tank 50 to sterilize and purify the water supply passage 60 and the water tank 50.

In some implementations, the sterilization device 70 may generate hypochlorous acid (HOCl) by electrolyzing supplied water to form cleaning water that serves as sterilizing water. Also, the sterilization device 70 may have a portable structure and thus be connected to the water supply passage of the refrigerator.

The sterilization device 70 is installed on the water supply passage 61 connecting the water supply source 1 to the filter device 40. In this state, water supplied through the water supply source 1 may pass through the sterilization device 70 and then be supplied into the refrigerator 10.

Then, the filter 42 mounted on a socket 48 of the filter device 40 is separated by the user. Here, a blocking member for blocking a passage connected to the filter 42 may be provided in the socket 48. If the blocking member is not provided, a separate filter cap may be mounted to prevent water from leaking from the socket 48 when the filter 42 is separated.

Then, the sterilization device 70 may operate to allow the sterilizing water generated by the sterilization device 70 to flow along the water supply passage 60. The sterilizing water may be successively filled into the water purifying passage 65 of the filter device 40 from which the filter 42 is removed, the water tank 50, the purified water passage 62, the cooled water passage 63, and the ice making passage 64. Here, a portion of the water purifying passage 65 from an outlet end of the sterilization device 70, e.g., the water purifying passage except for the passage passing through the filter 42, may be defined as a sterilization passage.

When the sterilization device 70 operates, the ice making device 30 enters into a test mode. In the test mode, the tray of the automatic ice maker 31 may be empty, and the sterilizing water supplied through the ice making passage 64 may be supplied into the tray of the automatic ice maker 31 to sterilize the ice making passage 64 and the tray of the ice making device 30 by using the sterilizing water.

Also, the sterilizing water filled into the water supply passage 60 and the water tank 50 may stay in the water supply passage 60 and the water tank 50 for a preset time to sterilize inner walls of the water supply passage 60 and water tank 50. After the sterilization is completed for the preset time, the push pad 22 of the dispenser 20 or the operation input part 258 may operate to drain the sterilizing water in the water supply passage 60.

After the sterilizing water is completely drained through the dispenser 20, the sterilization device 70 may be separated from the water supply passage 61. Then, the blocking member or cap mounted on the socket 48 may be removed, and the filter 42 may be mounted again on the socket 48, thereby completing the sterilization process.

Also, a process for emptying ice stored in the ice bank 32 may be required so that the ice made in the test mode is not supplied into the ice bank 32. Also, this process may be informed to the display part 231 or the display 25 of the refrigerator 10. Alternatively, the ice bank 32 may be empty after the sterilization process starts, and then, ice generated during the sterilization process and stored in the ice bank may be completely empty.

In some implementations, a refrigerator has a feature in which a cooled water valve is disposed between a filter device and a water tank so that cooled water is discharged from the water tank.

Thus, the refrigerator may be to the same as the refrigerator described above, except for the cooled water valve, and thus the similar part will be designated by the same reference numeral and detailed descriptions thereof will be referenced, rather than repeated.

Figure 16:
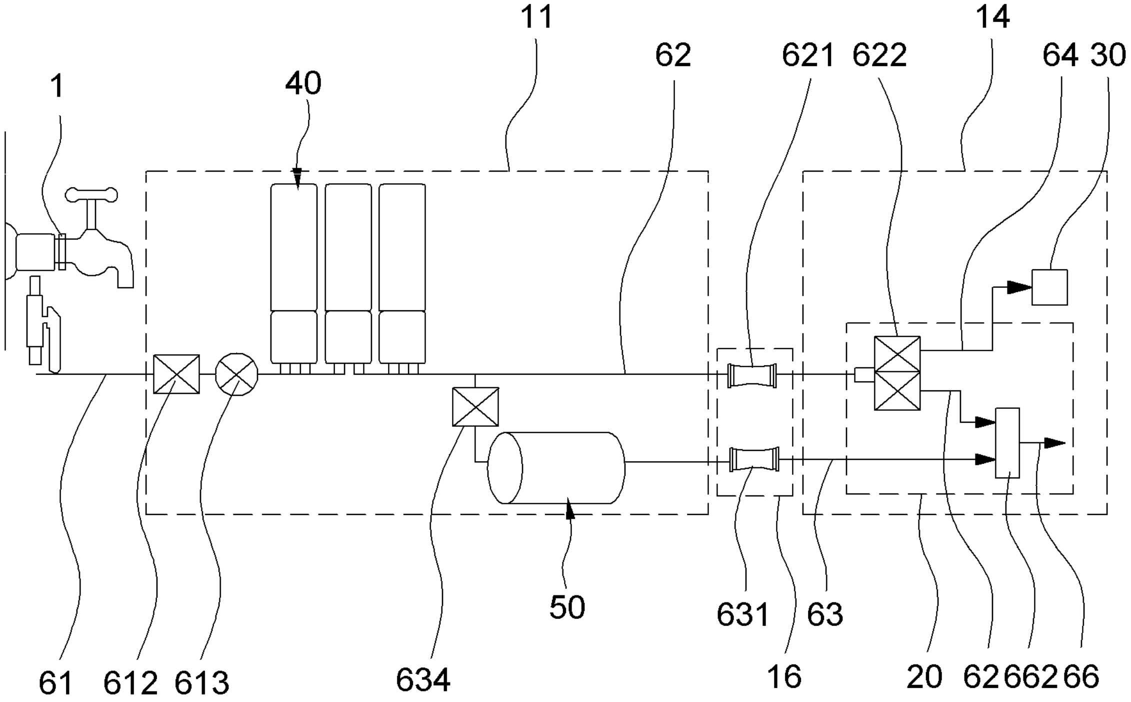
FIG. 16 is a schematic view of another example passage structure and water flow.

FIG. 16 illustrates an example passage structure and water flow.

Referring to FIG. 16, a water supply passage 60 may include a supplied water passage 61 connecting a water supply source 1 to a filter device 40, a purified water passage 62 connecting the filter device 40 to a dispenser 20, an ice making passage 64 connected to the ice making device 30, a cooled water passage 63 connecting the filter device 40 to the dispenser 20, and a dispensing passage 66 communicating the purified water passage 62 and the cooled water passage 63 in the dispenser 20 to dispense purified water and cooled water to the outside of the dispenser 20.

Also, a water supply valve 612 and a flow sensor 613 may be provided in the water supply passage 61. A purified water valve 622 may be provided in a purified water passage 62 of the dispenser 20. The purified water valve 622 may be branched, and a side of an outlet of the purified water valve 622 may be divided into the purified water passage 62 and an ice making passage 64 to supply the purified water into the dispenser 20 and the ice making device 30.

A cooled water valve 634 may be provided in the cooled water passage 63. The cooled water valve 634 may be disposed in the cooled water passage 63 between the filter device 40 and the water tank 50. When the dispenser 20 is manipulated, the cooled water valve 634 may be opened to dispense cooled water. Also, if external manipulation is not performed, the water tank 50 may be maintained to a full water level so that the cooled water is fully filled into the water tank 50.

The refrigerator may be the same as that of the refrigerator described above, except for a structure of the cooled water valve 634, and thus, an operation for dispensing water and a detailed description with respect to a sterilization process will be referenced, rather than repeated.

In some examples, a refrigerator has a feature in which a cooled water valve through which cooled water is discharged from a water tank includes a three way valve that is disposed on a point, at which a purified water passage and a cooled water passage are branched, between a filter device and the water tank.

Thus, the refrigerator may be equal to the refrigerator described above, except for the cooled water valve, and thus the same part will be designated by the same reference numeral and detailed descriptions thereof will be referenced, rather than repeated.

Figure 17:
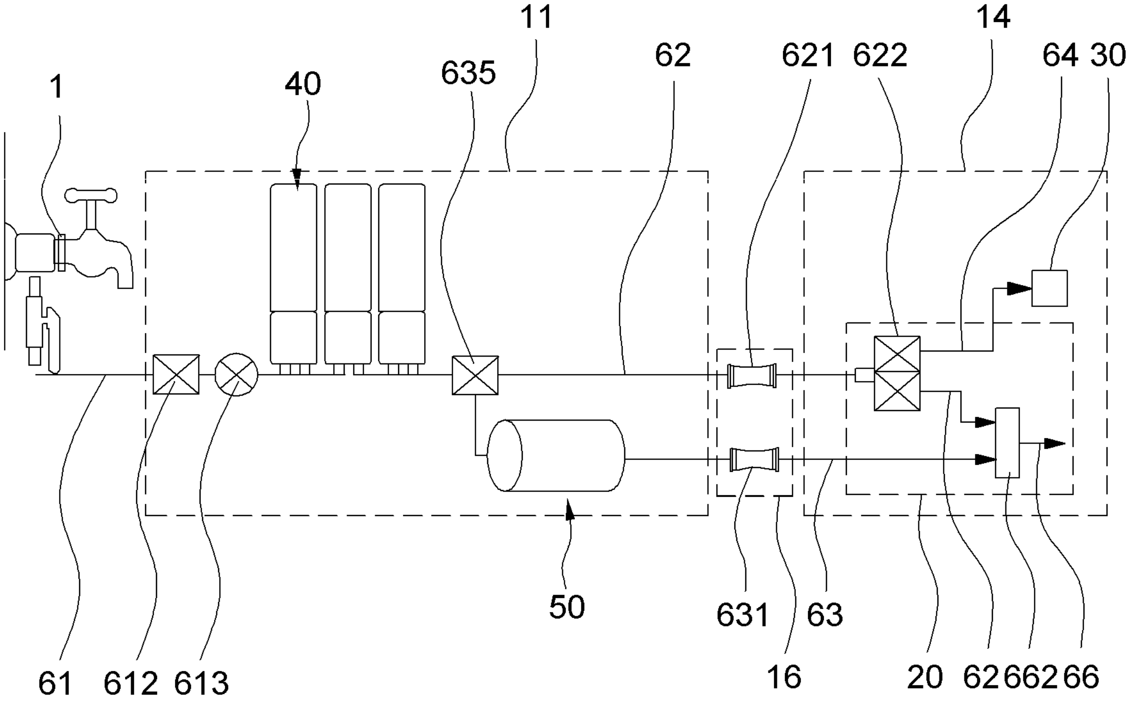
FIG. 17 is a schematic view of yet another example passage structure and water flow in a refrigerator.

FIG. 17 illustrates another example passage structure and water flow in a refrigerator.

Referring to FIG. 17, a water supply passage 60 may include a supplied water passage 61 connecting a water supply source 1 to a filter device 40, a purified water passage 62 connecting the filter device 40 to a dispenser 20, an ice making passage 64 connected to the ice making device 30, a cooled water passage 63 connecting the filter device 40 to the dispenser 20, and a dispensing passage 66 communicating the purified water passage 62 and the cooled water passage 63 in the dispenser 20 to dispense purified water and cooled water to the outside of the dispenser 20.

Also, a water supply valve 612 and a flow sensor 613 may be provided in the water supply passage 61. A purified water valve 622 may be provided in a purified water passage 62 of the dispenser 20. The purified water valve 622 may be branched, and a side of an outlet of the purified water valve 622 may be divided into the purified water passage 62 and an ice making passage 64 to supply the purified water into the dispenser 20 and the ice making device 30.

A cooled water valve 635 may be provided on a point, at which the purified water passage 62 and the cooled water passage 63 are branched, between the filter device 40 and the water tank 50. The cooled water valve 635 may include a three way valve to selectively supply water discharged from the filter device 40 into the purified water passage 62 or cooled water passage 63.

Thus, when the dispenser 20 is manipulated to dispense cooled water through the dispenser 20, the cooled water valve 635 may be switched to supply water within the filter device 40 into the water tank 50, and water stored in the water tank may be supplied into the dispenser 20 by pressure.

Also, when the dispenser 20 is manipulated to dispense purified water through the dispenser 20, the cooled water valve 635 may be switched to supply the water within the filter device through the purified water passage 62, and simultaneously, the purified water valve 622 may open the purified water passage 62 extending to the dispenser 20 to dispense the purified water through the dispenser 20.

If the ice making device 30 requires water for making ice, the cooled water valve 635 may open the purified water passage 62 to supply the water within the filter device 40 into the purified water passage 62. The purified water valve 622 provided in the dispenser 20 may open the ice making passage 64 connected to the ice making device 30 to guide the water discharged from the filter device 40 to the ice making device 30 through the ice making passage 64.

The refrigerator may be the same as the refrigerator described above, except for a structure of the cooled water valve 635, and thus, an operation for dispensing water and a detailed description with respect to a sterilization process will be referenced, rather than repeated.

In some implementations, a refrigerator has a feature in which two water dispensing ports are provided in a dispenser and respectively connected to an end of a purified water passage and an end of a cooled water passage to dispense purified water and cooled water.

Thus, the refrigerator may have the same constitution as the refrigerator described above, except for a purified water passage and a cooled water passage within a dispenser, and thus the same part will be designated by the same reference numeral and detailed descriptions thereof will be referenced, rather than repeated.

Figure 18:
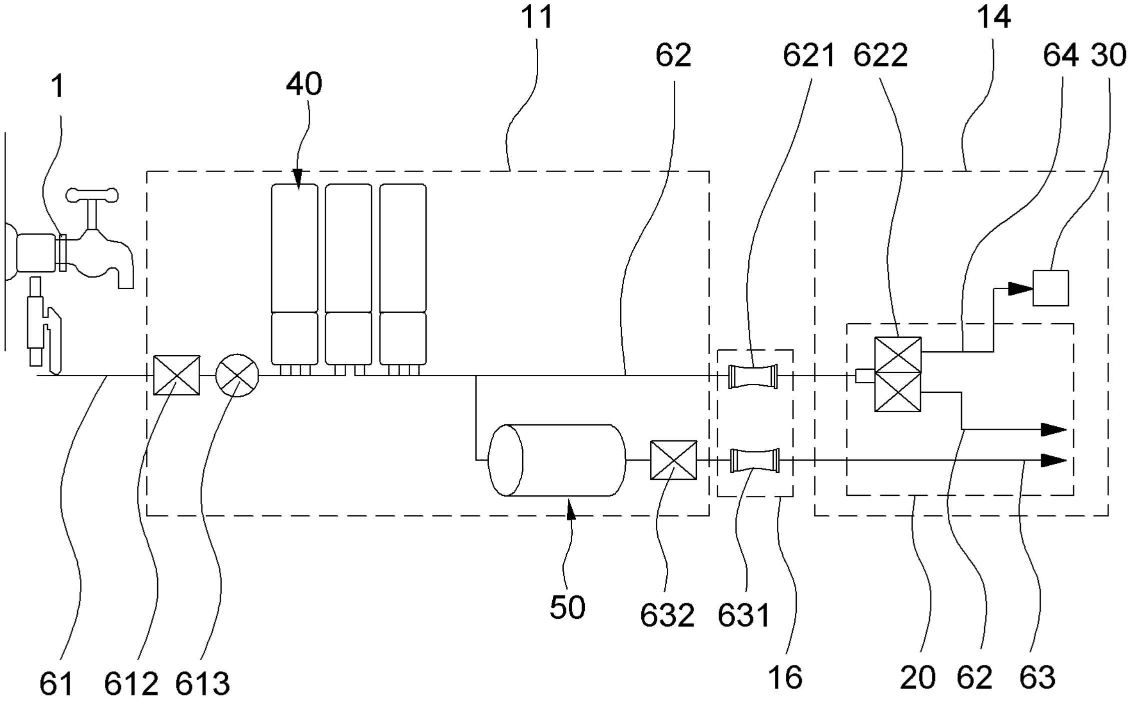
FIG. 18 is a schematic view of another example passage structure and water flow in a refrigerator.

FIG. 18 illustrates yet another example passage structure and water flow in a refrigerator.

Referring to FIG. 18, a water supply passage 60 may include a supplied water passage 61 connecting a water supply source 1 to a filter device 40, a purified water passage 62 connecting the filter device 40 to a dispenser 20, an ice making passage 64 connected to the ice making device 30, and a cooled water passage 63 connecting the filter device 40 to the dispenser 20.

Also, a water supply valve 612 and a flow sensor 613 may be provided in the water supply passage 61. A purified water valve 622 may be provided in a purified water passage 62 of the dispenser 20. The purified water valve 622 may be branched, and a side of an outlet of the purified water valve 622 may be divided into the purified water passage 62 and an ice making passage 64 to supply the purified water into the dispenser 20 and the ice making device 30.

A cooled water valve 632 may be provided in the cooled water passage 63. The cooled water valve 632 may be disposed in the cooled water passage 63 between the water tank and the dispenser 20. When the dispenser 20 is manipulated, the cooled water valve 634 may be opened to dispense cooled water. Also, if external manipulation is not performed, the water tank 50 may be maintained to a full water level so that the cooled water is fully filled into the water tank 50.

Further, the purified water passage 62 and the cooled water passage 63 may pass through a hinge 16 and then be guided into a freezing compartment door 14. Then, each of water dispensing ports of the purified water passage 62 and the cooled water passage 63 is connected to the dispenser 20. That is, in the dispenser 20, ends of the purified water passage 62 and the cooled water passage 63 may be exposed to form a purified water dispensing port for dispensing the purified water and a cooled water dispensing port for dispensing the cooled water.

That is, when compared to the passage structures and water flow described above, the connection member 662 connecting the dispensing passage to the dispenser 20 and connecting the purified water passage 62 and the cooled water passage 63 to the dispensing passage 66 may be omitted, and also, the dispensing passage 66 may be omitted.

The refrigerator may be the same as the refrigerator described above, except for the number of purified and cooled water passages 62 and 63 at a side of the dispenser 20, and thus, an operation for dispensing water and a detailed description with respect to a sterilization process will be referenced, rather than repeated.

In some examples, a refrigerator has a feature in which an ice making device is provided in a body of a freezing compartment, and an ice making passage is branched from a purified water passage passing through a main body of a refrigerator.

Thus, the refrigerator may have the same constitution as the refrigerator described above, except for a position of the ice making device and a structure of the passage connected to the ice making device, and thus the same part will be designated by the same reference numeral and detailed descriptions thereof will be referenced, rather than repeated.

Figure 19:
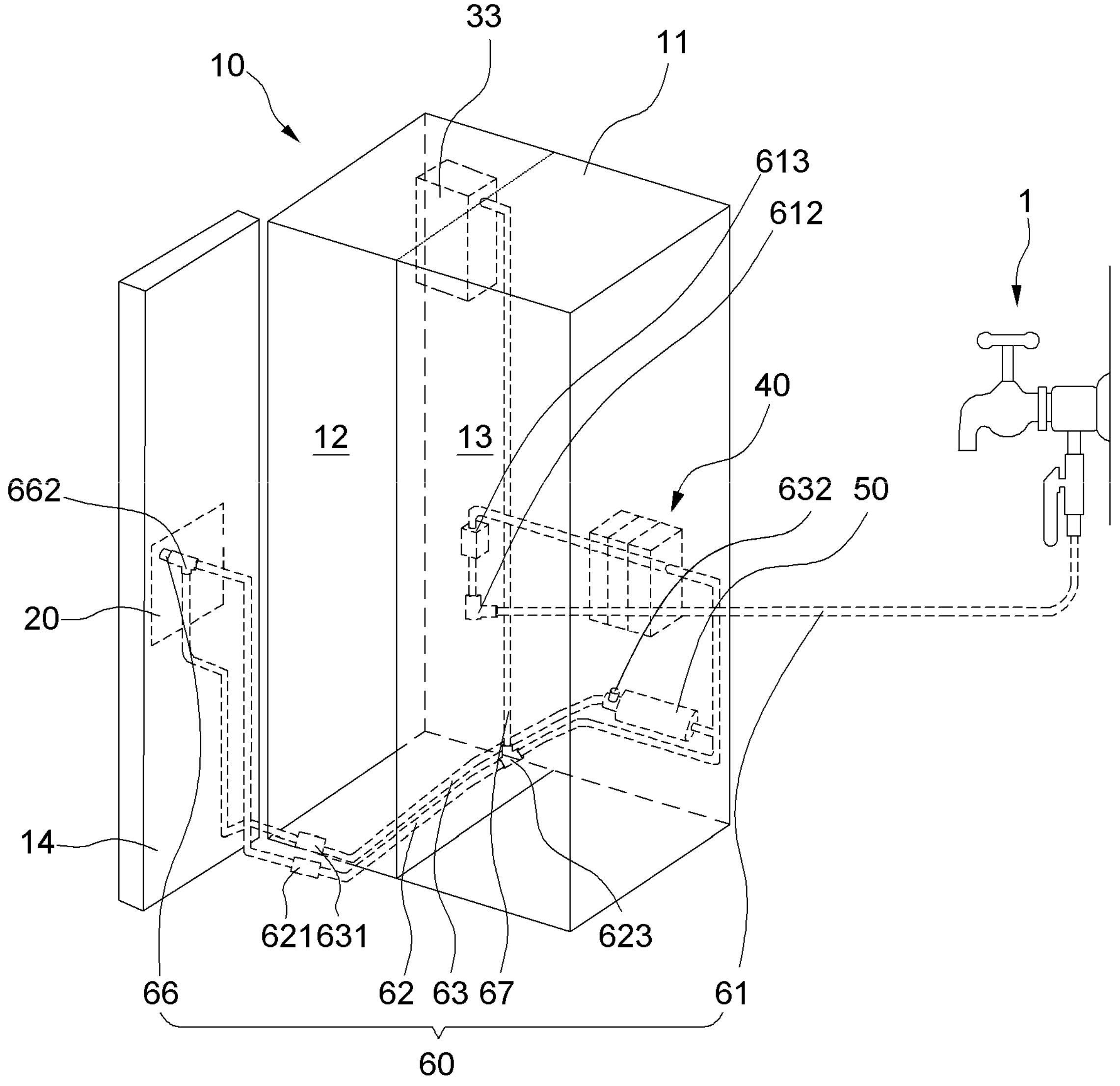
FIG. 19 is a schematic view illustrating an example arrangement of a passage in a refrigerator.
Figure 20:
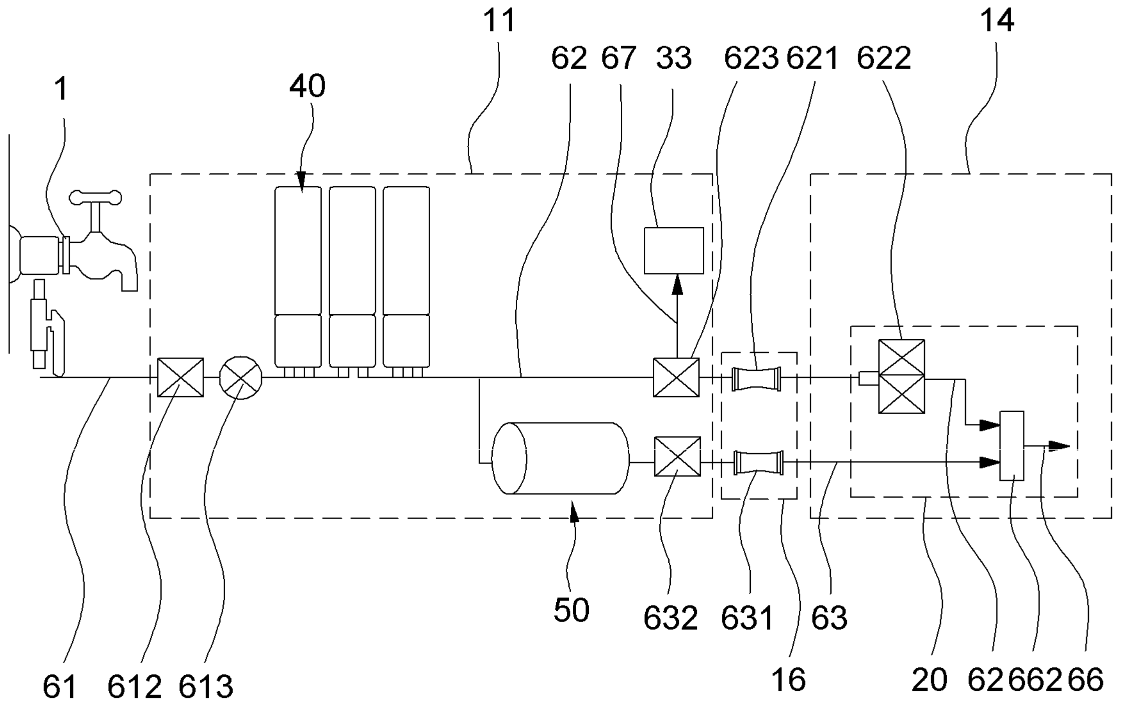
FIG. 20 is a schematic view of an example passage structure and wafer flow in the refrigerator.

FIG. 19 illustrates an example arrangement of a passage in a refrigerator, and FIG. 20 illustrates an example passage structure and wafer flow in the refrigerator.

Referring to FIGS. 19 and 20, a refrigerator 10 includes a main body 11 having a freezing compartment 12 and a refrigerating compartment 13 which are horizontally partitioned by a barrier, a freezing compartment door 14 for opening or closing the freezing compartment 12 and including a dispenser 20, and a refrigerating compartment door for opening or closing the refrigerating compartment 13.

Also, a water supply passage 60 may include a supplied water passage 61 connecting a water supply source 1 to a filter device 40, a purified water passage 62 connecting a filter device 40 to the dispenser 20, a cooled water passage 63 connecting the filter device 40 to the dispenser 20, and an ice making passage 67 extending from a portion of the purified water passage 62 to an ice making device 33.

Also, a water supply valve 612 and a flow sensor 613 may be provided in the water supply passage 61. A purified water valve 623 may be provided in the purified water passage 62 connected to the dispenser 20. The purified water valve 623 may be provided at a rear side of the refrigerating compartment 13 or in a machine room in which a compressor is provided. An outlet of the purified water valve 623 may be divided into two parts within the refrigerating compartment 13, and an inlet end of the purified water passage 62 facing the dispenser 20 and an inlet end of the ice making passage 67 may be respectively connected to the branched parts of the purified water valve 623.

Thus, the purified water valve 623 may be selectively switched to supply purified water into the dispenser 20, thereby dispensing a preset amount of purified water. Alternatively, the purified water valve 623 may supply the purified water into the ice making device 33 provided in the freezing compartment 12.

A cooled water valve 632 may be provided in the cooled water passage 63. The cooled water valve 632 may be disposed in the cooled water passage 63 between the water tank and the dispenser 20. When the dispenser 20 is manipulated, the cooled water valve 632 may be opened to dispense cooled water. Also, if a command for dispensing water is not inputted, the water tank 50 may be maintained in a full water level state.

Also, the purified water passage 62 and the cooled water passage 63 may pass through a hinge 16 and then be guided into a freezing compartment door 14. Further, the purified water passage 62 and the cooled water passage 63 may be connected to a connection member 662 connected to the dispensing passage 66 in the dispenser 20 to dispense the purified or cooled water through the dispensing passage 66. Particularly, a command input unit provided in the dispenser 20 may be manipulated to dispense a preset amount of purified water or cooled water.

The refrigerator may be the same as that of the refrigerator described above, except for a structure of the cooled water valve 632, and thus, an operation for dispensing water and a detailed description with respect to a sterilization process will be referenced, rather than repeated.

Figure 21:
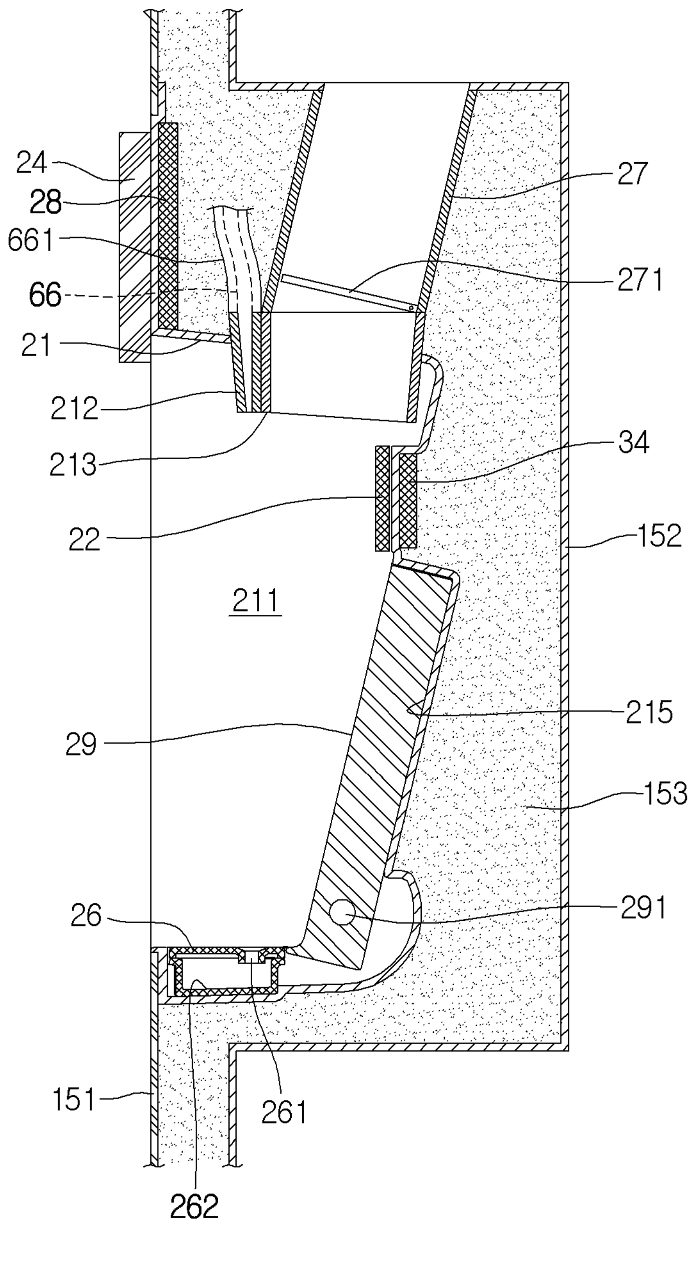
FIG. 21 is a cross-sectional view of an example dispenser, taken along line I-I of FIG. 9.
Figure 22:
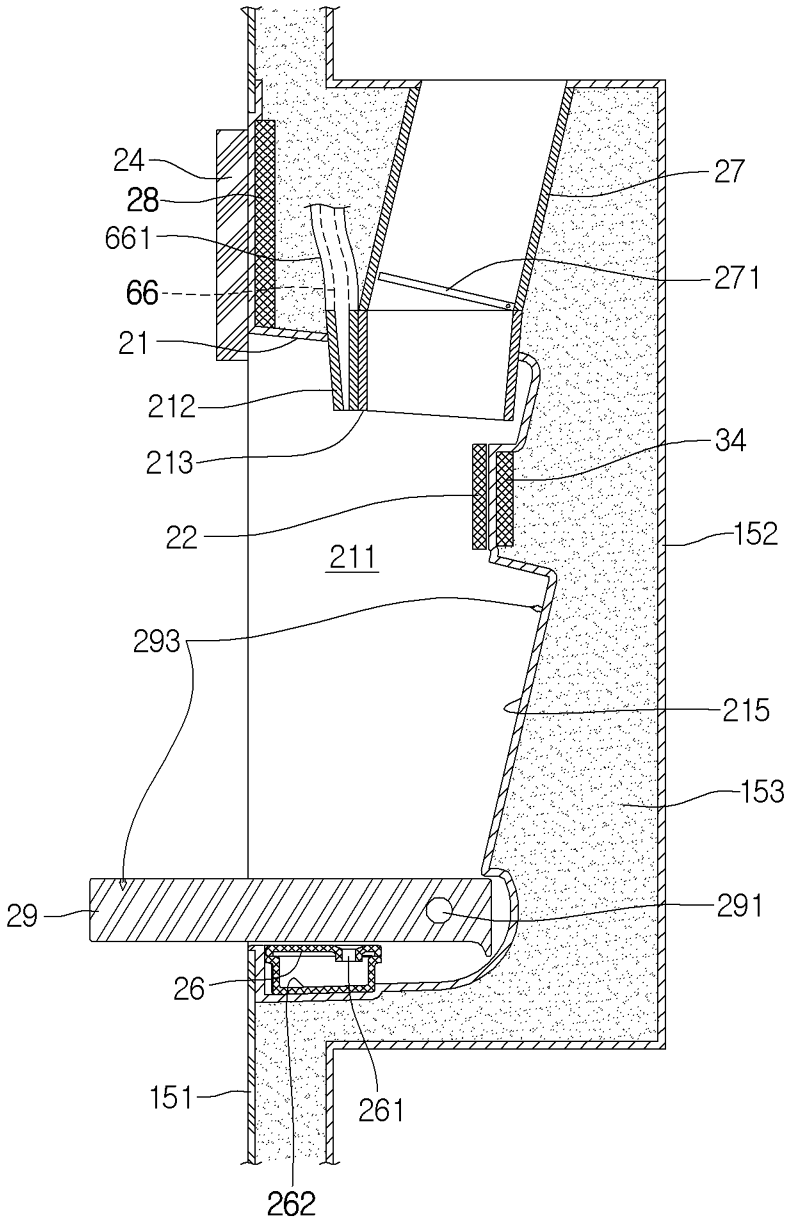
FIG. 22 is a cross-sectional view of an example state in which a container tray is used.

FIG. 21 illustrates an example dispenser, taken along line I-I of FIG. 9, and FIG. 22 illustrates an example state in which a container tray is used.

Referring to FIGS. 21 and 22, an outer door 151 is closely attached to an edge of a dispenser housing 21 constituting the dispenser 20. That is, as described above, a hole having a size corresponding to that of the dispenser housing 21 is defined in the outer door 151, and an edge of the hole is closely attached to an outer edge of the dispenser housing 21.

In detail, the dispenser 20 includes the dispenser housing 21, a chute cover 24 provided on a front surface of the dispenser housing 21, and a display 25 (see FIG. 9) provided on the chute cover 24. Also, a first control panel 28 may be provided on a rear surface of the dispenser housing 21 corresponding to a rear side of the display 25. Also, a door liner 152 is disposed on a rear side of the dispenser housing 21, and an insulation layer 153 is filled between the dispenser housing 21 and the door liner 152.

Also, a cavity 211 recessed backward by a predetermined depth may be defined in the dispenser housing 21 to accommodate a container. The cavity 211 has a top surface, a side surface, a back surface, and a bottom surface. Further, the side and back surfaces of the cavity 211 may respectively extend in directions that are perpendicular to each other to form a cross-section having a "⊏" shape. The side and back surfaces may be smoothly rounded to form a cross-sectional structure in which the side and back surfaces are not clearly defined.

Also, an ice chute 213 for dispensing ice and a water chute 212 for dispensing water are disposed on the top surface of the cavity 211. In detail, the water chute 212 may be provided at a front side of the ice chute 213 and may have a tube shape with a small diameter. Further, the dispensing passage 66 that is guided by a guide pipe 661 may be connected to the water chute 212.

In addition, an ice discharge duct 27 that provides an ice dispensing path may extend from an upper end of the ice chute 213. The ice discharge duct 27 extends upward from the upper end of the ice chute 213 to pass through the insulation layer 153 and the door liner 152. An ice bank for storing ice is placed at an upper end of the ice discharge duct 27. The ice stored in the ice bank may be discharged into the ice chute 213 through the ice discharge duct 27. Also, a damper 271 for selectively blocking the discharge of the ice may be mounted within the ice discharge duct 27.

A container tray 29 for supporting the container is rotatably mounted on a rear surface of the cavity 211. Also, a portion of the dispenser housing 21, which constitutes the rear surface of the cavity 211 may be further recessed backward to form a tray seat part 215 for seating the container tray 29.

In some implementations, a rotation shaft 291 may be provided on a lower end of the container tray 29. Thus, the container tray 29 may be rotatable in a front direction. The rotation shaft 291 horizontally passes through a lower end of the container tray 29, and both ends of the rotation shaft 291 are inserted into the side surface of the tray seat part 215. In some examples, the rotation shaft 291 may protrude from each of lower ends of left and right surfaces of the container tray 29 and be inserted into each of the side surfaces of the tray seat part 215.

Also, as described above, a push pad 22 for inputting a water or ice dispensing command is disposed on the rear surface of the cavity 211, which corresponds to an upper side of the tray seat part 215. In addition, a second control panel 34 for receiving the command from the push pad 22 may be provided on the rear surface of the dispenser housing 21, which corresponds to a rear side of the push pad 22. The control panel may be a component that is similar to the above-described detection part for detecting the pushing of the push pad.

In some implementations, a residual water plate may be provided in the dispenser housing 21 constituting the bottom surface of the cavity. The residual water plate include a residual water tray 262 recessed downward by a predetermined depth and a residual water cover 26 covering a top surface of the residual water tray 262. At least one residual water hole 261 may be defined in the residual water cover 26 to collect water dropping from the water chute 212 into the residual water tray 262.

Referring to FIG. 22, the container tray 29 may be rotatable forward with respect to the rotation shaft 291 and may rotate to a horizontal state. Also, the container tray 29 that is in the horizontal state may be supported by the bottom surface of the cavity 211, particularly, the residual water cover 26. Further, a latch part 293 may be provided on the rear surface of the container tray 29 and the tray seat part 215. In detail, the latch part 293 may have a structure that allows the container tray 29 to be selectively separated from the tray seat part 215. The latch part may be hooked or released by pushing or releasing the front surface of the container tray 29.

In addition, a driving unit for providing a rotation force to the tray 29 may be provided on the rotation shaft 291. The driving unit may have a structure that provides a rotation force for automatically rotating the container tray 29 to a horizontal state when the front surface of the container tray 29 is pushed and then released. For example, a driving unit that is adapted for an automatically openable cassette deck may be used as the driving unit. In some implementations, if the latch part 293 is pushed and then released, a predetermined repulsive force may occur. Thus, the container tray 29 may rotate forward by the repulsive force. A deceleration mechanism may be provided on the rotation shaft 291 to rotate the container tray 29 at a low speed.

Figure 23:
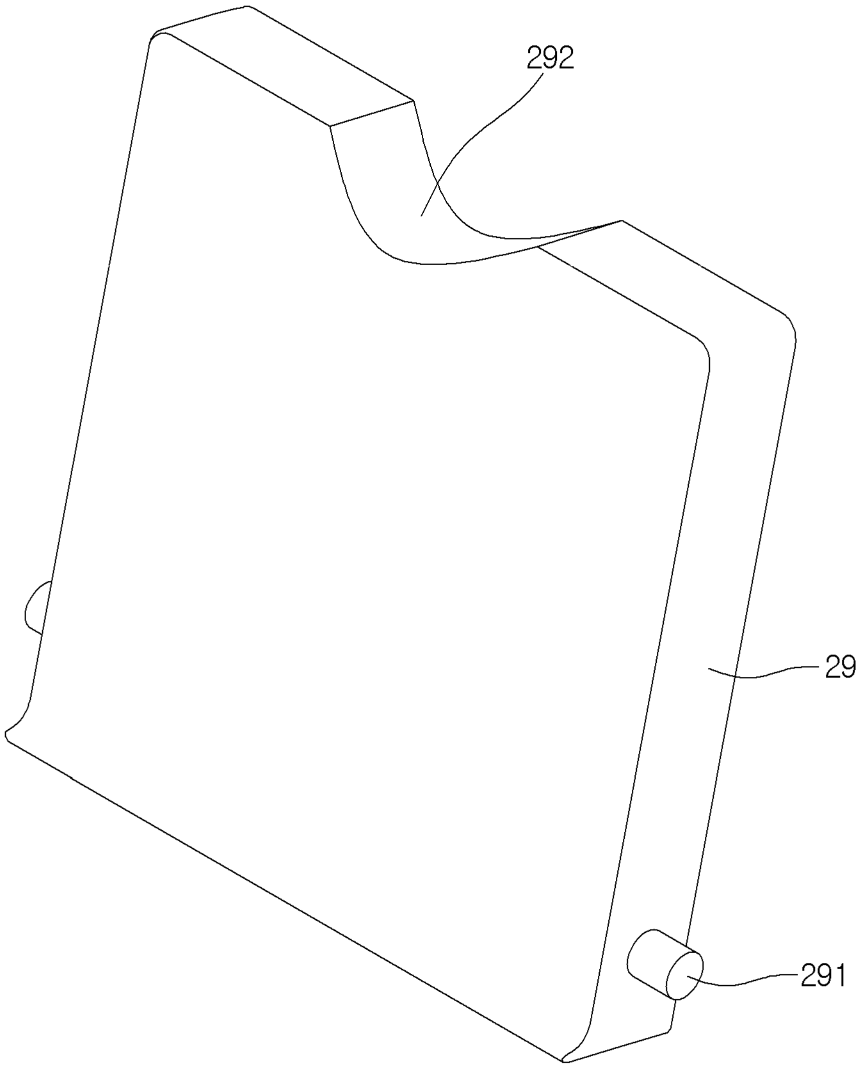
FIG. 23 is a perspective view of an example container tray.

FIG. 23 illustrates an example container tray.

Referring to FIG. 23, a container tray 29 may have a structure in which the container tray 29 manually rotates by a user supplied force.

In detail, a gripping groove 292 to be gripped by a user's fingers may be defined in an upper end of the container tray 29. When it is intended that the container tray 29 rotates, the user rotates the container tray 29 forward in a state where the user grips the gripping groove 292. Thus, the container tray 29 may rotate forward with respect to the rotation shaft 291. In this structure, it may be unnecessary to provide a separate latch structure on the rear surface of the container tray 29 and a separate deceleration mechanism on the rotation shaft 291.

Figure 24:
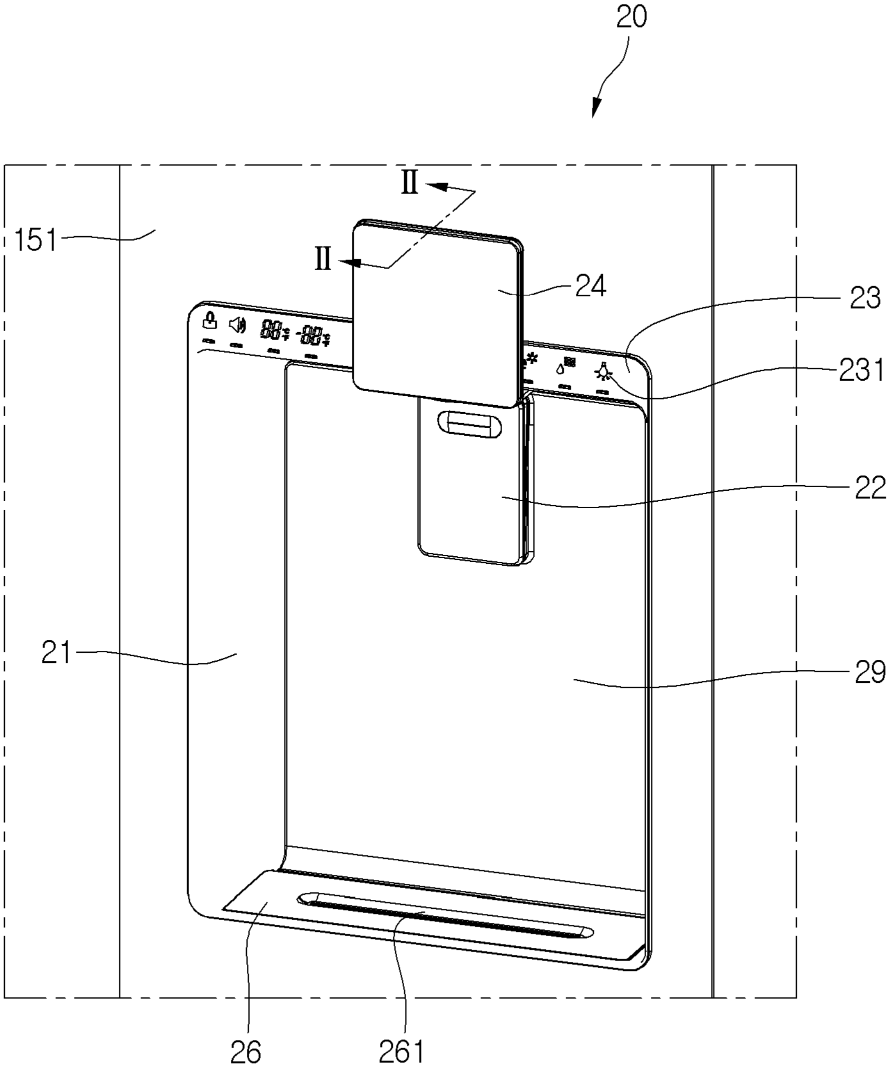
FIG. 24 is a perspective view of an example dispenser.
Figure 25:
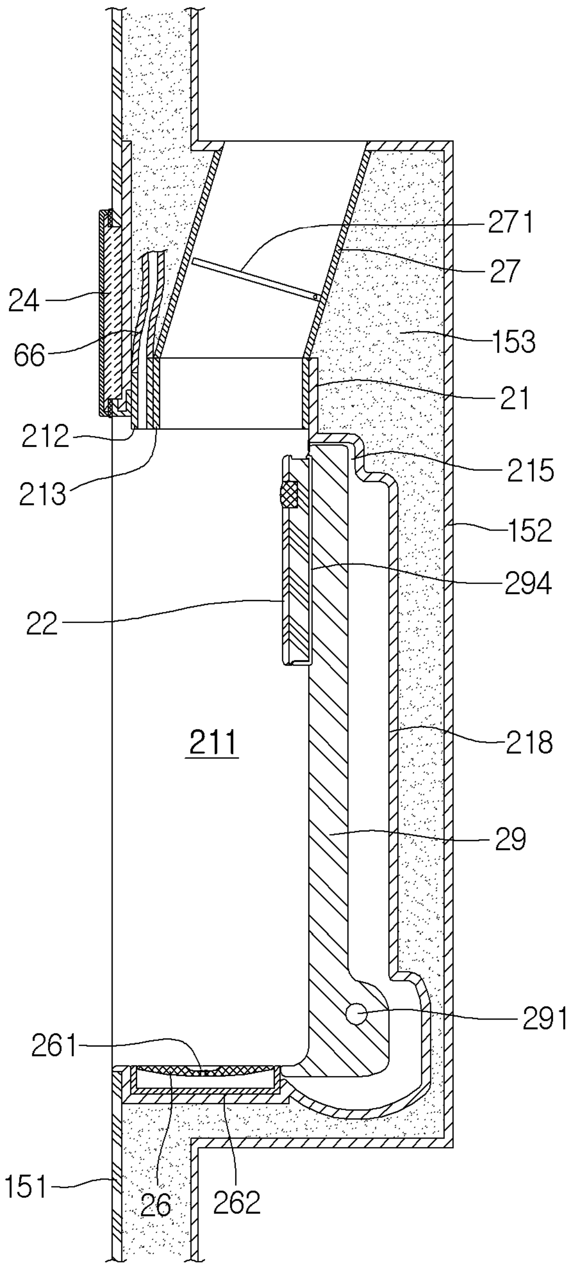
FIG. 25 is a cross-sectional view of the dispenser, taken along line II-II of FIG. 24.
Figure 26:
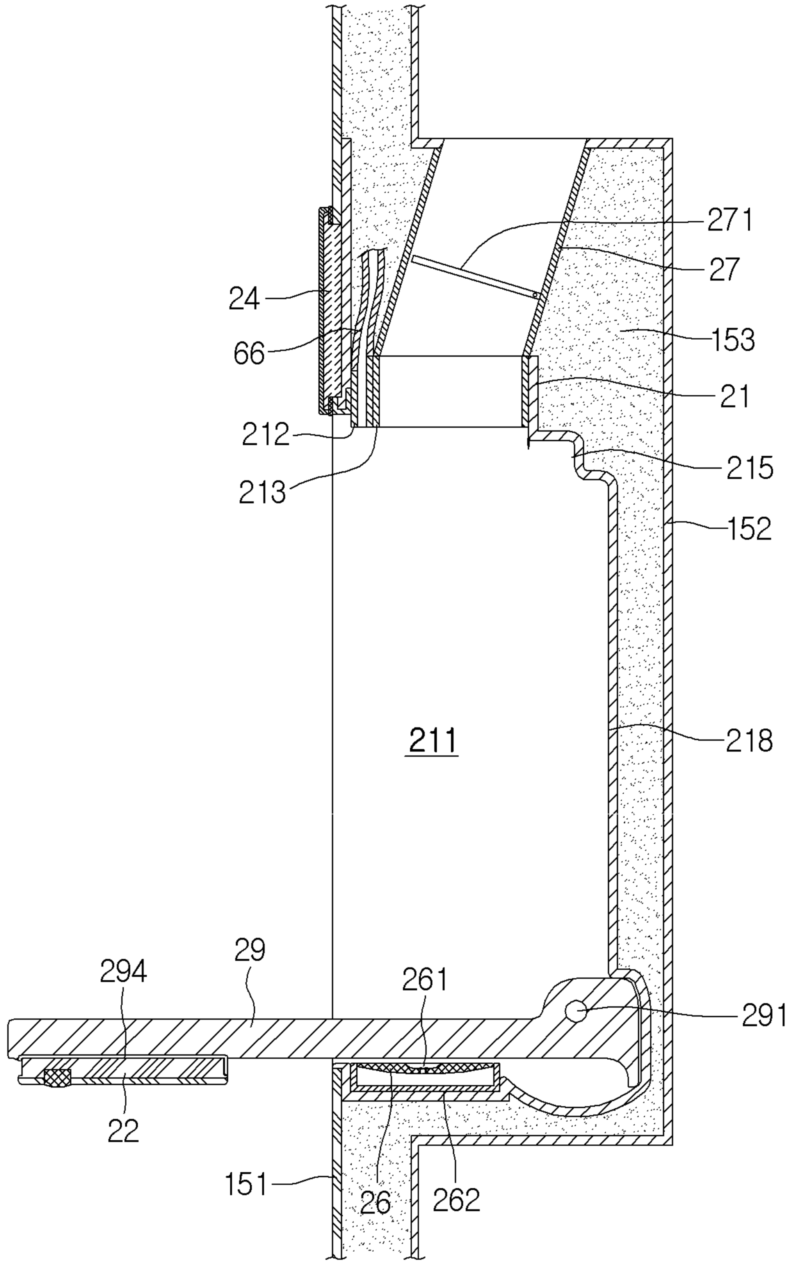
FIG. 26 is a cross-sectional view of an example state in which the container tray is used.

FIG. 24 illustrates another example dispenser, FIG. 25 is a cross-sectional view of the dispenser, taken along line II-II of FIG. 24, and FIG. 26 illustrates an example state in which the container tray is used.

Referring to FIGS. 24 and 25, a dispenser is different from the dispenser 20 described above in that a push pad 22 is provided on an upper portion of a front surface of a container tray 29.

In some implementations, to dispense a large amount of water or ice, it may be difficult to utilize the push pad 22. If it is difficult to push the push pad 22 because a container has a volume greater than that of a cavity 211 of the dispenser 20, or a container tray 29 horizontally rotates forward to support the container, it may be unnecessary to utilize the push pad 22. Here, a display 25 (see FIG. 9) provided on the chute cover 24 or an input button provided on a cover plate 23 (see FIG. 9) with a display 231 may be utilized. Thus, a dispensing button for dispensing a large amount of water or ice may be separately provided on the chute cover 24 or the cover plate 23. For example, to dispense a large amount of water or ice, a dispensing amount selection button and a dispensing button in addition to the button for selecting water or ice may be additionally provided. In this example, the input button may include a general button structure as well as a touch screen-type button part.

In some implementations, the user may manipulate the input unit provided on the display 25 or the cover plate 23 so as to dispense a small amount of water or ice. Then, the user may select an object to be dispensed and push the push pad 22 to dispense the desired object to be dispensed, e.g., one of water or ice. However, to dispense a large amount of water or ice, in a state where the container tray 29 rotates forward, a dispensing object selection button provided on the display 25 of the chute cover 24 or cover plate 23 is pushed to select a desired object to be dispensed. Then, a dispensing amount of selected object may be selected to push the dispensing button.

A tray seat part 215 in which the container tray 29 is accommodated is disposed on a rear surface of the cavity 211 defined in the dispenser 20. Furthermore, a container accommodation groove 218 that is further recessed by a predetermined depth from the inside of the tray seat part 215 may be further defined. The container accommodation groove 218 enables the container to be pushed further into the cavity 211 in the state where the container tray 29 rotates forward. The container accommodation groove 218 may be equally applied to the other examples described throughout this disclosure.

Also, a push pad seat groove 294 on which the push pad 22 is seated may be defined in an upper portion of a front surface of the container tray 29. In addition, a front surface of the push pad 22 may further protrude from the front surface of the container tray 29.

Referring to FIG. 26, to dispense a large amount of water or ice, the user may rotate the container tray 29 forward to allow container tray 20 to be in a horizontal state. A mechanism for rotating the container tray 29 may be the same as described above.

Also, since the push pad 22 integrally rotates with the container tray 29, it is unnecessary to apply a pressing pressure to the push pad 22 in the state where the container tray 29 rotates. Thus, the push pad 22 may be disposed on a position at which the push pad does not interfere with the bottom surface of the cavity including a residual water cover 26 in the state where the container tray 29 rotates in the horizontal direction. For this, the push pad 22 may be disposed on the front surface of the container tray 29 corresponding to an area that protrudes from a front surface of a door 14. Thus, the push pad 22 may be disposed at a point that is close to an upper end of the container tray 29.

Figure 27:
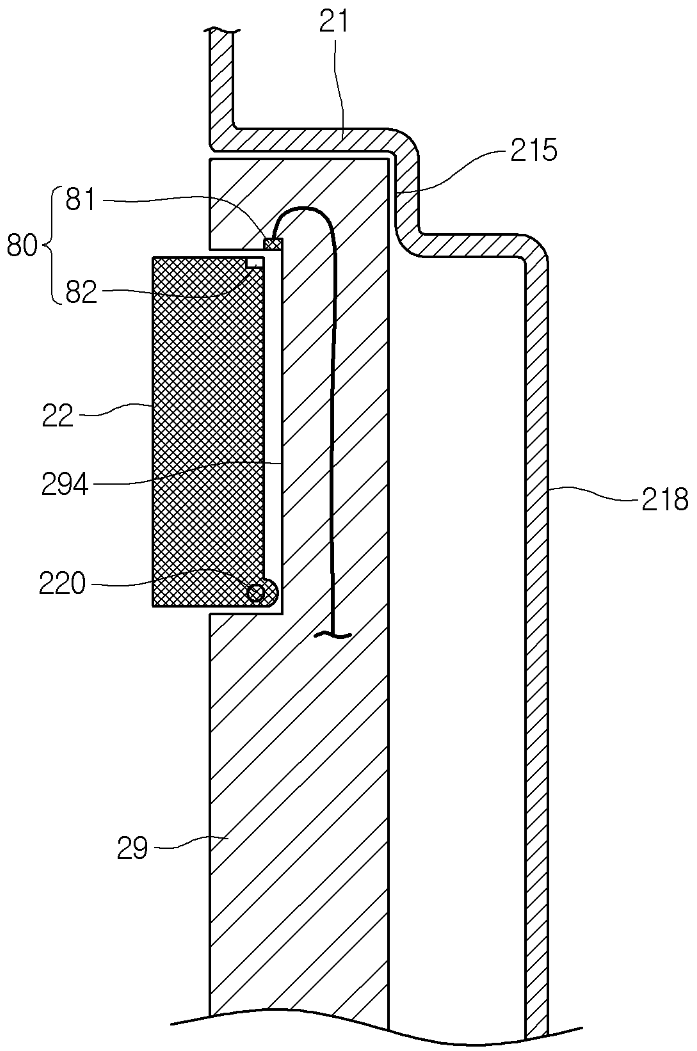
FIG. 27 is a cross-sectional view of an example dispensing command input mechanism provided in the container tray and a push pad of the dispenser of FIGS. 24 to 26.

FIG. 27 illustrates an example dispensing command input mechanism provided in the container tray and an example push pad of the dispenser of FIGS. 24 to 26.

Referring to FIG. 27, the push pad 22 may be disposed on an upper end of the front surface of the container tray 29. Also, the push pad 22 is seated on the push pad seat groove 294 that is recessed from the front surface of the container tray 29. Further, the push pad 22 may be provided rotatable by a rotation shaft 220 that is provided on a lower end thereof. When the user pushes the push pad 22 to dispense water or ice, the push pad 22 may be tilted backward with respect to the rotation shaft 220.

When the push pad 22 is pushed, an input signal generation part 80 for recognizing the pushing operation as a dispensing command input of water or ice is used. Hereinafter, a structure of the input signal generation part 80 will be described.

The input signal generation part 80 may be provided on the push pad 22 and the container tray 29 through various methods. For example, the input signal generation part 80 may include a magnet 82 provided on one side of the push pad 22 and the container tray 29 and a hall sensor 81 provided on the other side. The magnet 82 may be disposed on an upper end of the push pad 22, and the hall sensor 81 may be provided on an upper end of the push pad seat groove 294, and vice versa.

With this structure, in a state where the dispensing command is not inputted, the magnet 82 is maintained in a state where the magnet is spaced apart from the hall sensor 81. Thus, the magnet 82 is not detected by the hall sensor 81. When the push pad 22 is pushed to input the dispensing command, the magnet 82 may move directly downward from the hall sensor 81. As a result, the hall sensor 81 may detect a magnetic force generated in the magnet 82 to generate a pulse. The generated pulse may be transmitted into the control panel through a signal line. While a pulse on state is maintained, water or ice may be dispensed. When a force pushing the push pad 22 is released, a pulse off state may be output to stop the dispensing operation.

Figure 28:
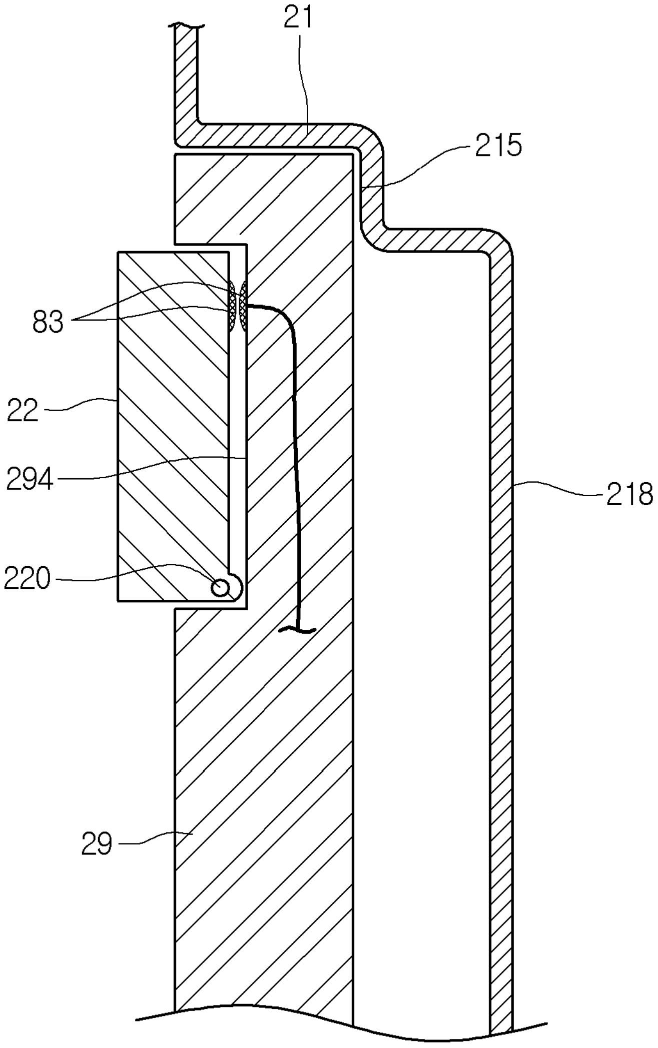
FIG. 28 is a cross-sectional view of another example dispensing command input mechanism provided in a container tray and a push pad.

FIG. 28 illustrates another example dispensing command input mechanism provided in a container tray and a push pad.

Referring to FIG. 28, an input signal generation part for detecting a dispensing command may include an on/off switch as another example.

The input signal generation part 83 having the on/off switch may be provided on a back surface of a push pad 22 and a seat surface of a push pad seat part 294.

In detail, when the push pad 22 for inputting the dispensing command of water or ice is pushed, a contact part disposed on the back surface of the push pad 22 and a contact part disposed on the push pad seat part 294 may be connected to each other to turn a switch on. While the switch on state is maintained, water or ice may be dispensed. When a switch off state occurs, the dispensing operation may be stopped.

Figure 29:
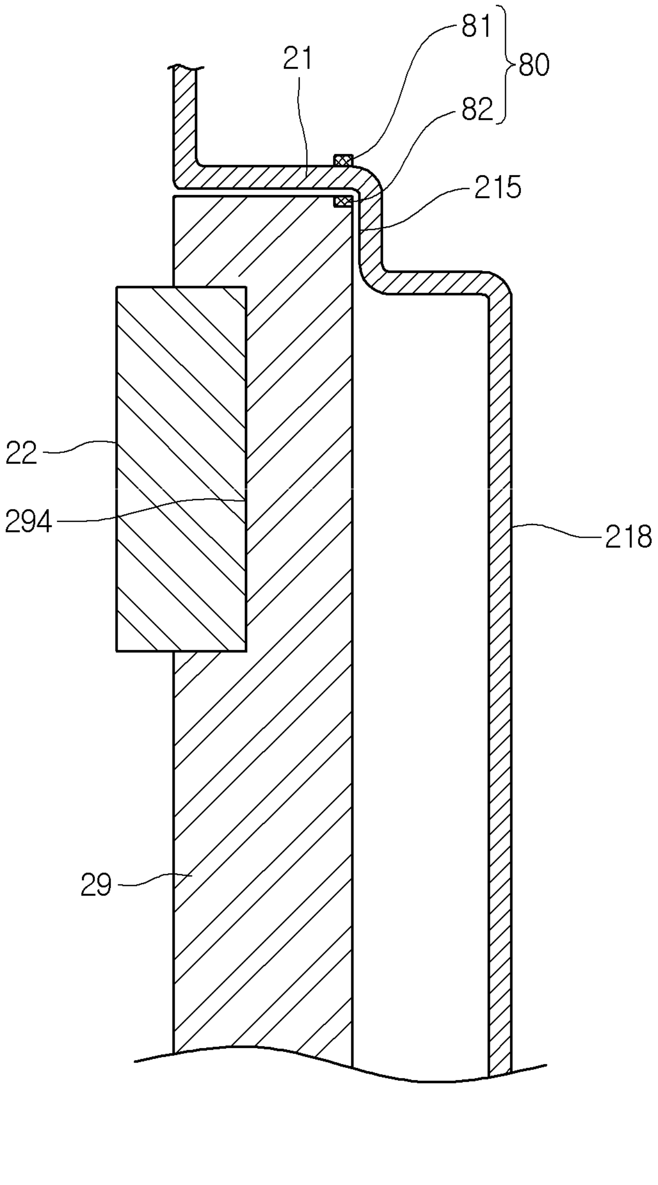
FIG. 29 is a cross-sectional view of yet another dispensing command input mechanism provided in a container tray and a push pad.

FIG. 29 illustrates yet another example dispensing command input mechanism provided in a container tray and a push pad.

Referring to FIG. 29, an input signal generation part 80 has a feature in which an input signal generation part 80 is provided on each of upper ends of a container tray 29 and container seat part 215.

In detail, the push pad 22 is mounted and fixed on a front surface of the container tray 29. When the push pad 22 is pushed, the container tray 29 is pushed backward. Then, a magnet 82 mounted on the container tray 29 moves backward, and thus, a hall sensor 81 detects the magnet 82. As a result, a pulse signal is generated from the hall sensor 81.

As described above, in some implementations, a refrigerator includes: a main body having a storage space; a door opening or closing the storage space; a dispenser provided in the door to dispense cooled water and purified water; a purified water input part provided in the dispenser to input a command for dispensing the purified water; a cooled water input part provided in the dispenser to input a command for dispensing the cooled water; a dispensing amount input part for setting an amount of purified water to be dispensed when the purified water is selected through the purified water input part; a filter device provided within the storage space to purify water supplied from a water supply source outside the main body; a water tank storing the water passing through the filter device, the water tank configured to cool the stored water by using cool air within the storage space; a purified water passage guiding the purified water filtered in the filter device into the dispenser; a cooled water passage guiding the cooled water cooled in the water tank into the dispenser; a purified water valve controlling a water flow in the purified water passage; and a cooled water valve disposed in a passage connecting the filter device to the water tank to control a water flow in the cooled water passage, wherein, when the purified water is selected through the purified water input part, the purified water valve is opened, and the cooled water valve is closed, when an amount of water set through the dispensing amount input part has been dispensed, the purified water valve is closed, and when the cooled water is selected through the cooled water input part, the cooled water valve is opened, and the purified water valve is closed.

The cooled water passage may be branched from the purified water passage.

The purified water passage and the cooled water passage may extend to the inside of the door through a hinge connecting the door to the main body.

The refrigerator may further include: a water dispensing port defined in the dispenser to dispense water; and a dispensing passage extending from a point, at which the purified water passage and the cooled water passage meet each other, up to the water dispensing port.

The purified water valve may be provided in the door, and the cooled water valve may be provided in the main body.

The cooled water passage may be branched from the purified water passage.

The door of the refrigerator may be rotatably coupled to the main body by a hinge.

The refrigerator may further include: a supplied water passage connecting the water supply source to the filter device; and a water supply valve provided in the supplied water passage to control a water flow into the filter device.

The dispenser may include: a dispenser housing having a space that is recessed from a front surface of the door; a water dispensing port through which the cooled water or the purified water is dispensed; an electrical component mount part in which an electrical components are mounted, the electrical component mount part being provided on an upper portion of the dispenser housing and at one side of left and right sides with respect to the water dispensing port; a valve mount part in which the purified water valve is accommodated, the valve mount part being provided on the upper portion of the dispenser housing and at the other side of the left and right sides with respect to the water dispensing port; and a cover plate of which at least one portion is separable from the dispenser housing, the cover plate selectively opening or closing the electrical component mount part and the valve mount part, The purified water valve may be exposed to the outside in a state where the cover plate is separated from the dispenser housing.

The refrigerator may further include: a dispensing passage connected to the water dispensing port of the dispenser to guide the purified water or cooled water to the water dispensing port; and a connection member of which an outer end is connected to the dispensing passage, and an inlet end is connected to the purified water passage and the cooled water passage.

The connection member may be disposed on the valve mount part.

The dispensing passage may be bent to have a predetermined curvature and be formed of a metal material.

The purified water passage and the cooled water passage may extend to the inside of the door through a hinge connecting the door to the main body.

A passage guide extending from the hinge to the dispenser to guide the purified water passage and cooled water passage passing through the hinge into the dispenser may be further provided in the door.

The refrigerator may further include: an ice making device provided in the door to make ice; and an ice making passage guiding water within the purified water passage to the ice making device.

The storage space may include a refrigerating compartment and a freezing compartment, the door may include a refrigerating compartment door and a freezing compartment door, and the ice making device may be provided in the freezing compartment door.

The ice making passage may be connected to the purified water valve.

The dispenser may include: a water dispensing port for dispensing the cooled water or the purified water; and an ice dispensing port for dispensing ice, wherein the purified water valve may be disposed on one side of left and right sides of the ice dispensing port.

The refrigerator may further include an ice input part provided in the dispenser, the ice input part being selected to dispense the ice.

The dispenser may include: a purified water dispensing port through which the purified water is dispensed; and a cooled water dispensing port through which the cooled water is dispensed.

The refrigerator may further include: an ice making device mounted on the main body to make ice; and an ice making passage guiding water within the purified water passage to the ice making device, wherein the ice making passage extends to the ice making device along the main body.

The water tank and the filter device may be mounted on the refrigerating compartment.

As described above, in some examples, a refrigerator includes: a main body having a storage space; a door opening or closing the storage space; a dispenser provided in the door to dispense cooled water and purified water; a purified water input part provided in the dispenser to input a command for dispensing the purified water; a cooled water input part provided in the dispenser to input a command for dispensing the cooled water; a filter device provided in the storage space, the filter device including a plurality of filters for purifying water supplied from a water supply source outside the main body; a water purifying passage extending from an inlet end of the filter device to an outlet end of the filter device via the plurality of filters; a water tank storing the water passing through the filter device to cool the stored water by using cool air within the storage space; a purified water passage guiding the purified water filtered in the filter device into the dispenser; a cooled water passage guiding the cooled water cooled in the water tank into the dispenser; a sterilization passage including a passage from an outlet end of a sterilization device installed for cleaning the purified water passage and the cooled water passage to an inlet end of the filter device and the water purifying passage except for the passage passing through the plurality of filters; a purified water valve controlling a water flow in the purified water passage; and a cooled water valve controlling a water flow in the cooled water passage, wherein the purified water valve and the cooled water valve are opened together with an operation of the sterilization device to sterilize the purified water passage and the cooled water passage.

The filter device may include: a case mounted in the storage space, the case having a front opening for inserting each of the plurality of filters; and a connector disposed within the case, the connector allowing the plurality of filters to be detachably connected thereto, wherein the water purifying passage passes through the connector.

The connector may include: a plurality of sockets in which the filters are fitted, respectively; and a bracket to which the plurality of sockets are rotatably coupled.

The refrigerator may further include a filter cap mounted within the plurality of sockets to prevent water from leaking in a state where the filters are separated from the sockets.

The ice making device may be provided in the door or main body.

Sterilizing water supplied from the sterilization device, during the sterilization process, may be supplied into the ice making device through the ice making passage.

The refrigerator may further include an input part selecting a sterilization mode for sterilizing the purified water passage and the cooled water passage.

As described above, in some implementations, a refrigerator includes: a main body having a storage space; a receiving member provided in the storage space; a door opening or closing the storage space; a dispenser provided in a front surface of the door to dispense cooled water and purified water; a filter device provided in the storage space, the filter device including a plurality of filters for purifying water supplied from a water supply source outside the main body; a water tank storing the water passing through the filter device to cool the stored water by using cool air within the storage space; a water supply passage through which the purified water passing through the filter device and the cooled water cooled in the water tank independently flow; and a valve unit provided in the water supply passage to open/close and/or switch the water supply passage, wherein the filter device is disposed between a side surface of the receiving member and a side surface of the receiving member and a side surface of the storage space, the plurality of filters are disposed in a horizontal state and arranged vertically, and the water introduced into the filter device successively passes through the plurality of filters and is discharged towards the valve unit.

The filter device may include: a case mounted in the storage space, the case having a front opening for inserting each of the plurality of filters; and a connector disposed within the case, the connector allowing the plurality of filters to be detachably connected thereto.

The filter device may further include a case cover for opening or closing the front opening, and a front surface of the case cover and a front surface of the receiving member are configured to be coplanar.

The filter device may further include a drain member disposed in an inner lower portion of the case to collect water leaking while the filters are detached or attached.

The drain member may have a tilted surface that is tilted downward in a front direction.

An opening for discharging the water collected in the drain member to the outside may be defined in the case.

The filter device may further include a mount guide protruding from an inner circumferential surface of the case to guide entrance of the filter.

The mount guide may extend in a direction parallel to that in which the filter is inserted.

The filter device may have the same length in a front-to-rear direction as the length of the receiving member in the front-to-rear direction.

The refrigerator may further include a support member for supporting the receiving member and the filter device at the same time.

The refrigerator may further include a shelf for covering upper sides of the receiving member and the filter device at the same time.

A top surface of the filter device and a top surface of the receiving member may be configured to be coplanar.

The refrigerator may include a water tank formed of a metal material.

The water tank may be formed of a stainless material.

The water tank may include: a tank body having a cylindrical shape with both ends opened; and a pair of tank caps bonded to both opened ends of the tank body, the pair of tank caps each of which has a hemisphere shape.

The water tank may further include: a water inlet tube passing through one of the pair of tank caps, the water inlet tube being inserted into the one of the pair of tank caps; and a water outlet tube passing through a top surface of the tank body, the water outlet tube being inserted into the tank body, wherein the water outlet tube is closer to the tank cap disposed on a side opposite to the tank cap that the water inlet tube is disposed.

The cooled water valve may be connected to the water outlet tube and covered by a valve cover, and the valve cover may be coupled to a wall of the storage space.

The water tank may be horizontally disposed in the storage space.

The filter device may include a plurality of filters, each of the plurality of filters is horizontally disposed in forward and backward directions of the storage space, and the water tank is horizontally disposed in left and right directions of the storage space.

The plurality of filters may be vertically arranged.

The water tank may be disposed at a rear side of the receiving member.

As described above, in some examples, a refrigerator may include: a dispenser provided in the door to dispense cooled water and purified water, the dispenser including a dispenser housing that is recessed backward by a predetermined depth to form a cavity; a tray selectively withdrawable to an outside of the cavity of the dispenser; and a flow sensor for detecting an amount of purified water being dispensed.

The flow sensor may be provided in a passage connecting the water supply source to the filter device.

The dispenser may include: a push pad for dispensing the purified water or cooled water through pushing; and a detection part detecting the pushing of the pushing pad.

The refrigerator may further include a display having a screen for realizing the input parts in a touch manner.

The screen of the display may be partitioned into a plurality of sections to display the purified water input part and the cooled water input part, and when the purified water input part is touched, the screen may be switched to display the dispensing amount input part.

After an amount of water to be dispensed is selected through the dispensing amount input part, a water dispensing command is input in such a manner that a water dispensing command input part which may be separately provided is manipulated, or that the push pad may be pushed.

When the push pad is pushed so as to dispense water, and then the pushing of the push pad may be released before a predetermined amount of purified water is dispensed, the purified water valve may be closed.

After the push pad is pushed so as to dispense water, and then a predetermined amount of purified water is dispensed, the purified water valve may be closed regardless of whether the pushing of the push pad is released.

The refrigerator may further include an ice making device receiving the purified water within the purified water passage to make ice, wherein an ice input part for selecting ice dispensing is displayed on the screen of the display.

Cubed ice or crushed ice may be selected through the ice input part.

The push pad and the tray may be provided on a rear surface of the cavity.

The tray may be rotatable until the tray is in a horizontal state.

The refrigerator may further include a tray seat part that is further recessed from the rear surface of the cavity to accommodate the tray.

The tray may include: a front portion exposed to the outside in a state where the tray is seated on the tray seat part; and a rear portion defining a surface opposite to the front portion, wherein, in the state where the tray is seated on the tray seat part, the front portion and the rear surface of the cavity are configured to be coplanar.

The push pad may be provided on an upper portion of the front portion and integrated with the tray.

The push pad may be provided on one side of the rear surface of the cavity which is spaced apart from an upper end of the tray.

The refrigerator may further include: a first recess portion accommodating the tray; and a second recess portion that is further recessed inward from the first recess portion to locate a container in a further inward direction of the cavity.

The refrigerator may further include a latch part provided on the tray seat part and the rear portion of the tray to allow the tray to be separated from the tray seat part by pushing and then releasing the tray.

The refrigerator may further include a driving unit and a deceleration unit which are provided on a rotation shaft of the tray to rotate at a set speed when the tray is separated from the tray seat part.

The detection part may be provided on a rear surface of the dispense housing.

The detection part may include one of a magnet and a hall sensor module or an on/off switch module.

One of the magnet and the hall sensor may be mounted on one of the push pad and the tray, and the other of the magnet and the hall sensor may be mounted on the other of the push pad and the tray.

One of the magnet and the hall sensor may be mounted on one of the tray and the dispenser housing, and the other of the magnet and the hall sensor may be mounted on the other of the tray and the dispenser housing.

The on/off switch may be mounted on the push pad and the tray.

The on/off switch may be mounted on the tray and the dispenser housing.

A gripping groove may be defined in a top surface of the tray.

In some examples, cooled water and purified water may be selectively dispensed through the dispenser by the user to improve user's convenience.

Also, an amount of water to be dispensed by the user may be determined by a fixed amount that is set through the dispenser to further improve user's convenience.

In addition, the purified water may be supplied into the ice making device to prevent the water from being frozen while the water is supplied into the ice making device.

Further, the connection member connecting the tubes for supplying the purified water and the cooled water into the dispenser and the purified water valve that branches the passage to supply the purified water into the dispenser and the ice making device may be provided to more easily manufacture the door, thereby improving productivity.

Also, the cover plate provided on the dispenser may be separated to expose the connection member and the purified water valve to the outside. Thus, the tubes may be easily connected and separated to improve service efficiency.

In some examples, the input part is capable of adjusting the dispensing of the cooled water and the purified water and an amount of purified water to be dispensed may be realized through the display to control the dispensing in combination with the push pad according to conditions, thereby more improving convenience in use.

Further, the filter device and the water tank may be disposed adjacent to the space in which the receiving device is mounted, and the plurality of filters may be vertically disposed in parallel. Thus, the efficiency in storage space of the refrigerator may be improved, and sense of unity with the receiving member may be realized.

Also, the water tank may have a pressure container shape to store a large amount of water and minimize the passage resistance, thereby prevent the flow rate from decreasing.

In addition, the water tank may be formed of a metal material to effectively cool the water stored in the water tank by using cool air within the storage space. The metal material also may prevent foreign substances, such as dirt, from occurring in the water tank.

In some implementations, the sterilization device may be connected to the water supply passage to sterilize and clean the inside of the water supply passage as well as the water tank, the ice making device, and the dispenser, which are connected to the water supply passage, at the same time, thereby easily managing the refrigerator and maintaining quality of water supplied into the ice making device.

Although implementations have been described with reference to a number of illustrative examples thereof, it should be understood that numerous other modifications and examples can be devised by those skilled in the art that fall within the spirit and scope of the principles of this disclosure. More particularly, variations and modifications are possible in the component parts and/or arrangements and fall within the scope of the disclosure, the drawings, and the appended claims. In addition to variations and modifications in the component parts and/or arrangements, alternative uses also will be apparent to those skilled in the art.

What is claimed is:

1. A refrigerator comprising:

a main body having a storage space;

a door coupled to the main body and configured to open and close the storage space; and a dispenser disposed at the door and configured to dispense ice and water, the dispenser defining a recessed cavity that is recessed rearward relative to a front surface of the door, wherein the dispenser comprises:

a cover plate that is provided at an upper portion of the dispenser and that defines at least a portion of a front appearance of the dispenser, a chute cover that is provided at a center of the upper portion of the dispenser and that protrudes forward relative to the cover plate, an ice chute disposed in the recessed cavity and configured to dispense ice, a water chute disposed in the recessed cavity and configured to dispense water, a first display that is provided at the chute cover, the first display including one or more first input parts, and a second display that is provided at the cover plate at left and right sides of the chute cover, the second display including one or more second input parts, and wherein a lowermost end of the chute cover is positioned lower than an uppermost end of the recessed cavity.

2. The refrigerator of claim 1, wherein the second display is wider than the first display.

3. The refrigerator of claim 1, wherein the water chute is disposed between the first display and the ice chute in a front-to-rear direction of the refrigerator.

4. The refrigerator of claim 1, further comprising a push pad provided within the recessed cavity and below the ice chute.

5. The refrigerator of claim 1, wherein an outlet of the water chute and an outlet of the ice chute are positioned lower than the first display.

6. The refrigerator of claim 1, wherein at least one of the first display or the second display is a touch-type display.

7. The refrigerator of claim 1, wherein the one or more first input parts of the first display are configured to control an input operation of the dispenser.

8. The refrigerator of claim 1, wherein the first display is configured to display an operation state of the refrigerator or the dispenser or both.

9. The refrigerator of claim 1, wherein the chute cover is integrated with the cover plate.

10. The refrigerator of claim 1, wherein the chute cover and the cover plate are separately provided.

11. The refrigerator of claim 1, wherein the chute cover covers front sides of the water chute and the ice chute.

12. The refrigerator of claim 1, wherein the first display includes left and right surfaces that are spaced apart from left and right sides of a periphery of the recessed cavity, respectively, and wherein a sum of (i) a first width in a left-right direction between the left surface of the first display and the left side of the periphery of the recessed cavity and (ii) a second width in the left-right direction between the right surface of the first display and the right side of periphery of the recessed cavity is greater than a width of the first display.

13. The refrigerator of claim 12, wherein each of the left and right sides of the periphery of the recessed cavity is laterally adjacent to the front surface of the door.

14. The refrigerator of claim 1, wherein the first display protrudes forward relative to the second display.

15. The refrigerator of claim 14, wherein the first display protrudes downward relative to the second display.

16. The refrigerator of claim 4, wherein a lower end of the chute cover is disposed between the uppermost end of the recessed cavity and a lower end of the push pad.

17. The refrigerator of claim 1, wherein an upper end of the chute cover is positioned higher than the uppermost end of the recessed cavity.

18. The refrigerator of claim 1, where in the first display protrudes downward toward a center of the recessed cavity.

19. The refrigerator of claim 1, wherein the first display protrudes forward relative to the front surface of the door.

20. The refrigerator of claim 1, wherein the dispenser is configured to receive purified water that has been filtered by a filter device provided within the main body of the refrigerator.

* * * * *